(12) United States Patent
Park et al.

(10) Patent No.: US 10,411,931 B2
(45) Date of Patent: Sep. 10, 2019

(54) METHOD FOR TRANSRECEIVING PPDU IN WIRELESS COMMUNICATION SYSTEM AND DEVICE FOR SAME

(71) Applicant: LG ELECTRONICS INC., Seoul (KR)

(72) Inventors: Eunsung Park, Seoul (KR); Jinsoo Choi, Seoul (KR); Dongguk Lim, Seoul (KR); Hangyu Cho, Seoul (KR); Wookbong Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 142 days.

(21) Appl. No.: 15/518,716

(22) PCT Filed: Nov. 2, 2015

(86) PCT No.: PCT/KR2015/011642
§ 371 (c)(1),
(2) Date: Apr. 12, 2017

(87) PCT Pub. No.: WO2016/068671
PCT Pub. Date: May 6, 2016

(65) Prior Publication Data
US 2017/0230218 A1 Aug. 10, 2017

Related U.S. Application Data

(60) Provisional application No. 62/073,027, filed on Oct. 31, 2014, provisional application No. 62/077,850, (Continued)

(51) Int. Cl.
H04L 27/26 (2006.01)
H04L 5/00 (2006.01)
H04W 84/12 (2009.01)

(52) U.S. Cl.
CPC ........ *H04L 27/2608* (2013.01); *H04L 5/0048* (2013.01); *H04L 27/261* (2013.01); *H04L 27/2602* (2013.01); *H04W 84/12* (2013.01)

(58) Field of Classification Search
CPC ... H04L 5/0094; H04L 5/0007; H04L 5/0037; H04L 5/0044; H04L 5/0053;
(Continued)

(56) References Cited

U.S. PATENT DOCUMENTS

2006/0072529 A1 4/2006 Mujtaba
2008/0212462 A1 9/2008 Ahn et al.
(Continued)

FOREIGN PATENT DOCUMENTS

WO 2014171788 10/2014

OTHER PUBLICATIONS

PCT International Application No. PCT/KR2015/011642, International Search Report dated Mar. 31, 2016, 4 pages.

*Primary Examiner* — Un C Cho
*Assistant Examiner* — Peter K Mak
(74) *Attorney, Agent, or Firm* — Lee Hong Degerman Kang & Waimey

(57) ABSTRACT

Disclosed in the present invention are a method for transreceiving a physical protocol data unit (PPDU) in a wireless communication system and a device for same. More specifically, a method for transmitting a physical protocol data unit (PPDU) using a wireless communication device in a wireless communication system comprises the steps of: generating a PPDU including a legacy preamble, an HE-preamble, and a data field; and transmitting the generated PPDU, wherein a minimum integer number of pilot patterns are defined, wherein the minimum integer number is larger than the value obtained by dividing the total number of subcarriers constituting the data field or a fast Fourier
(Continued)

transform (FFT) size value used when generating the PPDU by the total number of pilots, wherein specific pilot patterns from among the pilot patterns are allocated to each symbol of the data field, and wherein the index of a subcarrier to which the pilot is mapped may be determined by the pilot patterns.

12 Claims, 12 Drawing Sheets

Related U.S. Application Data filed on Nov. 10, 2014, provisional application No. 62/221,110, filed on Sep. 21, 2015.

(58) Field of Classification Search
CPC .. H04L 69/324; H04W 28/065; H04W 72/04; H04W 74/085
See application file for complete search history.

(56) References Cited

U.S. PATENT DOCUMENTS

| | | | |
|---|---|---|---|
| 2011/0149942 A1 | 6/2011 | Ko et al. | |
| 2012/0113974 A1* | 5/2012 | Zhu | H04L 5/0048 370/344 |
| 2013/0177090 A1 | 7/2013 | Yang et al. | |
| 2013/0230120 A1* | 9/2013 | Yang | H04L 27/2613 375/295 |
| 2015/0085735 A1* | 3/2015 | Shelby | H04L 65/80 370/312 |
| 2015/0327217 A1* | 11/2015 | Aboul-Magd | H04W 72/121 370/329 |
| 2016/0044675 A1* | 2/2016 | Chen | H03M 13/1102 370/329 |
| 2016/0050666 A1* | 2/2016 | Yang | H04W 72/02 370/329 |
| 2016/0057657 A1* | 2/2016 | Seok | H04L 69/324 370/476 |
| 2016/0066321 A1* | 3/2016 | Yu | H04L 5/00 370/329 |
| 2017/0201359 A1* | 7/2017 | Li | H04W 72/0453 |

* cited by examiner

[FIG. 1]
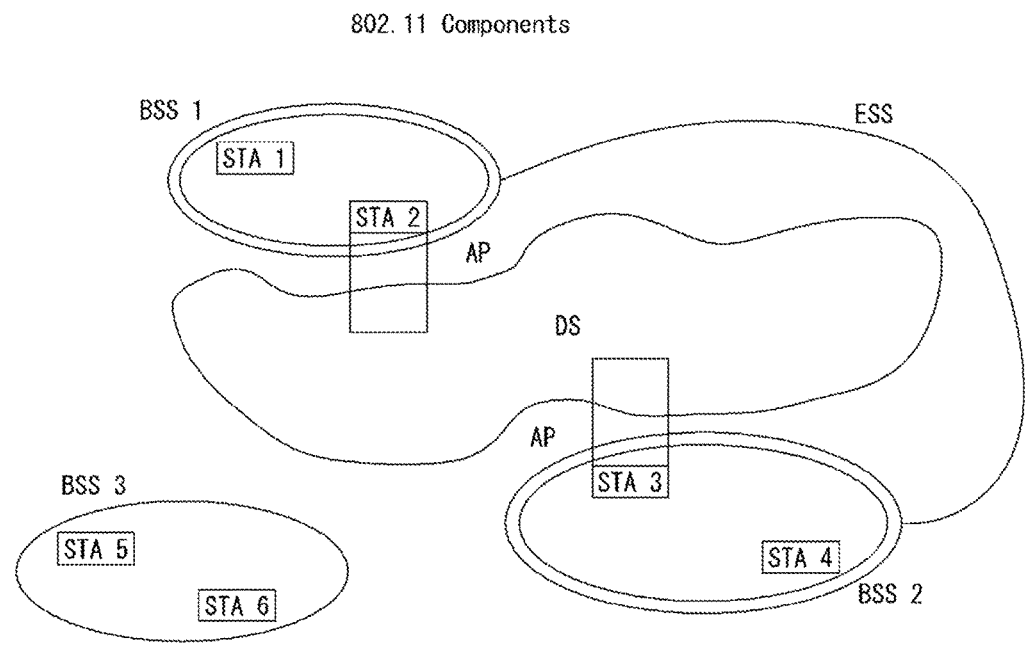
[FIG. 2]
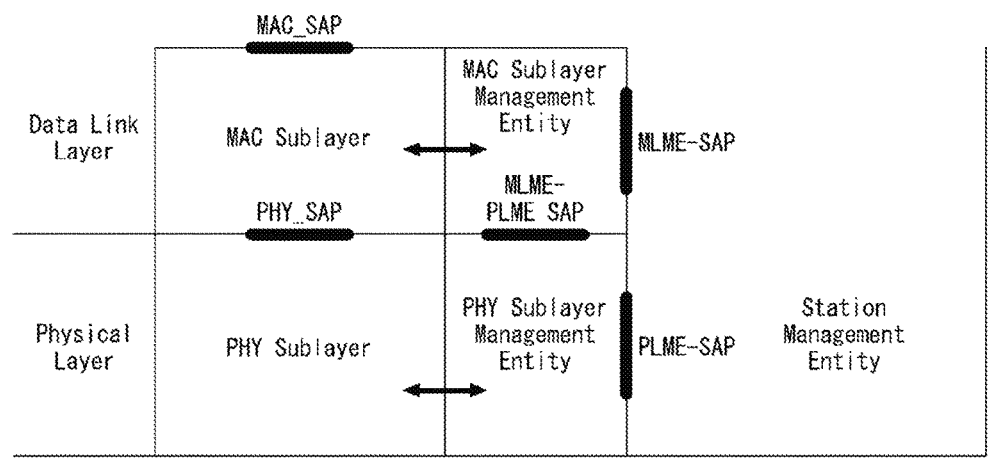

[FIG. 3]
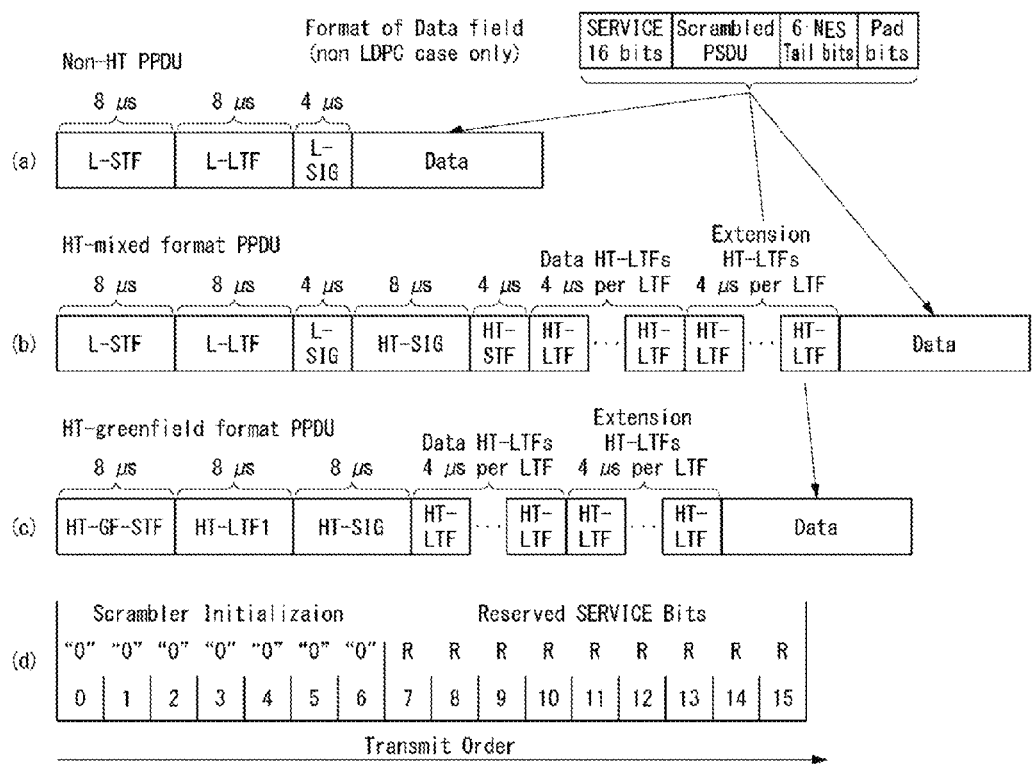
[FIG. 4]
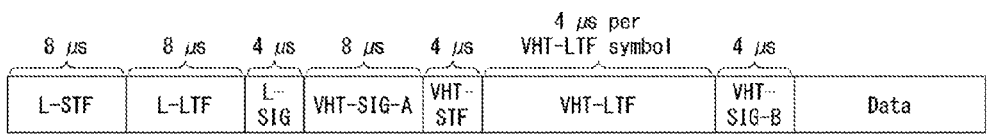

[FIG. 5]
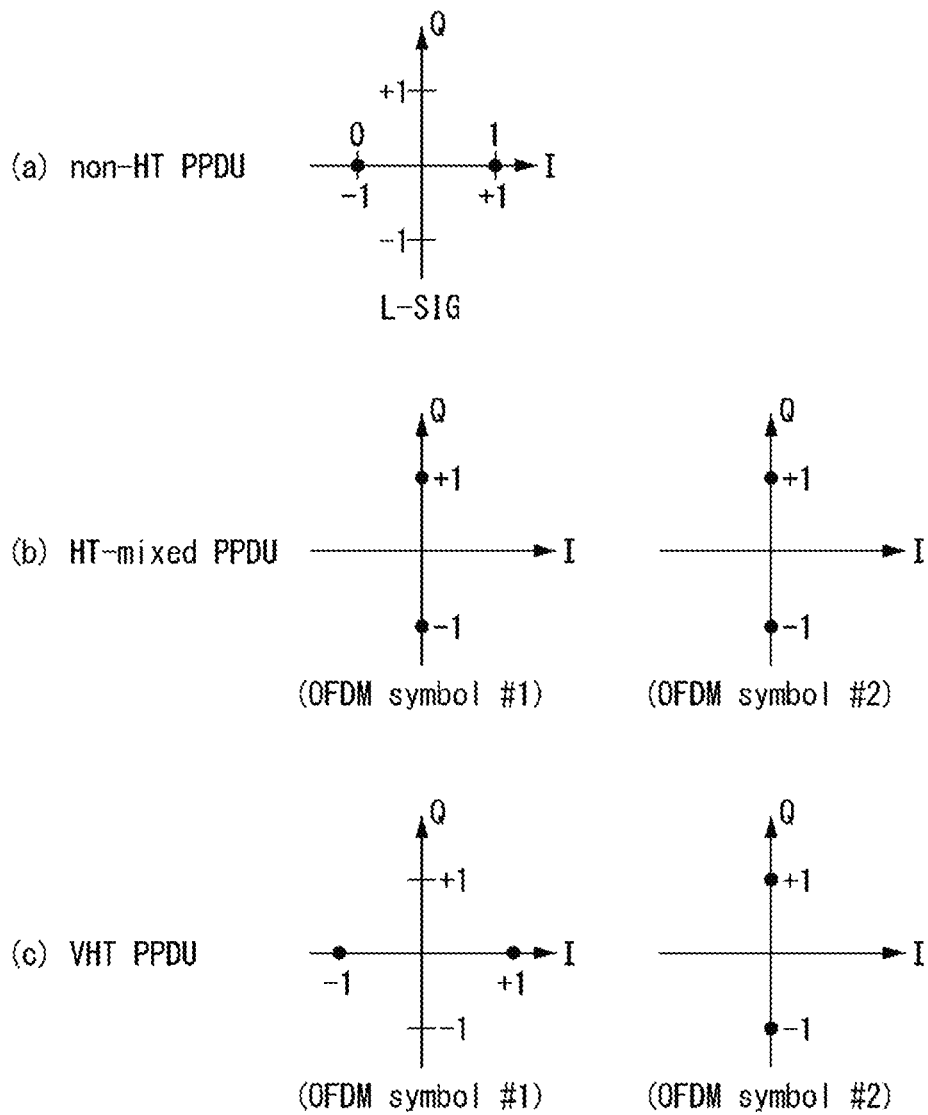

[FIG. 6]
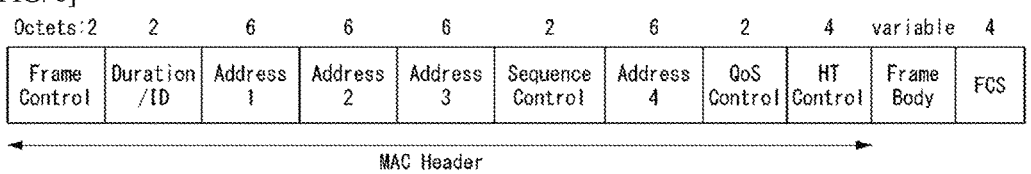
[FIG. 7]
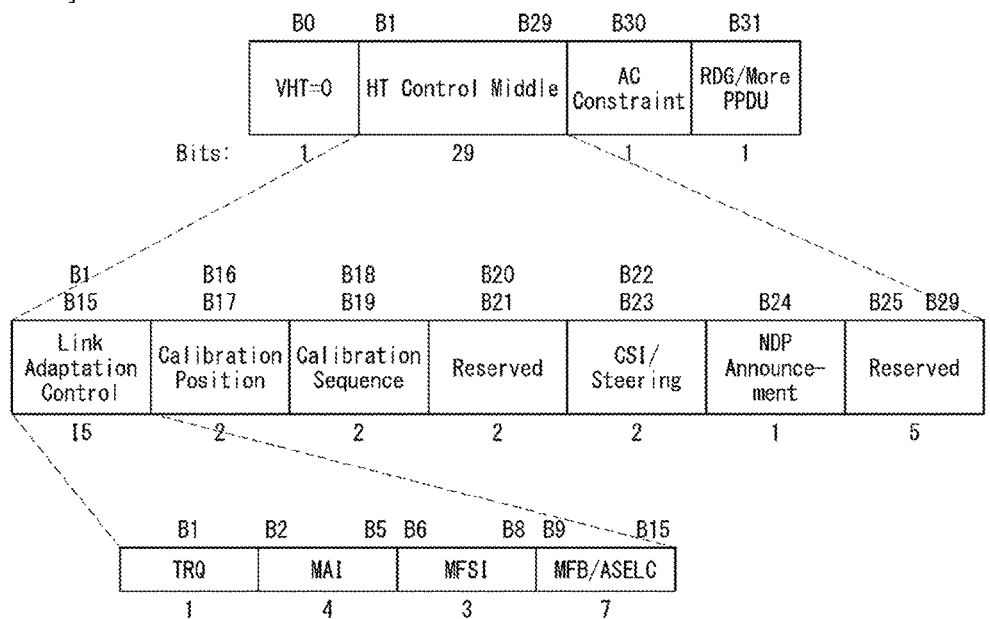

[FIG. 8]
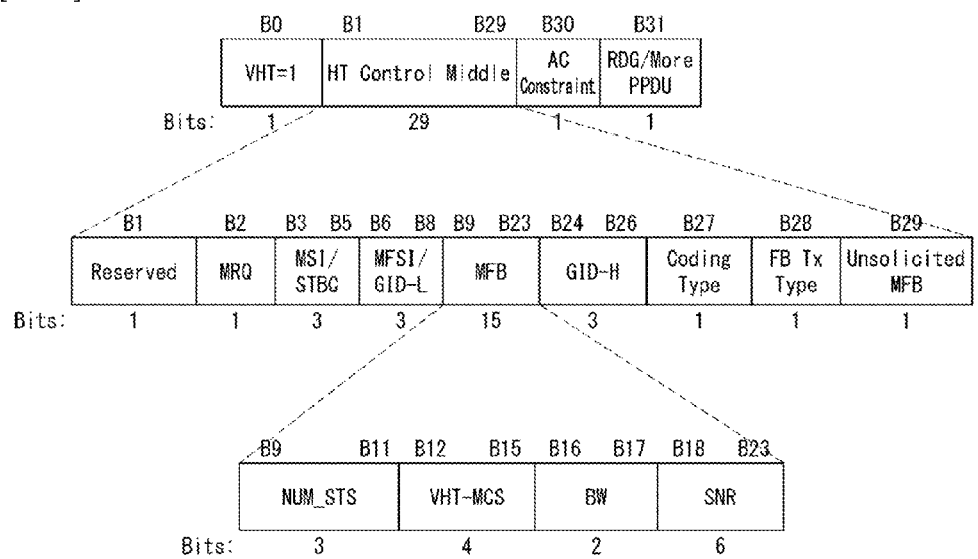

[FIG. 9]
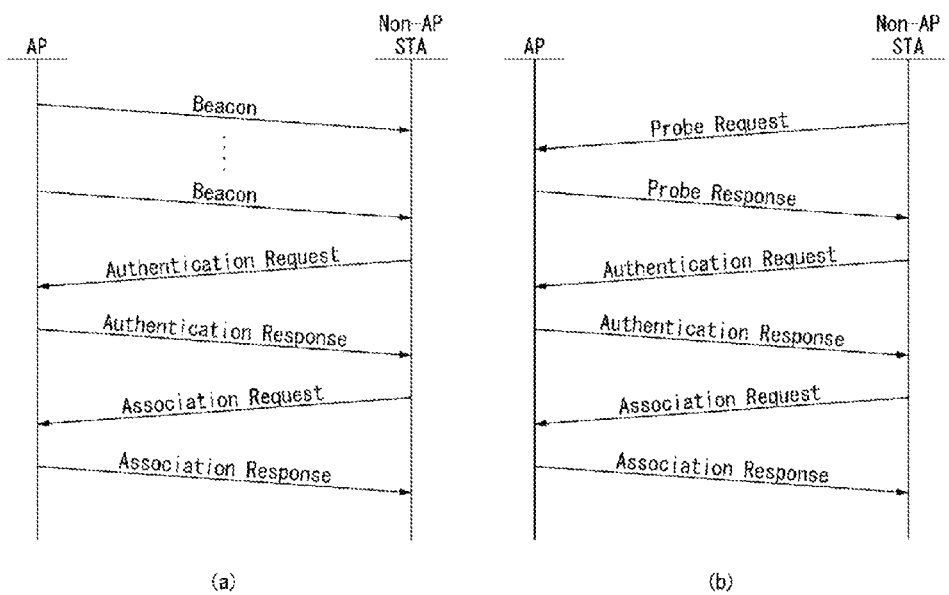

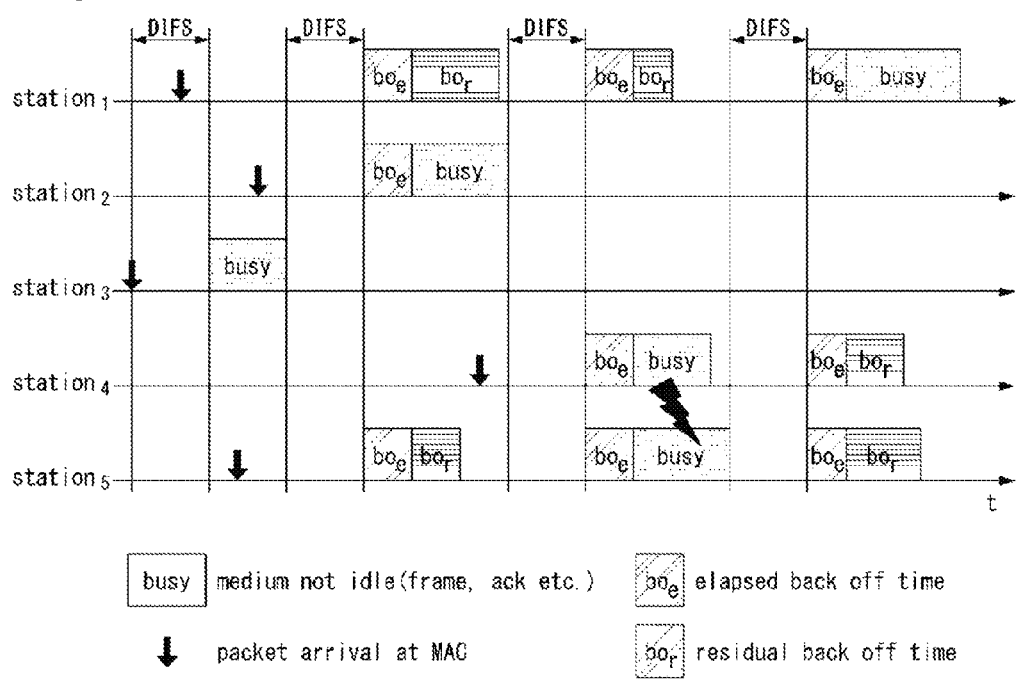
[FIG. 10]

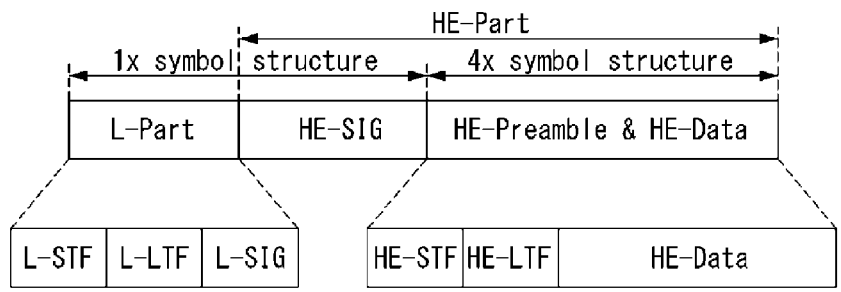

[FIG. 14]
| L-STF | L-LTF | L-SIG | HE-SIG A | HE-SIG B | HE-STF | HE-LTF | Data for STA1 |
| L-STF | L-LTF | L-SIG | HE-SIG A | HE-SIG B | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A | HE-SIG B | HE-STF | HE-LTF | Data for STA4 |
[FIG. 15]
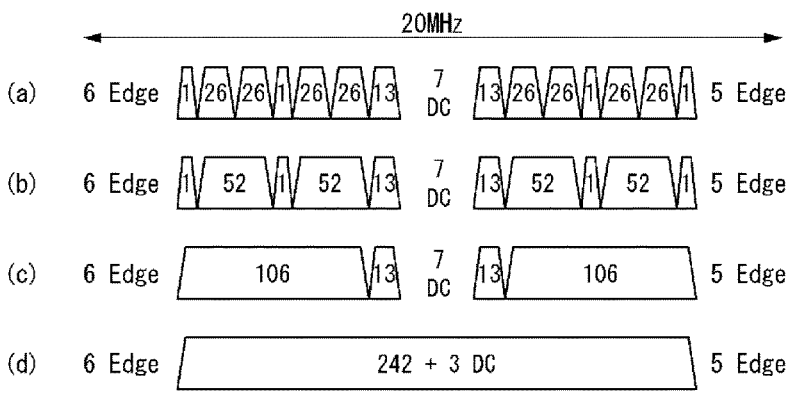

[FIG. 16]
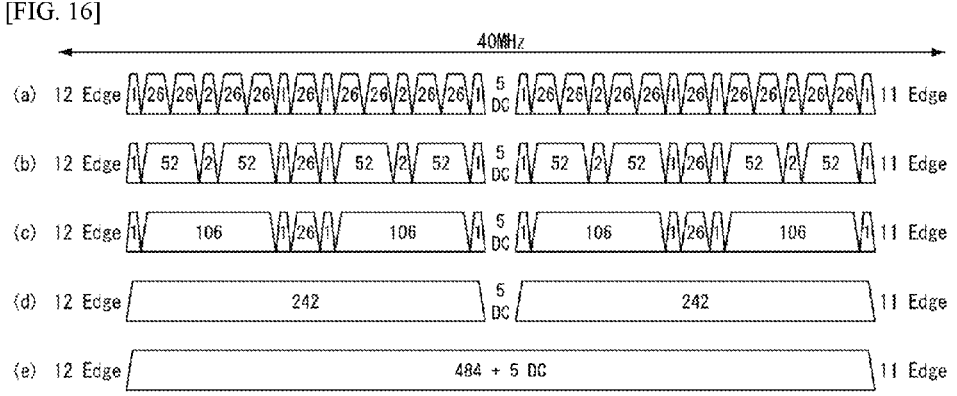

[FIG. 17]
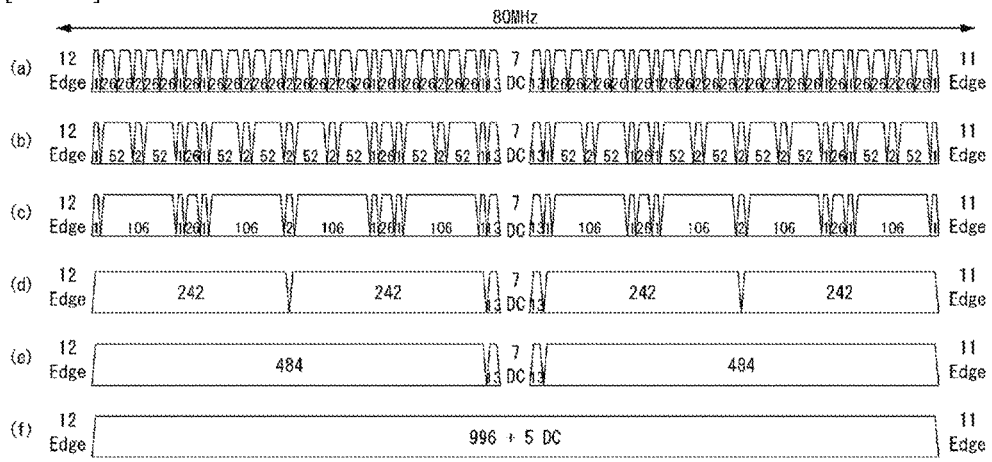
[FIG. 18]
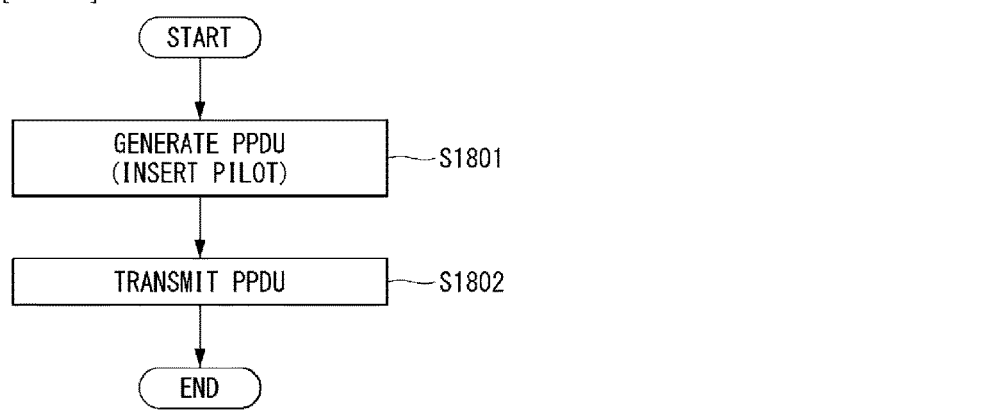

[FIG. 19]
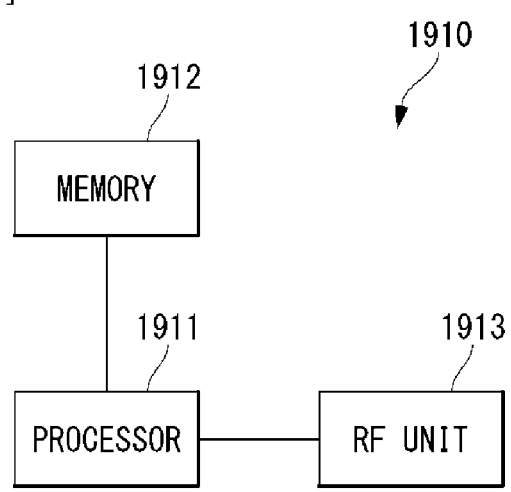

METHOD FOR TRANSRECEIVING PPDU IN WIRELESS COMMUNICATION SYSTEM AND DEVICE FOR SAME

CROSS-REFERENCE TO RELATED APPLICATIONS

This application is the National Stage filing under 35 U.S.C. 371 of International Application No. PCT/KR2015/011642, filed on Nov. 2, 2015, which claims the benefit of U.S. Provisional Application No. 62/073,027, filed on Oct. 31, 2014, 62/077,850, filed on Nov. 10, 2014 and 62/221,110, filed on Sep. 21, 2015, the contents of which are all hereby incorporated by reference herein in their entirety.

TECHNICAL FIELD

The present invention relates to wireless communication systems, and more particularly, to a method for transmitting and receiving single-user (SU) or multi-user (MU) Physical Protocol Data Unit (PPDU) and an apparatus for supporting the same.

BACKGROUND ART

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

DISCLOSURE

Technical Problem

An object of the present invention is to propose a method for effectively enhancing efficiency of a system by reducing overhead of a preamble and a PLCP header of a WLAN system in the related art and designing an efficient PPDU transmission structure.

Further, another object of the present invention is to propose an efficient pilot design (alternatively, mapping) method applicable to a new frame structure and numerology defined in a next-generation WLAN system.

In addition, yet another object of the present invention is to propose a method for transmitting and receiving a physical protocol data unit (PPDU) to which a traveling pilot is mapped.

The technical objects of the present invention are not limited to the aforementioned technical objects, and other technical objects, which are not mentioned above, will be apparently appreciated by a person having ordinary skill in the art from the following description.

Technical Solution

In an aspect of the present invention, a method for transmitting a physical protocol data unit (PPDU) by a wireless communication apparatus in a wireless communication system, includes: generating the PPDU including a legacy preamble, an HE preamble, and a data field; and transmitting the generated PPDU, wherein pilot patterns are defined, of which a minimum integer number which is not smaller than a value acquired by dividing the total number of subcarriers constituting the data field or a Fast Fourier Transform (FFT) size value used for generating the PPDU by the total number of pilots, a predetermined pilot pattern among the pilot patterns is allocated for each symbol of the data field, and an index of a subcarrier to which the pilot is mapped is determined by the pilot pattern.

In another aspect of the present invention, an apparatus for transmitting a physical protocol data unit (PPDU) in a wireless communication system, includes: a radio frequency (RF) unit for transmitting and receiving a radio signal; and a processor controlling the RF unit, wherein the processor is configured to generate the PPDU including a legacy preamble, an HE preamble, and a data field, and transmit the generated PPDU, pilot patterns are defined, of which a minimum integer number which is not smaller than a value acquired by dividing the total number of subcarriers constituting the data field or a Fast Fourier Transform (FFT) size value used for generating the PPDU by the total number of pilots, a predetermined pilot pattern among the pilot patterns is allocated for each symbol of the data field, and an index of a subcarrier to which the pilot is mapped is determined by the pilot pattern.

Preferably, the pilot may be mapped with same subcarrier spacing between adjacent pilots except for a pilot which is closet to a direct current (DC) subcarrier among all pilots.

Preferably, subcarrier spacing may be a minimum integer value which is not smaller than the value acquired by dividing the total number of subcarriers constituting the data field or the Fast Fourier Transform (FFT) size value used for generating the PPDU by the total number of pilots.

Preferably, the position of the pilot mapped to a left side of the direct current (DC) subcarrier and the position of the pilot mapped to a right side of the DC subcarrier may be mirrored.

Preferably, the pilot may be mapped with same subcarrier spacing between adjacent pilots except for a pilot which is furthest from to the direct current (DC) subcarrier among all pilots.

Preferably, the subcarrier spacing may be the minimum integer value which is not smaller than the value acquired by dividing the total number of subcarriers constituting the data field or the Fast Fourier Transform (FFT) size value used for generating the PPDU by the total number of pilots.

Preferably, a pilot having the largest pilot index in the pilot pattern may be mapped to the left side or the right side of the DC subcarrier according to a comparison result of the number of pilots mapped to the left side of the DC subcarrier and the number of pilots mapped to the right side of the DC subcarrier.

Preferably, pilot pattern may be allocated in an order in which an index of the pilot pattern increases or be allocated in a predetermined order, for each symbol of the data field in an order in which the symbol index of the data field increases.

Preferably, when the PPDU is transmitted through a plurality of streams, the pilot patterns defined with respect to a single stream may be identically used or only some of the pilot patterns may be used.

Preferably, when the PPDU bandwidth is 40 MHz, the pilot patterns defined with respect to 20 MHz may be duplicated per 20 MHz, when the PPDU bandwidth is 80 MHz, the pilot patterns defined with respect to 40 MHz may be duplicated per 40 MHz, and when the PPDU bandwidth is 160 MHz, the pilot patterns defined with respect to 80 MHz may be duplicated per 80 MHz.

Preferably, the data field may be mapped to 26 subcarriers, 52 subcarriers, 105 subcarriers, 242 subcarriers, 484 subcarriers, or 996 subcarriers in a frequency domain and the PPDU is transmitted by an orthogonal frequency division multiple access (OFDMA) scheme.

Preferably, the pilot may be mapped to data subcarriers other than the direct current (DC) subcarrier and a guard subcarrier among all subcarriers constituting the data field.

Advantageous Effects

According to an embodiment of the present invention, a pilot can be designed, which is suitable for a new frame structure and numerology defined in a next-generation WLAN system.

Further, according to the embodiment of the present invention, performance of channel estimation at a receiver can be enhanced and robust transmission can be supported outdoors.

Effects which can be obtained in the present invention are not limited to the aforementioned effects and other unmentioned effects will be clearly understood by those skilled in the art from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 is a diagram illustrating an example of IEEE 802.11 system to which the present invention may be applied.

FIG. 2 is a diagram exemplifying a structure of layer architecture in IEEE 802.11 system to which the present invention may be applied.

FIG. 3 exemplifies a non-HT format PPDU and an HT format PPDU of a wireless communication system to which the present invention may be applied.

FIG. 4 exemplifies a VHT format PPDU of a wireless communication system to which the present invention may be applied.

FIG. 5 is a diagram exemplifying a constellation for distinguishing a format of PPDU in a wireless communication system to which the present invention may be applied.

FIG. 6 exemplifies a MAC frame format in IEEE 802.11 system to which the present invention may be applied.

FIG. 7 exemplifies an HT format of an HT Control field in a wireless communication system to which the present invention may be applied.

FIG. 8 exemplifies a VHT format of an HT Control field in a wireless communication system to which the present invention may be applied.

FIG. 9 is a diagram for describing a general link setup procedure in a wireless communication system to which the present invention may be applied.

FIG. 10 is a diagram for describing an arbitrary backoff period and a frame transmission procedure in a wireless communication system to which the present invention may be applied.

FIGS. 11 to 14 are a diagram exemplifying a High Efficiency (HE) format PPDU according to an embodiment of the present invention.

FIGS. 15 to 17 are diagrams illustrating a resource allocation unit in an OFDMA multi-user transmission scheme according to an embodiment of the present invention.

FIG. 18 is a diagram illustrating a method for transmitting and receiving a PPDU according to an embodiment of the present invention.

FIG. 19 is a block diagram illustrating a wireless apparatus according to an embodiment of the present invention.

MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Specific terminologies used in the description below may be provided to help the understanding of the present invention. And, the specific terminology may be modified into other forms within the scope of the technical concept of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, IEEE 802.11 is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

FIG. 2 is a diagram exemplifying a structure of layer architecture in IEEE 802.11 system to which the present invention may be applied.

Referring to FIG. 2, the layer architecture in the IEEE 802.11 system may include Medium Access Control (MAC) sublayer/layer and PHY sublayer/layer.

The PHY may be divided into a Physical Layer Convergence Procedure (PLCP) entity and a Physical Medium Dependent (PMD) entity. In this case, the PLCP entity performs a role of connecting the MAC and a data frame, and the PMD entity performs a role of wirelessly transmitting and receiving data with two or more STAs.

Both of the MAC and the PHY may include management entities, and each of them may be referred to MAC Sublayer Management Entity (MLME) and Physical Sublayer Management Entity (PLME), respectively. These management entities provide a layer management service interface through an operation of layer management function. The MLME may be connected to the PLME, and perform a management operation of MAC, and similarly, the PLME may be connected to the MLME, and perform a management operation of PHY.

In order to provide an accurate MAC operation, a Station Management Entity (SME) may be existed in each STA. The SME is a management entity independent from each layer, and collects layer based state information from the MLME and the PLME or configures a specific parameter value of each layer. The SME may perform such a function by substituting general system management entities, and may implement a standard management protocol.

The MLME, the PLME and the SME may interact in various methods based on a primitive. Particularly, XX-GET.request primitive is used for requesting a Management Information Base (MIB) attribute value. XX-GET.confirm primitive returns the corresponding MIB attribute value when the state of it is in 'SUCCESS', otherwise, returns a state field with an error mark. XX-SET.request primitive is used for requesting to configure a designated MIB attribute to a given value. When the MIB attribute signifies a specific operation, the request requests an execution of the specific operation. And, when a state of XX-SET.request primitive is in 'SUCCESS', this means that the designated MIB attribute is configured as the requested value. When the MIB attribute signifies a specific operation, the primitive is able to verify that the corresponding operation is performed.

PHY provides an interface to MAC through TXVECTOR, RXVECTOR and PHYCONFIG_VECTOR. The TXVECTOR supports a transmission parameter to PHY for each PPDU. By using the RXVECTOR, PHY notifies the received PPDU parameter to MAC. The TXVECTOR is delivered to PHY from MAC through PHY-TXSTART.request primitive, and the RXVECTOR is delivered to MAC from PHY through PHY-RXSTART.indication primitive.

By using the PHYCONFIG_VECTOR, MAC configures an operation of PHY regardless of transmission and reception of frame.

The operation in each sublayer (or layer) will be briefly described as follows.

MAC generates one or more MAC Protocol Data Unit (MPDU) by attaching a MAC header and Frame Check Sequence (FCS) to a MAC Service Data Unit (MSDU) delivered from a higher layer (e.g., LLC) or a fragment of the MSDU. The generated MPDU is delivered to PHY.

When an aggregated MSDU (A-MSDU) scheme is used, a plurality of MSDUs may be merged into one A-MSDU. The MSDU merging operation may be performed in a MAC higher layer. The A-MSDU is delivered to PHY as a single MPDU (i.e., not being fragmented).

PHY generates a Physical Protocol Data Unit (PPDU) by attaching an additional field that includes required information to a Physical Service Data Unit (PSDU) received from MAC by a physical layer transceiver. The PPDU is transmitted through a wireless medium.

Since the PSDU is a unit that PHY receives from MAC and MPDU is a unit that MAC transmits to PHY, the PSDU is the same as the MPDU, substantially.

When an aggregated MPDU (A-MPDU) scheme is used, a plurality of MPDUs (in this case, each MPDU may carry the A-MPDU) may be merged into a single A-MPDU. The MPDU merging operation may be performed in a MAC lower layer. Various types of MPDU (e.g., QoS data, Acknowledge (ACK), block ACK, etc.) may be merged into the A-MPDU. PHY receives the A-MPDU from MAC as a single PSDU. That is, the PSDU includes a plurality of MPDUs. Accordingly, the A-MPDU is transmitted through a wireless medium within a single PPDU.

Physical Protocol Data Unit (PPDU) Format

A Physical Protocol Data Unit (PPDU) signifies a data block which is generated in physical layer. Hereinafter, the PPDU format will be described based on IEEE 802.11 WLAN system to which the present invention may be applied.

FIG. 3 exemplifies a non-HT format PPDU and an HT format PPDU of a wireless communication system to which the present invention may be applied.

FIG. 3(a) exemplifies the non-HT format for supporting IEEE 802.11a/g system. The non-HT PPDU may also be called a legacy PPDU.

Referring to FIG. 3(a), the non-HT format PPDU includes a legacy format preamble that includes a Legacy (or Non-HT) Short Training field (L-STF), a Legacy (or Non-HT) Long Training field (L-LTF) and a Legacy (or Non-HT) SIGNAL (L-SIG) field, and a data field.

The L-STF may include a short training orthogonal frequency division multiplexing (OFDM) symbol. The L-STF may be used for frame timing acquisition, Automatic Gain Control (AGC), diversity detection and coarse frequency/time synchronization.

The L-LTF may include a long training orthogonal frequency division multiplexing (OFDM) symbol. The L-LTF may be used for fine frequency/time synchronization and channel estimation.

The L-SIG field may be used for transmitting control information for demodulating and decoding a data field. The L-SIG field may include information on a data rate and a data length.

FIG. 3(b) exemplifies an HT-mixed format PPDU for supporting both IEEE 802.11n system and IEEE 802.11a/g system.

Referring to FIG. 3(b), the HT-mixed format PPDU includes an HT format preamble that includes a legacy format preamble including the L-STF, the L-LTF and the L-SIG field, an HT-Signal (HT-SIG) field, an HT Short Training field (HT-STF) and an HT Long Training field (HT-LTF), and a data field.

Since the L-STF, the L-LTF and the L-SIG field signify legacy fields for backward compatibility, the fields from the L-STF to the L-SIG field are identical to those of the non-HT format. The L-STA may interpret a data field through the L-STF, the L-LTF and the L-SIG field even though the L-STA receives a HT-mixed PPDU. However, the L-LTF may further include information for channel estimation such that an HT-STA receives the HT-mixed PPDU and demodulates the L-SIG field and the HT-SIG field.

The HT-STA may notice that the field behind the legacy field is the HT-mixed format PPDU using the HT-SIG field, and based on this, the HT-STA may decode the data field.

The HT-LTF field may be used for channel estimation for demodulating the data field. Since IEEE 802.11n standard supports Single-User Multi-Input and Multi-Output (SU-MIMO), a plurality of the HT-LTF fields may be included for the channel estimation with respect to each data field transmitted via a plurality of spatial streams.

The HT-LTF field may include a data HT-LTF used for channel estimation with respect to spatial stream and an extension HT-LTF additionally used for full channel sounding. Accordingly, the number of a plurality of HT-LTF may be equal to or more than the number of transmitted spatial stream.

In the HT-mixed format PPDU, the L-STF, the L-LTF and the L-SIG field are firstly transmitted such that an L-STA also receives and acquires data. Later, the HT-SIG field is transmitted for demodulating and decoding the data transmitted for the HT-STA.

Up to the HT-SIG field, fields are transmitted without performing beamforming such that the L-STA and the HT-STA receive the corresponding PPDU and acquire data, and wireless signal transmission is performed through precoding for the HT-STF, the HT-LTF and the data field, which are transmitted later. Herein, the plurality of HT-LTF and the data field are transmitted after transmitting the HT-STF such that the STA that receives data through precoding may consider the part in which power is varied by precoding.

FIG. 3(c) exemplifies an HT-greenfield (HT-GF) format PPDU for supporting IEEE 802.11n system only.

Referring to FIG. 3(c), the HT-GF format PPDU includes an HT-GF-STF, an HT-LTF1, an HT-SIG field, a plurality of HT-LTF2 and a data field.

The HT-GF-STF is used for frame time acquisition and AGC.

The HT-LTF1 is used for channel estimation.

The HT-SIG field is used for demodulating and decoding the data field.

The HT-LTF2 is used for channel estimation for demodulating the data field. Similarly, since the HT-STA requires channel estimation for each data field transmitted via a plurality of spatial streams due to the use of SU-MIMO, a plurality of HT-LTF2 may be included.

The plurality of HT-LTF2 may include a plurality of DATA HT-LTF and a plurality of extension HT-LTF, similar to the HT-LTF field of the HT-mixed PPDU.

In FIGS. 3(a) to 3(c), the data field is a payload, and the data field may include a SERVICE field, a scrambled PSDU field, Tail bits, and padding bits. All bits of the data field are scrambled.

FIG. 3(d) illustrates a SERVICE field included in the data field. The SERVICE field has 16 bits. Each bit is placed from number 0 to 15, and sequentially transmitted from number 0 bit. 0 to 6 numbered bits are set to zero, and are used for synchronizing descrambler within a receiver terminal.

In order to effectively utilize radio channels, IEEE 802.11ac WLAN system supports a transmission of downlink Multi User Multiple Input Multiple Output (MU-MIMO) scheme in which a plurality of STAs access channel simultaneously. According to the MU-MIMO transmission scheme, an AP may transmit packets to one or more STAs that are paired by MIMO simultaneously.

A downlink multi-user (DL MU) transmission means a technique that an AP transmits a PPDU to a plurality of non-AP STAs through the same time resource through one or more antennas.

Hereinafter, the MU PPDU means a PPDU that transmits one or more PSDUs for one or more STAs using the MU-MIMO technique or the OFDMA technique. And the SU PPDU means a PPDU which is available to deliver only one PSDU or a PPDU that has a format in which the PSDU is not existed.

For the MU-MIMO transmission, the size of the control information transmitted to an STA may be relatively greater than that of the control information based on 802.11n. Examples of the control information additionally required for supporting the MU-MIMO may include information indicating the number of spatial stream received by each STA, the information related to modulating and coding the data transmitted to each STA, and the like.

Accordingly, when the MU-MIMO transmission is performed for providing data service to a plurality of STAs simultaneously, the size of transmitted control information may increase as the number of STAs that receive the control information.

As such, in order to effectively transmit the increasing size of the control information, a plurality of control information required for the MU-MIMO transmission may be transmitted by being classified into common control information commonly required for all STAs and dedicated control information individually required for a specific STA.

FIG. 4 exemplifies a VHT format PPDU of a wireless communication system to which the present invention may be applied.

Referring to FIG. 4, the VHT format PPDU includes a legacy format preamble that includes the L-STF, the L-LTF and the L-SIG field and a VHT format preamble that includes a VHT-Signal-A (VHT-SIG-A) field, a VHT Short Training field (VHT-STF), a VHT Long Training field (VHT-LTF) and a VHT-Signal-B (VHT-SIG-B) field and a data field.

Since the L-STF, the L-LTF and the L-SIG field signify legacy fields for backward compatibility, the fields from the L-STF to the L-SIG field are identical to those of the non-HT format. However, the L-LTF may further include information for channel estimation to be performed to demodulate the L-SIG field and the VHT-SIG-A field.

The L-STF, the L-LTF, the L-SIG field and the VHT-SIG-A field may be repeatedly transmitted in a unit of 20 MHz channel. For example, when a PPDU is transmitted through four 20 MHz channels (i.e., 80 MHz bandwidth), the L-STF, the L-LTF, the L-SIG field and the VHT-SIG-A field may be repeatedly transmitted in every 20 MHz channel.

The VHT-STA may be aware whether the PPDU is the VHT format PPDU using the VHT-SIG-A field which follows the legacy field, and based on this, the VHT-STA may decode the data field.

In the VHT format PPDU, the L-STF, the L-LTF and the L-SIG field are firstly transmitted such that an L-STA also receives and acquires data. Later, the VHT-SIG-A field is transmitted for demodulating and decoding the data transmitted for the VHT-STA.

The VHT-SIG-A field is a field for transmitting common control information between VHT STAs paired with an AP in MIMO scheme, and includes the control information for interpreting the received VHT format PPDU.

The VHT-SIG-A field may include a VHT-SIG-A1 field and a VHT-SIG-A2 field.

The VHT-SIG-A1 field may include channel bandwidth (BW) information to use, information on whether to apply Space Time Block Coding (STBC), Group Identifier (Group ID) information for indicating a group of STAs that are grouped in MU-MIMO scheme, information of the Number of space-time stream (NSTS) to use/Partial association Identifier (AID) and Transmit power save forbidden information. Herein, the Group ID may signify an identifier allocated to an STA group which is to be transmitted for supporting MU-MIMO transmission, and may represent whether the currently used MIMO transmission scheme is MU-MIMO or SU-MIMO.

Table 1 below exemplifies the VHT-SIG-A1 field.

TABLE 1

| Field | Bit | Description |
|---|---|---|
| BW | 2 | In the case of 20 MHz, set to '0', In the case of 40 MHz, set to '1', In the case of 80 MHz, set to '2', In the case of 160 MHz or 80 + 80 MHz, set to '3'. |
| Reserved | 1 | |
| STBC | 1 | In the case of VHT SU PPDU: In the case that STBC is used, set to '1', Otherwise, set to '0' In the case of VHT MU PPDU: Set to '0' |
| Group ID | 6 | Indicate Group ID '0' or '63' indicates VHT SU PPDU, otherwise indicates VHT MU PPDU |
| NSTS/Partial AID | 12 | In the case of VHT MU PPDU, divided by 4 user position 'p' each having 3 bits In the case that space time stream is 0, set to '0', In the case that space time stream is 1, set to '1', In the case that space time stream is 2, set to '2', In the case that space time stream is 3, set to '3', In the case that space time stream is 4, set to '4'. In the case of VHT SU PPDU, Top 3 bits are set as follows. In the case that space time stream is 1, set to '0', In the case that space time stream is 2, set to '1', |

TABLE 1-continued

| Field | Bit | Description |
|---|---|---|
| | | In the case that space time stream is 3, set to '2', |
| | | In the case that space time stream is 4, set to '3', |
| | | In the case that space time stream is 5, set to '4', |
| | | In the case that space time stream is 6, set to '5', |
| | | In the case that space time stream is 7, set to '6', |
| | | In the case that space time stream is 8, set to '7', |
| | | Bottom 9 bits indicate Partial AID. |
| TXOP_PS_NOT_ALLOWED | 1 | When a VHT AP allows non-AP VHT STA shifted to a power save mode for transmission opportunity (TXOP), set to '0'. Otherwise, set to '1'. In the case of a VHT PPDU transmitted by non-AP VHT STA, set to '1'. |
| Reserved | 1 | |

The VHT-SIG-A2 field may include information on whether to use a short Guard Interval (GI), Forward Error Correction (FEC) information, information on Modulation and Coding Scheme (MCS) for a single user, information on types of channel coding for a plurality of users, beamforming related information, redundancy bits for Cyclic Redundancy Checking (CRC), a tail bit of convolutional decoder, and the like.

Table 2 below exemplifies the VHT-SIG-A2 field.

TABLE 2

| Field | Bit | Description |
|---|---|---|
| Short GI | 1 | In the case that short GI is not used in a data field, set to '0', In the case that short GI is used in a data field, set to '1'. |
| Short GI disambiguation | 1 | In the case that short GI is used and an additional symbol is required for a payload of PPDU, set to '1', In the case that an additional symbol is not required, set to '0'. |
| SU/MU Coding | 1 | In the case of VHT SU PPDU: In the case of BCC(binary convolutional code), set to '0', In the case of LDPC (low-density parity check), set to '1'. In the case of VHT MU PPDU: In the case that NSTS field of which user position is '0' is not '0', indicates coding to use. In the case of BCC, set to '0', In the case of LDPC, set to '1'. In the case that NSTS field of which user position is '0' is '0', set to '1' as a reserved field. |
| LDPC Extra OFDM Symbol | 1 | In the case that an additional extra OFDM symbol is required owing to LDPC PPDU encoding procedure (in the case of SU PPDU) or PPDU encoding procedure of at least one LDPC user (in the case of VHT MU PPDU), set to '1'. Otherwise, set to '0'. |
| SU VHT MCS/MU Coding | 4 | In the case of VHT SU PPDU: Represents VHT-MCS index. In the case of VHT MU PPDU: Indicates coding for user positions '1' to '3' in an order of ascending order from top bit. In the case that NSTS field of each user is not '1', indicates coding to use. In the case of BCC, set to '0', In the case of LDPC, set to '1'. In the case that NSTS field of each user is '0', set to '1' as a reserved field. |
| Beamformed | 1 | In the case of VHT SU PPDU: In the case that Beamforming steering matrix is applied to SU transmission, set to '1'. Otherwise, set to '0' In the case of VHT MU PPDU: Set to '1' as a reserved field. |
| Reserved | 1 | |
| CRC | 8 | Include CRC for detecting error of PPDU in receiver |
| Tail | 6 | Used for trellis end of convolutional decoder Set to '0'. |

The VHT-STF is used for improving the performance of AGC estimation in MIMO transmission. The VHT-STF field duration is 4 µs.

The VHT-LTF is used for a VHT-STA to estimate a MIMO channel. Since a VHT WLAN system support the MU-MIMO, the VHT-LTF may be setup as much as the number of spatial streams through which a PPDU is transmitted. Additionally, in the case that full channel sounding is supported, the number of VHT-LTFs may increase.

The VHT-SIG-B field includes dedicated control information required to acquire data for a plurality of VHT-STAs paired in MU-MIMO scheme by receiving a PPDU. Accordingly, only in the case that the common control information included in the VHT-SIG-A field indicates a MU-MIMO transmission by a PPDU which is currently received, a VHT-STA may be designed to decode the VHT-SIG-B field. On the contrary, in the case that the common control information indicates that a PPDU currently received is for a single VHT-STA (including SU-MIMO), an STA may be designed not to decode the VHT-SIG-B field.

The VHT-SIG-B field includes information on modulation, encoding and rate-matching of each of the VHT-STAs. A size of the VHT-SIG-B field may be different depending on types of MIMO transmission (MU-MIMO or SU-MIMO) and channel bandwidths which are used for PPDU transmissions.

In order to transmit PPDUs of the same size to STAs paired with an AP in a system that supports the MU-MIMO, information indicating a bit size of a data field that configures the PPDU and/or information indicating a bit stream size that configures a specific field may be included in the VHT-SIG-A field.

However, in order to efficiently use the PPDU format, the L-SIG field may be used. In order for the PPDUs of the same size to be transmitted to all STAs, a length field and a rate field transmitted with being included in the L-SIG field may be used for providing required information. In this case, since a MAC Protocol Data Unit (MPDU) and/or an Aggregate MAC Protocol Data Unit (A-MPDU) are configured based on bytes (or octet (oct)) of the MAC layer, an additional padding may be required in the physical layer.

The data field in FIG. 4 is a payload, and may include a SERVICE field, a scrambled PSDU, tail bits and padding bits.

As such, since several formats of PPDU are used in a mixed manner, an STA should be able to distinguish a format of received PPDU.

Herein, the meaning of distinguishing PPDU (or classifying the format of PPDU) may have various meanings. For example, the meaning of distinguishing PPDU may have a meaning of determining whether the received PPDU is a PPDU that is available to be decoded (or interpreted) by an STA. In addition, the meaning of distinguishing PPDU may have a meaning of determining whether the received PPDU is a PPDU that is available to be supported by an STA. Further, the meaning of distinguishing PPDU may be interpreted as a meaning of classifying what the information is that is transmitted through the received PPDU.

This will be described in more detail by reference to the drawing below.

FIG. 5 is a diagram exemplifying a constellation for distinguishing a format of PPDU in a wireless communication system to which the present invention may be applied.

FIG. 5(a) exemplifies a constellation of an L-SIG field included in a non-HT format PPDU and FIG. 5(b) exemplifies a phase rotation for detecting an HT-mixed format PPDU. And FIG. 5(c) exemplifies a phase rotation for detecting a VHT format PPDU.

In order for an STA to distinguish the non-HT format PPDU, the HT-GF format PPDU, the HT-mixed format PPDU and the VHT format PPDU, a phase of constellation of the L-SIG field and the OFDM symbol transmitted after the L-SIG field are used. That is, the STA may classify a PPDU format based on the phase of constellation of the L-SIG field and the OFDM symbol transmitted after the L-SIG field.

Referring to FIG. 5(a), the OFDM symbol that configures the L-SIG field utilizes Binary Phase Shift Keying (BPSK).

First, in order to distinguish the HT-GF format PPDU, when an initial SIG field is detected in a received PPDU, an STA determines whether the SIG field is the L-SIG field. That is, the STA tries to decode based on the constellation example shown in FIG. 5(a). When the STA fail to decode, it may be determined that the corresponding PPDU is the HT-GF format PPDU.

Next, in order to classify the non-HT format PPDU, the HT-mixed format PPDU and the VHT format PPDU, the phase of constellation of the OFDM symbol transmitted after the L-SIG field may be used. That is, the modulation method of the OFDM symbol transmitted after the L-SIG field may be different, and the STA may classify the PPDU formats based on the modulation method for the field after the L-SIG field of the received PPDU.

Referring to FIG. 5(b), in order to distinguish the HT-mixed format PPDU, the phase of two OFDM symbols transmitted after the L-SIG field in the HT-mixed format PPDU may be used.

More particularly, the phases of both OFDM symbol #1 and OFDM symbol #2 that correspond to the HT-SIG field transmitted after the L-SIG field in the HT-mixed format PPDU rotate as much as 90 degrees in counter-clock wise direction. That is, the modulation method for OFDM symbol #1 and OFDM symbol #2 uses Quadrature Binary Phase Shift Keying (QBPSK). The QBPSK constellation may be a constellation of which phase rotates as much as 90 degrees in counter-clock wise direction with respect to the BPSK constellation.

An STA tries to decode OFDM symbol #1 and OFDM symbol #2 that correspond to the HT-SIG field transmitted after the L-SIG field of the received PPDU based on the constellation example shown in FIG. 5(b). When the STA is successful in decoding, the STA determines the corresponding PPDU to be the HT format PPDU.

Next, in order to distinguish the non-HT format PPDU and the VHT format PPDU, the phase of constellation of the OFDM symbol transmitted after the L-SIG field may be used.

Referring to FIG. 5(c), in order to distinguish the VHT format PPDU, the phases of two OFDM symbols transmitted after the L-SIG field in the VHT format PPDU may be used.

More particularly, the phase of OFDM symbol #1 that corresponds to the VHT-SIG-A field after the L-SIG field in the VHT format PPDU does not rotate, but the phase of OFDM symbol #2 rotates as much as 90 degrees in counter-clock wise direction. That is, the modulation method for OFDM symbol #1 uses the BPSK and the modulation method for OFDM symbol #2 uses the QBPSK.

An STA tries to decode OFDM symbol #1 and OFDM symbol #2 that correspond to the VHT-SIG field transmitted after the L-SIG field of the received PPDU based on the constellation example shown in FIG. 5(c). When the STA is successful in decoding, the STA may determine the corresponding PPDU to be the VHT format PPDU.

On the other hand, when the STA fails to decode, the STA may determine the corresponding PPDU to be the non-HT format PPDU.

MAC Frame Format

FIG. 6 exemplifies a MAC frame format in IEEE 802.11 system to which the present invention may be applied.

Referring to FIG. 6, a MAC frame (i.e., MPDU) includes a MAC Header, a Frame Body and a frame check sequence (FCS).

The MAC Header is defined by regions that include Frame Control field, Duration/ID field, Address 1 field, Address 2 field, Address 3 field, Sequence Control field, Address 4 field, QoS Control field and HT Control field.

The Frame Control field includes information on characteristics of the corresponding MAC frame. Detailed description for the Frame Control field will be described below.

The Duration/ID field may be implemented to have different values according to a type and a subtype of the corresponding MAC frame.

In the case that a type and a subtype of the corresponding MAC frame is a PS-Poll frame for the power save (PS) operation, the Duration/ID field may be configured to include an association identifier of the STA that transmits the frame. In other case, the Duration/ID field may be configured to have a specific duration value depending on the corresponding type and subtype of the MAC frame. In addition, in the case that the frame is an MPDU included in the aggregate-MPDU (A-MPDU) format, all of the Duration/ID fields included in the MAC header may be configured to have the same value.

Address 1 field to Address 4 field are used to indicate BSSID, source address (SA), destination address (DA), transmitting address (TA) representing an address of a transmission STA and a receiving address (RA) representing an address of a reception STA.

Meanwhile, the address field implemented as the TA field may be set to a bandwidth signaling TA value. In this case, the TA field may indicate that the corresponding MAC frame has additional information to the scrambling sequence. Although the bandwidth signaling TA may be represented as a MAC address of the STA that transmits the corresponding MAC frame, Individual/Group bit included in the MAC address may be set to a specific value (e.g., '1').

The Sequence Control field is configured to include a sequence number and a fragment number. The sequence number may indicate the number of sequence allocated to the corresponding MAC frame. The fragment number may indicate the number of each fragment of the corresponding MAC frame.

The QoS Control field includes information related to QoS. The QoS control field may be included in the case that a QoS data frame is indicated in a Subtype subfield.

The HT Control filed includes control information related to HT and/or VHT transmission and reception techniques. The HT Control field is included in Control Wrapper frame. Further, the HT Control field is existed in the QoS data frame of which Order subfield value is 1, and existed in Management frame.

The Frame Body is defined as a MAC payload, and data to be transmitted in a higher layer is located therein. And the Frame body has a variable size. For example, a maximum size of MPDU may be 11454 octets, and a maximum size of PPDU may be 5.484 ms.

The FCS is defined as a MAC footer, and used for searching an error of the MAC frame.

First three fields (the Frame Control field, the Duration/ID field and the Address 1 field) and the last field (FCS field) configure a minimum frame format, and are existed in all frames. Other fields may be existed in a specific frame type.

FIG. 7 exemplifies an HT format of an HT Control field in a wireless communication system to which the present invention may be applied.

Referring to FIG. 7, the HT Control field may include VHT subfield, HT Control Middle subfield, AC Constraint subfield and Reverse Direction Grant (RDG)/More PPDU subfield.

The VHT subfield indicates whether the HT Control field has a format of the HT Control field for the VHT (VHT=1) or a format of the HT Control field for the HT (VHT=0). In FIG. 7, it will be described by assuming that the HT Control field has the format of the HT Control field (i.e., VHT=0).

The HT Control Middle subfield may be implemented to have different formats according to the indication of the VHT subfield. Detailed description for the HT Control Middle subfield will be described below.

The AC Constraint subfield indicates whether the Access Category (AC) to which a reverse direction data (RD) frame is mapped is limited to a single AC.

The RDG/More PPDU subfield may be differently interpreted depending on whether the corresponding field is transmitted by an RD initiator or an RD responder.

When the corresponding field is transmitted by the RD initiator, in the case that the RDG is existed, the RDG/More PPDU field is set to '1', and in the case that the RDG is not existed, the RDG/More PPDU field is set to '0'. When the corresponding field is transmitted by the RD responder, in the case that the PPDU including the corresponding subfield is the last frame transmitted by the RD responder, set to '1', and in the case that another PPDU is transmitted, set to '0'.

The HT Control Middle subfield of the HT Control field for the HT may include a Link Adaptation subfield, a Calibration Position subfield, a Calibration Sequence subfield, a reserved subfield, a Channel State Information (CSI)/Steering subfield, an HT Null Data Packet Announcement (HT NDP Announcement) subfield and a reserved subfield.

The Link Adaptation subfield may include a Training request (TRQ) subfield, a Modulation and Coding Scheme (MCS) Request or Antenna Selection (ASEL) Indication (MAI) subfield, an MCS Feedback Sequence Identifier (MFSI) subfield and an MCS Feedback and Antenna Selection Command (MFB/ASELC)/data subfield.

The TRQ subfield is set to '1' in the case of requesting sounding PPDU transmitting to a responder, and set to '0' in the case of not requesting sounding PPDU transmission to a responder.

When the MAI subfield is set to 14, it indicates the Antenna Selection (ASEL) indication, and the MFB/ASELC subfield is interpreted as Antenna Selection Command/data. Otherwise, the MAI subfield indicates the MCS request, and the MFB/ASELC subfield is interpreted as the MCS feedback.

In the case that the MAI subfield indicates the MCS Request (MRQ), the MAI subfield is interpreted to include the MCS request (MRQ) and the MRQ sequence identifier (MSI). When the MCS feedback is requested, the MRQ subfield is set to '1', and when the MCS feedback is not requested, the MRQ subfield is set to '0'. When the MRQ subfield is set to '1', the MSI subfield includes a sequence number for specifying the MCS feedback request. When the MRQ subfield is set to '0', the MSI subfield is set to a reserved bit.

Each of the subfields described above corresponds to an example of subfields that may be included in the HT Control field, and may be substituted by other subfield or may further include an additional subfield.

FIG. 8 exemplifies a VHT format of an HT Control field in a wireless communication system to which the present invention may be applied.

Referring to FIG. 8, the HT Control field may include a VHT subfield, an HT Control Middle subfield, an AC Constraint subfield and a Reverse Direction Grant (RDG)/More PPDU subfield.

In FIG. 8, it will be described by assuming the HT Control field for the VHT (i.e., VHT=1). The HT Control field for the VHT may be referred to a VHT Control field.

Since the description of the AC Constraint subfield and RDG/More PPDU subfield is identical to the description of FIG. 7, the overlapped description will be omitted.

As described above, the HT Control Middle subfield may be implemented to have different formats by indication of the VHT subfield.

The HT Control Middle subfield of the HT Control field for the VHT may include a reserved bit, a Modulation and Coding Scheme (MCS) feedback request (MRQ) subfield, a MRQ Sequence Identifier (MSI) subfield/space-time block coding (STBC) subfield, an MCS feedback sequence identifier (MFSI)/Least Significant Bit (LSB) of Group ID (GID-L) subfield, an MCS Feedback (MFB) subfield, a Most Significant Bit (MSB) of Group ID (GID-H) subfield, a Coding Type subfield, a Feedback Transmission type (FB Tx Type) subfield and an Unsolicited MFB subfield.

Table 3 represents description of each subfield included in the HT Control Middle subfield of the VHT format.

TABLE 3

| Subfield | Meaning | Definition |
|---|---|---|
| MRQ | MCS request | In the case of requesting MCS feedback (solicited MFB), set to '1'. Otherwise, set to '0'. |
| MSI | MRQ sequence identifier | When Unsolicited MFB subfield is '0' and MRQ subfield is set to '1', the MSI subfield includes a sequence number in the range of 0 to 6 that distinguishes a specific request. When Unsolicited MFB subfield is '1', include Compressed MSI subfield (2 bits) and STBC indication subfield (1 bit). |
| MFSI/GID-L | MFB sequence identifier/LSB of Group ID | When Unsolicited MFB subfield is set to '0', MFSI/GID-L subfield includes a reception value of MSI included in a frame related to MFB information. When Unsolicited MFB subfield is set to '1' and MFB is estimated from MU PPDU, MFSI/GID-L subfield includes the Least Significant 3 bits of Group ID of PPDU of which MFB is estimated. |
| MFB | VHT N_STS, MCS, BW, SNR feedback | MFB subfield includes recommended MFB. VHT-MCS = 15, NUM_STS = 7 indicate that feedback is not existed. |
| GID-H | MSB of Group ID | When Unsolicited MFB subfield is set to '1' and MFB is estimated from VHT MU PPDU, GID-H subfield includes the Most Significant 3 bits of Group ID of PPDU of which MFB is estimated. When MFB is estimated from SU PPDU, all of GID-H subfields are set to '1'. |
| Coding Type | Coding type of MFB response | When Unsolicited MFB subfield is set to '1', Coding Type subfield of binary convolutional code (BCC) of a frame of which Unsolicited MFB is estimated includes '0', and low-density parity check (LDPC) includes '1'. |
| FB Tx Type | Transmission type of MFB response | When Unsolicited MFB subfield is set to '1' and MFB is estimated from unbeamformed VHT PPDU, FB Tx Type subfield is set to '0'. When Unsolicited MFB subfield is set to '1' and MFB is estimated from beamformed VHT PPDU, FB Tx Type subfield is set to '1'. |
| Unsolicited MFB | Unsolicited MCS feedback indicator | When MFB is a response to MRQ, set to '1'. When MFB is not a response to MRQ, set to '0'. |

And the MFB subfield may include a Number of space time streams (NUM_STS) subfield, a VHT-MCS subfield, a Bandwidth (BW) subfield and a Signal to Noise Ratio (SNR) subfield.

The NUM_STS subfield indicates the number of spatial stream which is recommended. The VHT-MCS subfield indicates the recommended MCS. The BW subfield indicates bandwidth information related to the recommended MCS. The SNR subfield indicates data subcarrier and an average SNR value on the spatial stream.

The information included in each of the fields described above may follow the definition of an IEEE 802.11 system. In addition, each of the fields described above corresponds to an example of the fields that may be included in the MAC frame, but not limited thereto. That is, each of the fields described above may be substituted by other field, or an additional field may be further included. And not all fields may be essentially included.

Link Setup Procedure

FIG. 9 is a diagram for describing a general link setup procedure in a wireless communication system to which the present invention may be applied.

In order to setup link on a network and to transmit and receive data over the network, an STA should perform a scanning process for discovering the network, an authentication process, an association process, and the like, first. The link setup procedure may also be referred to a session setup procedure. In addition, the scanning, authentication and association procedures may also be collectively referred to an association procedure.

In WLAN system, the scanning procedure includes a passive scanning procedure and an active scanning procedure.

FIG. 9(a) exemplifies a link setup procedure according to the passive scanning, and FIG. 9(b) exemplifies a link setup procedure according to the active scanning.

As shown in FIG. 9(a), the passive scanning procedure is performed through a beacon frame which is periodically broadcasted by an AP. The beacon frame is one of the management frames in IEEE 802.11 standard, and periodically (e.g., 100 msec interval) broadcasted in order to indicate a presence of a wireless network such that a non-AP STA that performs scanning may participate in the wireless network by finding the wireless network. The beacon frame carries information on a current network (e.g., information on BSS).

In order to acquire information on a network, a non-AP STA waits for receiving a beacon frame by switching channels passively. The non-AP STA that receives a beacon frame may store the information on the network included in the received beacon frame, and may perform scanning in another channel in the same way above by moving to another channel. When the non-AP STA acquires the information on the network by receiving the beacon frame, the scanning procedure in the corresponding frame is completed.

As such, the passive scanning procedure has an advantage that overall overhead is small since the procedure is completed only when receiving a beacon frame regardless of transmitting other frame by a non-AP STA. However, the passive scanning procedure has a disadvantage that a time for performing scanning by the non-AP STA increases in proportional to a transmission period of a beacon frame.

On the other hand, according to the active scanning procedure shown in FIG. 9(b), by broadcasting a probe request frame by actively moving channels in order to search which AP is existed around, a non-AP STA requests network information from all APs that receives the probe request frame.

A responder that receives the probe request frame transmits a probe response frame by carrying the network information thereon after waiting for a random time in order to prevent collision among frames. The STA that receives the probe response frame may perform scanning in another channel in the same way above by moving to another channel after saving the network related information included in the received probe response frame. When the non-AP STA acquires the network information by receiving the probe response frame, the scanning procedure is completed.

The active scanning procedure has an advantage that the scanning procedure may be completed in shorter time than the passive scanning procedure. However, overall network overhead increases since an additional frame sequence is required.

The non-AP STA that completes the scanning procedure, after selecting a network following its own standard, performs the authentication procedure with a corresponding AP.

The authentication procedure includes a process that the non-AP STA transmits an authentication request frame to the AP and a process that the AP transmits an authentication response frame to the non-AP STA in response to this. That is, the authentication procedure is performed in two-way handshaking.

The authentication frame used for the authentication request/response corresponds to a management frame.

The authentication frame may include information on an authentication algorithm number, an authentication transaction sequence number, a status code, a challenge text, a Robust Security Network (RSN), a Finite Cyclic Group, and the like. These correspond to just examples of the information that may be included in the authentication request/response frame, or may be substituted by other information, or additional information may be further included in the authentication frame.

The non-AP STA may transmit the authentication request frame to the AP. Based on the information included in the received authentication request frame, the AP may determine whether to allow an authentication for the STA. Through the authentication response frame, the AP may provide the result of authentication operation to the non-AP STA.

Through the authentication procedure, the non-AP STA and the AP establish their association after going through the authentication with each other.

The association procedure includes a process that the non-AP STA transmits an association request frame to the AP and a process that the AP transmits an association response frame to the non-AP STA in response to this, which is performed in two-way handshaking.

The association request frame may include information related to various capability of the non-AP STA and information on a beacon listen interval, an service set identifier (SSID), supported rates, supported channels, RSN, mobile domain, supported operating classes, a Traffic Indication Map (TIM) Broadcast request, an interworking service capability, and the like.

Based on this, the AP determines whether the support is available for the corresponding non-AP STA. After the determination, the AP transmits the association response frame to the non-AP STA by carrying information on whether to allow the association request and the reason, and information on capability that is supported by the AP itself thereon.

The association response frame may include information related to various capability and information such as a status code, an Association ID (AID), a support rate, an Enhanced Distributed Channel Access (EDCA) parameter set, a Received Channel Power Indicator (RCPI), a Received Signal to Noise Indicator (RSNI), a mobile domain, a time out interval (association comeback time), a overlapping BSS scan parameter, a TIM broadcast response, a Quality of Service (QoS) map, and so on.

The information that may be included in the association request/response frame described above corresponds to just an example, and may be substituted by other information. And additional information may be further included therein.

When the non-AP STA and the AP establish the association successfully, normal transmission and reception are performed. On the other hand, when the non-AP STA fails to establish the association with the AP, the non-AP STA may try the association procedure again or try the association procedure to other AP based on the reason.

Medium Access Mechanism

In IEEE 802.11, communication is basically different from that of a wired channel environment because it is performed in a shared wireless medium.

In a wired channel environment, communication is possible based on carrier sense multiple access/collision detection (CSMA/CD). For example, when a signal is once transmitted by a transmission stage, it is transmitted up to a reception stage without experiencing great signal attenuation because there is no great change in a channel environment. In this case, when a collision between two or more signals is detected, detection is possible. The reason for this is that power detected by the reception stage becomes instantly higher than power transmitted by the transmission stage. In a radio channel environment, however, since various factors (e.g., signal attenuation is great depending on the distance or instant deep fading may be generated) affect a channel, a transmission stage is unable to accurately perform carrier sensing regarding whether a signal has been correctly transmitted by a reception stage or a collision has been generated.

Accordingly, in a WLAN system according to IEEE 802.11, a carrier sense multiple access with collision avoidance (CSMA/CA) mechanism has been introduced as the basic access mechanism of MAC. The CAMA/CA mechanism is also called a distributed coordination function (DCF) of IEEE 802.11 MAC, and basically adopts a "listen before talk" access mechanism. In accordance with such a type of access mechanism, an AP and/or an STA perform clear channel assessment (CCA) for sensing a radio channel or a medium for a specific time interval (e.g., a DCF inter-frame space (DIFS)) prior to transmission. If, as a result of the sensing, the medium is determined to be an idle state, the AP and/or the STA starts to transmit a frame through the corresponding medium. In contrast, if, as a result of the sensing, the medium is determined to be a busy state (or an occupied status), the AP and/or the STA do not start their transmission, may wait for a delay time (e.g., a random backoff period) for medium access in addition to the DIFS assuming that several STAs already wait for in order to use the corresponding medium, and may then attempt frame transmission.

Assuming that several STAs trying to transmit frames are present, they will wait for different times because the STAs stochastically have different backoff period values and will attempt frame transmission. In this case, a collision can be minimized by applying the random backoff period.

Furthermore, the IEEE 802.11 MAC protocol provides a hybrid coordination function (HCF). The HCF is based on a DCF and a point coordination function (PCF). The PCF is a polling-based synchronous access method, and refers to a method for periodically performing polling so that all of receiving APs and/or STAs can receive a data frame. Furthermore, the HCF has enhanced distributed channel access (EDCA) and HCF controlled channel access (HCCA). In EDCA, a provider performs an access method for providing a data frame to multiple users on a contention basis. In HCCA, a non-contention-based channel access method using a polling mechanism is used. Furthermore, the HCF includes a medium access mechanism for improving the quality of service (QoS) of a WLAN, and may transmit QoS data in both a contention period (CP) and a contention-free period (CFP).

FIG. 10 is a diagram illustrating a random backoff period and a frame transmission procedure in a wireless communication system to which an embodiment of the present invention may be applied.

When a specific medium switches from an occupied (or busy) state to an idle state, several STAs may attempt to transmit data (or frames). In this case, as a scheme for minimizing a collision, each of the STAs may select a random backoff count, may wait for a slot time corresponding to the selected random backoff count, and may attempt transmission. The random backoff count has a pseudo-random integer value and may be determined as one of uniformly distributed values in 0 to a contention window (CW) range. In this case, the CW is a CW parameter value. In the CW parameter, CW_min is given as an initial value. If transmission fails (e.g., if ACK for a transmitted frame is not received), the CW_min may have a twice value. If the CW parameter becomes CW_max, it may maintain the CW_max value until data transmission is successful, and the data transmission may be attempted. If the data transmission is successful, the CW parameter is reset to a CW_min value. The CW, CW_min, and CW_max values may be set to $2^n-1$ (n=0, 1, 2, ...).

When a random backoff process starts, an STA counts down a backoff slot based on a determined backoff count value and continues to monitor a medium during the countdown. When the medium is monitored as a busy state, the STA stops the countdown and waits. When the medium becomes an idle state, the STA resumes the countdown.

In the example of FIG. 10, when a packet to be transmitted in the MAC of an STA 3 is reached, the STA 3 may check that a medium is an idle state by a DIFS and may immediately transmit a frame.

The remaining STAs monitor that the medium is the busy state and wait. In the meantime, data to be transmitted by each of an STA 1, an STA 2, and an STA 5 may be generated. When the medium is monitored as an idle state, each of the STAs waits for a DIFS and counts down a backoff slot based on each selected random backoff count value.

The example of FIG. 10 shows that the STA 2 has selected the smallest backoff count value and the STA 1 has selected the greatest backoff count value. That is, FIG. 10 illustrates that the remaining backoff time of the STA 5 is shorter than the remaining backoff time of the STA 1 at a point of time at which the STA 2 finishes a backoff count and starts frame transmission.

The STA 1 and the STA 5 stop countdown and wait while the STA 2 occupies the medium. When the occupation of the medium by the STA is finished and the medium becomes an idle state again, each of the STA 1 and the STA 5 waits for a DIFS and resumes the stopped backoff count. That is, each of the STA 1 and the STA 5 may start frame transmission after counting down the remaining backoff slot corresponding to the remaining backoff time. The STA 5 starts frame transmission because the STA 5 has a shorter remaining backoff time than the STA 1.

While the STA 2 occupies the medium, data to be transmitted by an STA 4 may be generated. In this case, from a standpoint of the STA 4, when the medium becomes an idle state, the STA 4 waits for a DIFS and counts down a backoff slot corresponding to its selected random backoff count value.

FIG. 10 shows an example in which the remaining backoff time of the STA 5 coincides with the random backoff count value of the STA 4. In this case, a collision may be generated between the STA 4 and the STA 5. When a collision is generated, both the STA 4 and the STA 5 do not receive ACK, so data transmission fails. In this case, each of the STA 4 and the STA 5 doubles its CW value, select a random backoff count value, and counts down a backoff slot.

The STA 1 waits while the medium is the busy state due to the transmission of the STA 4 and the STA 5. When the medium becomes an idle state, the STA 1 may wait for a DIFS and start frame transmission after the remaining backoff time elapses.

The CSMA/CA mechanism includes virtual carrier sensing in addition to physical carrier sensing in which an AP and/or an STA directly sense a medium.

Virtual carrier sensing is for supplementing a problem which may be generated in terms of medium access, such as a hidden node problem. For the virtual carrier sensing, the MAC of a WLAN system uses a network allocation vector (NAV). The NAV is a value indicated by an AP and/or an STA which now uses a medium or has the right to use the medium in order to notify another AP and/or STA of the remaining time until the medium becomes an available state. Accordingly, a value set as the NAV corresponds to the period in which a medium is reserved to be used by an AP and/or an STA that transmit corresponding frames. An STA that receives an NAV value is prohibited from accessing the medium during the corresponding period. The NAV may be set based on the value of the duration field of the MAC header of a frame, for example.

An AP and/or an STA may perform a procedure for exchanging a request to send (RTS) frame and a clear to send (CTS) frame in order to provide notification that they will access a medium. The RTS frame and the CTS frame include information indicating a temporal section in which a wireless medium required to transmit/receive an ACK frame has been reserved to be accessed if substantial data frame transmission and an acknowledgement response (ACK) are supported. Another STA which has received an RTS frame from an AP and/or an STA attempting to send a frame or which has received a CTS frame transmitted by an STA to which a frame will be transmitted may be configured to not access a medium during a temporal section indicated by information included in the RTS/CTS frame. This may be implemented by setting the NAV during a time interval.

Traveling Pilot

A concept of a traveling pilot as a concept which is introduced in an 802.11ah WLAN system means a pilot which has a predetermined pilot pattern for each symbol and is used for covering all tones (alternatively, subcarriers) or some tones. Performance of channel estimation may be enhanced by using the traveling pilot.

In the 802.11ah WLAN system, each of 32, 64, 128, and 256 FFT sizes is used for 1 MHz/2 MHz/4 MHz/8 MHz PPDU transmission. That is, in the 802.11ah WLAN system, subcarrier spacing is 31.25 kHz (=1 MHz/32=2 MHz/64=4 MHz/128=8 MHz/256), an Inverse Discrete Fourier Transform (IDFT)/Discrete Fourier Transform (DFT) period is 32 μs (=1/31.25 kHz). Herein, the IDFT/DFT period may mean a symbol length other than a guard interval in an OFDM symbol.

Herein, the location of the traveling pilot used in the 802.11ah WLAN system is exemplified.

Table 4 shows the location of the traveling pilot when the number of space-time streams is 1 (NSTS=1) in 1 MHz PPDU (that is, 32 FFT).

TABLE 4

| Pilot Index l | Pattern Index m | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 |
| 0 | −2 | −10 | −5 | −13 | −8 | −3 | −11 | −6 | −1 | −9 | −4 | −12 | −7 |
| 1 | 12 | 4 | 9 | 1 | 6 | 11 | 3 | 8 | 13 | 5 | 10 | 2 | 7 |

Table 5 shows the location of the traveling pilot when the number of space-time streams is 2 (NSTS=2) in 1 MHz PPDU (that is, 32 FFT).

TABLE 5

| Pilot Index l | Pattern Index m | | | | | | |
|---|---|---|---|---|---|---|---|
| | 0 | 1 | 2 | 3 | 4 | 5 | 6 |
| 0 | −3 | −13 | −9 | −5 | −1 | −11 | −7 |
| 1 | 11 | 1 | 5 | 9 | 13 | 3 | 7 |

Table 6 shows the location of the traveling pilot when the number of space-time streams is 1 (NSTS=1) in 2 MHz PPDU (that is, 64 FFT).

TABLE 6

| Pilot Index l | Pattern Index m | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | −28 | −24 | −20 | −16 | −26 | −22 | −18 | −27 | −23 | −19 | −15 | −25 | −21 | −17 |
| 1 | −12 | −8 | −4 | −2 | −14 | −10 | −6 | −11 | −7 | −3 | 1 | −13 | −9 | −5 |
| 2 | 4 | 8 | 12 | 16 | 2 | 6 | 10 | 5 | 9 | 13 | 17 | −1 | 3 | 7 |
| 3 | 20 | 24 | 28 | 26 | 14 | 18 | 22 | 21 | 25 | 23 | 27 | 11 | 15 | 19 |

Table 7 shows the location of the traveling pilot when the number of space-time streams is 2 (NSTS=2) in 2 MHz PPDU (that is, 64 FFT).

TABLE 7

| Pilot index l | Pattern Index m | | | | | | |
|---|---|---|---|---|---|---|---|
| | 0 | 1 | 2 | 3 | 4 | 5 | 6 |
| 0 | −28 | −24 | −20 | −16 | −26 | −22 | −18 |
| 1 | −12 | −8 | −4 | −2 | −14 | −10 | −6 |
| 2 | 4 | 8 | 12 | 16 | 2 | 6 | 10 |
| 3 | 20 | 24 | 28 | 26 | 14 | 18 | 22 |

Table 8 shows the location of the traveling pilot when the number of space-time streams is 1 (NSTS=1) in 4 MHz PPDU (that is, 128 FFT).

TABLE 8

| Pilot Index l | Pattern Index m | | | | | | | | | | | | | | | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 |
| 0 | −49 | −41 | −33 | −25 | −17 | −9 | −58 | −50 | −42 | −34 | −26 | −18 | −10 | −2 | −51 | −43 | −35 | −27 | −19 |
| 1 | −30 | −22 | −14 | −6 | −55 | −47 | −39 | −31 | −23 | −15 | −7 | −56 | −48 | −40 | −32 | −24 | −16 | −8 | −57 |
| 2 | −11 | −3 | −52 | −44 | −36 | −28 | −20 | −12 | −4 | −53 | −45 | −37 | −29 | −21 | −13 | −5 | −54 | −46 | −38 |
| 3 | 11 | 19 | 27 | 35 | 43 | 51 | 2 | 10 | 18 | 26 | 34 | 42 | 50 | 58 | 9 | 17 | 25 | 33 | 41 |
| 4 | 30 | 38 | 46 | 54 | 5 | 13 | 21 | 29 | 37 | 45 | 53 | 4 | 12 | 20 | 28 | 36 | 44 | 52 | 3 |
| 5 | 49 | 57 | 8 | 16 | 24 | 32 | 40 | 48 | 56 | 7 | 15 | 23 | 31 | 39 | 47 | 55 | 6 | 14 | 22 |

Table 9 shows the location of the traveling pilot when the number of space-time streams is 2 (NSTS=2) in 4 MHz PPDU (that is, 128 FFT).

TABLE 9

| Pilot Index l | Pattern Index m | | | | | | | | | |
|---|---|---|---|---|---|---|---|---|---|---|
| | 0 | 1 | 2 | 3 | 4 | 5 | 6 | 7 | 8 | 9 |
| 0 | −50 | −44 | −38 | −32 | −26 | −20 | −14 | −8 | −2 | −56 |
| 1 | −30 | −24 | −18 | −12 | −6 | −58 | −54 | −48 | −42 | −36 |
| 7 | −10 | −4 | −58 | −52 | −46 | −40 | −34 | −28 | −22 | −16 |
| 3 | 10 | 16 | 22 | 28 | 34 | 40 | 46 | 52 | 58 | 4 |
| 4 | 30 | 36 | 42 | 48 | 54 | 58 | 6 | 12 | 18 | 24 |
| 5 | 50 | 56 | 2 | 8 | 14 | 20 | 26 | 32 | 38 | 44 |

Table 10 shows the location of the traveling pilot when the number of space-time streams is 1 (NSTS=1) in 8 MHz PPDU (that is, 256 FFT).

TABLE 10

| Pilot Index l | Pattern Index m | | | | | | | | | | |
|---|---|---|---|---|---|---|---|---|---|---|---|
| | 0 | 1 | 2 | 3 | 4 | 5 | 6 | 7 | 8 | 9 | 10 |
| 0 | −122 | −118 | −114 | −110 | −106 | −102 | −98 | −94 | −120 | −116 | −112 |
| 1 | −90 | −86 | −82 | −78 | −74 | −70 | −66 | −62 | −88 | −84 | −80 |
| 2 | −58 | −54 | −50 | −46 | −42 | −38 | −34 | −30 | −56 | −52 | −48 |
| 3 | −26 | −22 | −18 | −14 | −10 | −6 | −2 | 2 | −24 | −20 | −16 |
| 4 | 6 | 10 | 14 | 18 | 22 | 26 | 30 | 34 | 8 | 12 | 16 |
| 5 | 38 | 42 | 46 | 50 | 54 | 58 | 62 | 66 | 40 | 44 | 48 |
| 6 | 70 | 74 | 78 | 82 | 86 | 90 | 94 | 98 | 72 | 76 | 80 |
| 7 | 102 | 106 | 110 | 114 | 118 | 122 | 120 | −120 | 104 | 108 | 112 |

| Pilot Index l | Pattern Index m | | | | | | | | | | |
|---|---|---|---|---|---|---|---|---|---|---|---|
| | 11 | 12 | 13 | 14 | 15 | 16 | 17 | 18 | 19 | 20 | 21 |
| 0 | −108 | −104 | −100 | −96 | −92 | −121 | −117 | −113 | −109 | −105 | −101 |
| 1 | −76 | −72 | −68 | −64 | −60 | −89 | −85 | −81 | −77 | −73 | −69 |
| 2 | −44 | −40 | −36 | −32 | −28 | −57 | −53 | −49 | −45 | −41 | −37 |
| 3 | −12 | −8 | −4 | 2 | 4 | −25 | −21 | −17 | −13 | −9 | −5 |
| 4 | 20 | 24 | 28 | 32 | 36 | 7 | 11 | 15 | 19 | 23 | 27 |
| 5 | 52 | 56 | 60 | 64 | 68 | 39 | 43 | 47 | 51 | 55 | 59 |
| 6 | 84 | 88 | 92 | 96 | 100 | 71 | 75 | 79 | 83 | 87 | 91 |
| 7 | 116 | 120 | 122 | −2 | −122 | 103 | 107 | 111 | 115 | 119 | 121 |

| Pilot Index l | Pattern Index m | | | | | | | | | |
|---|---|---|---|---|---|---|---|---|---|---|
| | 22 | 23 | 24 | 25 | 26 | 27 | 28 | 29 | 30 | 31 |
| 0 | −97 | −93 | −119 | −115 | −111 | −107 | −103 | −99 | −95 | −91 |
| 1 | −65 | −61 | −87 | −83 | −79 | −75 | −71 | −67 | −65 | −59 |
| 2 | −33 | −29 | −55 | −51 | −47 | −43 | −39 | −35 | −31 | −27 |
| 3 | −2 | 3 | −23 | −19 | −15 | −11 | −7 | −3 | 2 | 5 |
| 4 | 31 | 35 | 9 | 13 | 17 | 21 | 25 | 29 | 33 | 37 |
| 5 | 63 | 67 | 41 | 45 | 49 | 53 | 57 | 61 | 65 | 69 |

TABLE 10-continued

| | | | | | | | | | |
|---|---|---|---|---|---|---|---|---|---|
| 6 | 95 | 99 | 73 | 77 | 81 | 85 | 89 | 93 | 97 | 101 |
| 7 | 2 | −121 | 105 | 109 | 113 | 117 | 121 | 121 | −2 | −121 |

Table 11 shows the location of the traveling pilot when the number of space-time streams is 2 (NSTS=2) in 8 MHz PPDU (that is, 256 FFT).

TABLE 11

| | Pattern Index m | | | | | | | | |
|---|---|---|---|---|---|---|---|---|---|
| Pilot Index l | 0 | 1 | 2 | 3 | 4 | 5 | 6 | 7 | 8 |
| 0 | −122 | −118 | −114 | −110 | −106 | −102 | −98 | −94 | −120 |
| 1 | −90 | −86 | −82 | −78 | −74 | −70 | −66 | −62 | −88 |
| 2 | −58 | −54 | −50 | −46 | −42 | −38 | −34 | −30 | −56 |
| 3 | −26 | −22 | −18 | −14 | −10 | −6 | −2 | 2 | −24 |
| 4 | 6 | 10 | 14 | 18 | 22 | 26 | 30 | 34 | 8 |
| 5 | 38 | 42 | 46 | 50 | 54 | 58 | 62 | 66 | 40 |
| 6 | 70 | 74 | 78 | 82 | 86 | 90 | 94 | 98 | 72 |
| 7 | 102 | 106 | 110 | 114 | 118 | 122 | 120 | −120 | 104 |

| | Pattern Index m | | | | | | |
|---|---|---|---|---|---|---|---|
| Pilot Index l | 9 | 10 | 11 | 12 | 13 | 14 | 15 |
| 0 | −116 | −112 | −108 | −104 | −100 | −96 | −92 |
| 1 | −84 | −80 | −76 | −72 | −68 | −64 | −60 |
| 2 | −52 | −48 | −44 | −40 | −36 | −32 | −28 |
| 3 | −20 | −16 | −12 | −8 | −4 | 2 | 4 |
| 4 | 12 | 16 | 20 | 24 | 28 | 32 | 36 |
| 5 | 44 | 48 | 52 | 56 | 60 | 64 | 68 |
| 6 | 76 | 80 | 84 | 88 | 92 | 96 | 100 |
| 7 | 108 | 112 | 116 | 120 | 122 | −2 | −122 |

Referring to Tables 4 to 11 given above, a subcarrier index to which a pilot tone is mapped according to a pilot index l and a pattern index m is shown.

The pilot index means indexes numbered to all pilots for each pilot which exists in a data symbol (and/or SIG and LTF symbols). Herein, the pilot index may be numbered in an order in which indexes of respective subcarriers to which respective pilot tones are mapped increase.

The pattern index means an index numbered to a location (that is, a pattern) where the pilot tone is mapped to the subcarrier.

Referring to Tables 4 to 11 given above, the location of the pilot varies depending on the number of space-time indexes (NSTS). The number of symbols for the channel estimation is determined differently according to the number of space-time streams. For example, in the case of 2 streams, two symbols are required for the channel estimation.

In the case of NSTS=1, in one data symbol (and/or the SIG and LTF symbols), the location of the pilot is the same as the subcarrier index indicated in a column corresponding to one pilot pattern index in Tables 4 to 11 given above. That is, the pilot tone is mapped to the subcarrier indicated in one pilot pattern index for each one data symbol (and/or the SIG and LTF symbols). For example, the pilot tone may be mapped to the subcarrier indicated in pattern index 0 in a 0-th data symbol and the pilot tone may be mapped to the subcarrier indicated in pattern index 1 in a 1-st data symbol. The pilot tones may be similarly mapped even to subsequent symbols.

The pilot tones are mapped to the subcarriers corresponding to different pattern indexes for each data symbol, and as a result, the pilot tones may be mapped to all data subcarriers at one traveling pilot pattern period. Herein, the pilot pattern period means a period in which allocation of the pilot pattern is repeated and means a period in which all pattern patterns are allocated once when predetermined pilot patterns are allocated sequentially (alternatively, at a predetermined pattern). That is, the pilot pattern period may be the same as the number of all of the predetermined pilot patterns.

On the contrary, in the case of NSTS=2, in two (consecutive) data symbols (and/or the SIG and LTF symbols), the location of the pilot is the same as the subcarrier index indicated in the column corresponding to one pilot pattern index in Tables 4 to 11 given above. That is, the pilot tone is mapped to the subcarrier indicated in one pilot pattern index for each of two data symbols (and/or the SIG and LTF symbols). For example, the pilot tone may be mapped to the subcarrier indicated in pattern index 0 in the 0-th and 1-st data symbols and the pilot tone may be mapped to the subcarrier indicated in pattern index 1 in 2-nd and 3-rd data symbols. The pilot tone may be similarly mapped even to subsequent symbols. In this case, the location to which the pilot tone is mapped does not vary for each time-space stream.

In the case of NSTS=2, since one pilot pattern is mapped for each of two data symbols, the pilot tones are mapped to all of the data subcarriers at one traveling pilot pattern period, and as a result, the pilot tones may be mapped to only a half of the data subcarriers. Therefore, in tones (alternatively, subcarriers) to which the pilot tone is not mapped, other pilot values are interpolated, and as a result, the channel estimation may be performed.

Method for Transmitting and Receiving Physical Protocol Data Unit

In a situation in which a lot of interests in next-generation WiFi by various fields of venders and demands for enhancement of high throughput and quality of experience (QoE) after 802.11ac have increased, a discussion of a new frame format and numerology for an 802.11ax system which is a next-generation WLAN system is in active progress.

IEEE 802.11ax as the next-generation WLAN system for supporting higher data rate and processing a larger user load and one of WLAN systems which have been newly proposed in recent years is called high efficiency WLAN (HEW) as another name.

The IEEE 802.11ax WLAN system may operate in a 2.4 GHz frequency band and a 5 GHz frequency band similarly to the existing WLAN system. Further, the IEEE 802.11ax WLAN system may operate in a 60 GHz frequency band which is higher therethan.

In the IEEE 802.11ax system, for average throughput and outdoor robust transmission to inter-symbol interference in an outdoor environment, an FFT size which is four larger than in each bandwidth than the existing IEEE 802.11 OFDM system (IEEE 802.11a, 802.11n, 802.11ac, etc.) may be used. This will be described with reference to drawings given below.

Hereinafter, in describing an HE format PPDU according to the present invention, a description of the aforementioned non-HT format PPDU, HT-mixed format PPDU, HT-green-field format PPDU, and/or VHT format PPDU may be merged with the description of the HE format PPDU even though not separately mentioned.

FIG. 11 is a diagram illustrating a high efficiency (HE) format PPDU according to an embodiment of the present invention.

Referring to FIG. 11 the HE format PPDU for the HEW may be generally constituted by a large part (L-part) and an HE part (HE-part).

The L-part is constituted by an L-STF field, an L-LTF field, and an L-SIG field similarly to a form maintained in the existing WLAN system. The L-STF field, the L-LTF field, and the L-SIG field may be referred to as a legacy preamble.

The HE-part as a part newly defined for an 802.11ax standard may be constituted by an HE-SIG field, an HE preamble field, and an HE data field. In addition, the HE-preamble may include an HE-STF field and an HE-LTF field. Further, the HE-SIG field as well as the HE-STF field and the HE-LTF field may be collectively called the HE-preamble.

In FIG. 11, an order of the HE-SIG field, the HE-STF field, and the HE-LTF field is illustrated, but the HE-SIG field, the HE-STF field, and the HE-LTF field may be configured in an order different therefrom.

The L-part, the HE-SIG field, and the HE-preamble may be collectively called a physical (PHY) preamble.

The HE-SIG field may include information (for example, OFDMA, UL MU MIMO, enhanced MCS, etc.) for decoding the HE-data field.

The L-part and the HE-part (in particular, the HE-preamble and the HE-data) may have different Fast Fourier Transforms (FFTs) and use different cyclic prefixes (CPs). That is, subcarrier frequency spacings of the L-part and the HE-part (in particular, the HE-preamble and the HE-data) may be defined to be different from each other.

In the 802.11ax system, the FFT size which is four times larger than that of the legacy WLAN system may be used. That is, the L-part may be configured in a 1× symbol structure and the HE-part (in particular, HE-preamble and HE-data) may be configured in a 4× symbol structure. Herein, FFTs having 1×, 2×, and 4× sizes mean relative sizes to the legacy WLAN system (for example, IEEE 802.11a, 802.11n, 802.11ac, etc.).

For example, when the FFT sizes used in the L-part are 64, 128, 256, and 512 at 20 MHz, 40 MHz, 80 MHz, and 160 MHz, respectively, the FFT sizes used in the HE-part may be 256, 512, 1024, and 2048 at 20 MHz, 40 MHz, 80 MHz, and 160 MHz, respectively.

When the FFT size becomes larger than that of the legacy WLAN as described above, the subcarrier frequency spacing decreases, the number of subcarriers per frequency increases, but the OFDM symbol length increases.

That is, using the larger FFT size means that the subcarrier spacing decreases and similarly, means the Inverse Discrete Fourier Transform (IDFT)/Discrete Fourier Transform (DFT) period increases. Herein, the IDFT/DFT period may mean the symbol length other than the guard interval in the OFDM symbol.

Therefore, when the FFT size in the HE-part (in particular, the HE-preamble and the HE-data) is used, which is four times larger than the FFT size in the L-part, the subcarrier spacing of the HE-part becomes ¼ times as large as the subcarrier spacing of the L-part and the IDFT/DFT period of the HE-part becomes four times as long as the IDFT/DFT period of the L-part. For example, when the subcarrier spacing of the L-part is 312.5 kHz (=20 MHz/64, 40 MHz/128, 80 MHz/256, and/or 160 MHz/512), the subcarrier spacing of the HE-part may be 78.125 kHz(=20 MHz/256, 40 MHz/512, 80 MHz/1024, and/or 160 MHz/2048). Further, when the IDFT/DFT period of the L-part is 3.2 µs (=1/312.5 kHz), the IDFT/DFT period of the HE-part may be 12.8 µs (=1/78.125 kHz).

Herein, since one of 0.8 µs, 1.6 µs, and 3.2 µs may be used as the GI, the OFDM symbol length (alternatively, a symbol interval) of the HE-part, which includes the GI may be 13.6 µs, 14.4 µs, or 16 µs depending on the GI.

In FIG. 11, a case where the HE-SIG field is configured in the 1× symbol structure is illustrated, but the HE-SIG field may also be configured in the 4× symbol structure like the HE-preamble and the HE-data.

Unlike the illustration of FIG. 11, the HE-SIG may be divided into the HE-SIG A field and the HE-SIG B field. In this case, the FFT size per frequency may further increase after the HE-SIG B. That is, since the HE-SIG B, the OFDM symbol length may increase as compared with the L-part.

The HE format PPDU for the WLAN system to which the present invention may be applied may be transmitted through at least one 20 MHz channel. For example, the HE format PPDU may be transmitted in a 40 MHz, 80 MHz, or 160 MHz frequency band through a total of 4 20 MHz channels. The transmission of the HE format PPDU will be described in more detail with reference to drawings given below.

FIG. 12 is a diagram illustrating a high efficiency (HE) format PPDU according to an embodiment of the present invention.

In FIG. 12, the PPDU format is illustrated when 80 MHz is allocated to one STA (alternatively, when an OFDMA resource unit is allocated to a plurality of STAs in 80 MHz) or when different streams of 80 MHz are allocated to the plurality of STAs, respectively.

Referring to FIG. 12, the L-STF, the L-LTF, and the L-SIG may be transmitted to the OFDM symbol generated based on 64 FFT points (alternatively, 64 subcarriers) in each 20 MHz channel.

The HE-SIG A field may include common control information commonly transmitted to the STAs that receive the PPDU. The HE-SIG A field may be transmitted in one to three OFDM symbols. The HE-SIG A field is duplicated per 20 MHz to include the same information. Further, the HE-SIG A field announces whole bandwidth information of the system.

Table 12 is a diagram showing the information included in the HE-SIG A field.

TABLE 12

| Field | Bits | Description |
| --- | --- | --- |
| Bandwidth | 2 | Indicating the bandwidth in which the PPDU is transmitted e.g., 20 MHz, 40 MHz, 80 MHz or 160 MHz |
| Group ID | 6 | Indicating the STA or the group of STAs that will receive the PPDU |
| Stream information | 12 | Indicating the position or the number of the spatial stream for each STA or indicating the position or the number of spatial stream for the group of the STAs |
| UL indication | 1 | Indicating whether the PPDU is transmitted to the AP (uplink) or to the STA (downlink) |
| MU indication | 1 | Indicating whether the PPDU is the SU-MIMO PPDU or the MU-MIMO PPDU |
| GI indication | 1 | Indicating whether a short GI or a long GI is used |
| Allocation information | 12 | Indicating the band or the channel (subchannel index or subband index) allocated to each STA in the band in which the PPDU is transmitted |
| Transmission power | 12 | Indicating the transmission power for each channel or each STA |

The information included in the respective fields shown in Table 12 may follow the definition of the IEEE 802.11 system. Further, the respective fields described above correspond to the illustration of the fields which may be included in the PPDU and are not limited thereto. That is, each field described above may be substituted with another field or further include an additional field and all fields may not be requisitely included.

The HE-STF is used for improving the performance of AGC estimation in MIMO transmission.

The HE-SIG B field may include user-specific information required for each STA to receive data (e.g., PSDU) thereof. The HE-SIG B field may be transmitted in one or two OFDM symbols. For example, the HE-SIG B field may include information on a modulation and coding scheme of the corresponding PSDU and the length of the corresponding PSDU.

The L-STF, L-LTF, L-SIG, and HE-SIG A fields may be repeatedly transmitted per 20 MHz channel. For example, when the PPDU is transmitted through four 20 MHz channels (that is, 80 MHz band), the L-STF, L-LTF, L-SIG, and HE-SIG A fields may be repeatedly transmitted every 20 MHz channel.

When the FFT size increases, the legacy STA that supports the existing IEEE 802.11a/g/n/ac is not capable of decoding the corresponding HE PPDU. For coexistence of the legacy STA and the HE STA, the L-STF, L-LTF, and L-SIG fields are transmitted through the 64 FFT in the 20 MHz channel so as for the legacy STA to receive the HE STA, the L-STF, L-LTF, and L-SIG fields. For example, the L-SIG field may occupy one OFDM symbol, one symbol time may be 4 μs, and the GI may be 0.8 μs.

The FFT size for each frequency unit may further increase from the HE-STF. For example, 256 FFT may be used in the 20 MHz channel, 512 FFT may be used in the 40 MHz channel, and 1024 FFT may be used in the 80 MHz channel. When the FFT size increases, the spacing between the OFDM subcarriers decreases, and as a result, the number of OFDM subcarriers per frequency increases, but the OFDM symbol time increases. In order to enhance the efficiency of the system, the length of the GI since the HE-STF may be set to be the same as the length of the GI of the HE-SIG A.

The HE-SIG A field may include information required for the HE STA to decode the HE PPDU. However, the HE-SIG A field may be transmitted through the 64 FFT in the 20 MHz channel so as for both the legacy STA and the HE STA to receive the HE-SIG A field. The reason is that the HE STA may receive the existing HT/VHT format PPDU as well as the HE format PPDU and the legacy STA and the HE STA need to distinguish the HT/VHT format PPDU and the HE format PPDU.

FIG. 13 is a diagram illustrating a high efficiency (HE) format PPDU according to an embodiment of the present invention.

In FIG. 13, a case where 20 MHz channels are allocated to different STAs (e.g., STA 1, STA 2, STA 3, and STA 4) is assumed.

Referring to FIG. 13, the FFT size per frequency may further increase after the HE-STF (alternatively, HE-SIG B). For example, the 256 FFT may be used in the 20 MHz channel, the 512 FFT may be used in the 40 MHz channel, and the 1024 FFT may be used in the 80 MHz channel, from the HE-STF (alternatively, HE-SIG B).

Since the information transmitted in each field included in the PPDU is the same as that in the illustration of FIG. 12 given above, the information will not be described below.

The HE-SIG B field may include information specific to each STA, but may be encoded throughout all bands (that is, indicated in the HE-SIG A field). That is, the HE-SIG B field includes information on all STAs and is received by all of the STAs.

The HE-SIG B field may announce frequency bandwidth information allocated for each STA and/or stream information in the corresponding frequency band. For example, in FIG. 13, in the HE-SIG B, 20 MHz may be allocated to STA 1, subsequent 20 MHz may be allocated to STA 2, subsequent 20 MHz may be allocated to STA 3, and subsequent 20 MHz may be allocated to STA 4. Further, 40 MHz may be allocated to STA 1 and STA 2 and subsequent 40 MHz may be allocated to STA 3 and STA 4. In this case, different streams may be allocated to STA 1 and STA 2 and different streams may be allocated to STA 3 and STA 4.

Further, the HE-SIG C field is defined, and as a result, the HE-SIG C field may be added to the illustration of FIG. 13. In this case, the information on all STAs may be transmitted throughout all bands in the HE-SIG B field and the control information specific to each STA may be transmitted per 20 MHz through the HE-SIG C field.

Further, differently from the illustrations of FIGS. 12 and 13, the HE-SIG B field may not be transmitted throughout all bands, but may be transmitted per 20 MHz similarly to the HE-SIG A field. The transmission of the HE-SIG B field will be described with reference to drawings given below.

FIG. 14 is a diagram illustrating a high efficiency (HE) format PPDU according to an embodiment of the present invention.

In FIG. 14, the case where the 20 MHz channels are allocated to different STAs (e.g., STA 1, STA 2, STA 3, and STA 4) is assumed.

Referring to FIG. 14, the HE-SIG B field is not transmitted throughout all of the bands, but transmitted per 20 MHz similarly to the HE-SIG A field. However, in this case, the HE-SIG B is transmitted while being encoded per 20 MHz differently from the HE-SIG A field, but may not be transmitted while being duplicated per 20 MHz.

In this case, the FFT size per frequency may further increase after the HE-STF (alternatively, HE-SIG B). For example, the 256 FFT may be used in the 20 MHz channel, the 512 FFT may be used in the 40 MHz channel, and the 1024 FFT may be used in the 80 MHz channel, from the HE-STF (alternatively, HE-SIG B).

Since the information transmitted in each field included in the PPDU is the same as that in the illustration of FIG. 12 given above, the information will not be described below.

The HE-SIG A field is transmitted while being duplicated per 20 MHz.

The HE-SIG B field may announce the frequency bandwidth information allocated for each STA and/or the stream information in the corresponding frequency band. Since the HE-SIG B field includes the information on each STA, each HE-SIG B field per 20 MHz may include the information on each STA. In this case, in the illustration of FIG. 14, the case where 20 MHz is allocated to each STA, but for example, in the case where 40 MHz is allocated to the STA, the HE-SIG B field may be transmitted while being duplicated per 20 MHz.

In a case where some bandwidths of which interference levels from an adjacent BSS are allocated to the STA in a situation in which different bandwidths are supported for each BSS, it may be more preferable not to transmit the HE-SIG B field throughout all of the bands as described above.

In FIGS. 11 to 14, the data field as a payload may include a service field, a scrambled PSDU, tail bits, and padding bits.

Meanwhile, the HE format PPDU illustrated in FIGS. 11 to 14 may be distinguished through a repeated L-SIG (RL-SIG) field which is a repeated symbol of the L-SIG field. The RL-SIG field may be inserted into before the HE-SIG A field and each STA may distinguish the format of the PPDU received by using the RL-SIG field as the HE format PPDU.

Resource Unit

FIGS. 15 to 17 are diagrams illustrating a resource allocation unit in an OFDMA multi-user transmission scheme according to an embodiment of the present invention.

When the DL/UL OFDMA transmission scheme is used, a plurality of resource units may be defined per n tones (alternatively, subcarriers) within the PPDU bandwidth.

The resource unit means an allocation unit of a frequency resource for DL/UL OFDMA transmission.

One or more resource units as the DL/UL frequency resource are allocated to one STA, and as a result, different resource units may be allocated to the plurality of STAs.

In FIG. 15, the case where the PPDU bandwidth is 20 MHz is illustrated.

7 DC tones may be positioned in a center frequency area of the 20 MHz PPDU bandwidth. Further, 6 left guard tones and 5 right guard tones may be positioned at both sides of the 20 MHz PPDU bandwidth, respectively.

According to a resource unit configuration scheme illustrated in FIG. 15(a), one resource unit may be constituted by 26 tones (26-tone resource unit). In this case, 4 left over tones may exist adjacent to the 26-tone resource unit in the 20 MHz PPDU bandwidth as illustrated in FIG. 15(a). Further, according to the resource unit configuration scheme illustrated in FIG. 15(b), one resource unit may be constituted by 52 tones (52-tone resource unit) or constituted by 26 tones. In this case, 4 left over tones may exist adjacent to the 26-tone/52-tone resource unit in the 20 MHz PPDU bandwidth as illustrated in FIG. 15(b). Further, according to the resource unit configuration scheme illustrated in FIG. 15(c), one resource unit may be constituted by 106 tones (106-tone resource unit) or constituted by 26 tones. In addition, according to a resource unit configuration scheme illustrated in FIG. 15(d), one resource unit may be constituted by 242 tones (242-tone resource unit).

When the resource unit is constituted as illustrated in FIG. 15(a), a maximum of 9 STAs may be supported for DL/UL OFDMA transmission in the 20 MHz band. When the resource unit is constituted as illustrated in FIG. 15(b), a maximum of 5 STAs may be supported for the DL/UL OFDMA transmission in the 20 MHz band. Further, when the resource unit is constituted as illustrated in FIG. 15(c), a maximum of 3 STAs may be supported for the DL/UL OFDMA transmission in the 20 MHz band. In addition, when the resource unit is constituted as illustrated in FIG. 15(d), the 20 MHz band may be allocated to one STA.

Any one resource unit configuration scheme of the resource unit configuration schemes of FIGS. 15(a) to 15(d) or a resource unit configuration scheme in which the resource unit configuration schemes of FIGS. 15(a) to 15(d) are combined with each other may be applied based on the number of STAs which participate in the DL/UL OFDMA transmission and/or the amount of data transmitted or received by the corresponding STA.

In FIG. 16, the case where the PPDU bandwidth is 40 MHz is illustrated.

5 DC tones may be positioned in the center frequency area of the 40 MHz PPDU bandwidth. Further, 12 left guard tones and 11 right guard tones may be positioned at both sides of the 40 MHz PPDU bandwidth, respectively.

According to the resource unit configuration scheme illustrated in FIG. 16(a), one resource unit may be constituted by 26 tones. In this case, 16 left over tones may exist adjacent to the 26-tone resource unit in the 40 MHz PPDU bandwidth as illustrated in FIG. 16(a). Further, according to the resource unit configuration scheme illustrated in FIG. 16(b), one resource unit may be constituted by 52 tones or constituted by 26 tones. In this case, 16 left over tones may exist adjacent to the 26-tone/52-tone resource unit in the 40 MHz PPDU bandwidth as illustrated in FIG. 16(b). Further, according to the resource unit configuration scheme illustrated in FIG. 16(c), one resource unit may be constituted by 106 tones or constituted by 26 tones. In this case, 8 left over tones may exist adjacent to the 26-tone/106-tone resource unit in the 40 MHz PPDU bandwidth as illustrated in FIG. 16(c). Further, according to the resource unit configuration scheme illustrated in FIG. 16(d), one resource unit may be constituted by 242 tones. In addition, according to a resource unit configuration scheme illustrated in FIG. 16(e), one resource unit may be constituted by 484 tones (484-tone resource unit).

When the resource unit is constituted as illustrated in FIG. 16(a), a maximum of 18 STAs may be supported for DL/UL OFDMA transmission in the DL/UL OFDMA transmission in the 40 MHz band. Further, when the resource unit is constituted as illustrated in FIG. 16(b), a maximum of 10 STAs may be supported for the DL/UL OFDMA transmission in the 40 MHz band. In addition, when the resource unit is constituted as illustrated in FIG. 16(c), a maximum of 6 STAs may be supported for the DL/UL OFDMA transmission in the 40 MHz band. Moreover, when the resource unit is constituted as illustrated in FIG. 16(d), a maximum of 2 STAs may be supported for the DL/UL OFDMA transmission in the 40 MHz band. Further, when the resource unit is constituted as illustrated in FIG. 16(e), the corresponding resource unit may be allocated to 1 STA for the DL/UL OFDMA transmission in the 40 MHz band.

Any one resource unit configuration scheme of the resource unit configuration schemes of FIGS. 16(a) to 16(e) or a resource unit configuration scheme in which the resource unit configuration schemes of FIGS. 16(a) to 16(e) are combined with each other may be applied based on the number of STAs which participate in the DL/UL OFDMA transmission and/or the amount of data transmitted or received by the corresponding STA.

In FIG. 17, the case where the PPDU bandwidth is 80 MHz is illustrated.

7 DC tones may be positioned in the center frequency area of the 80 MHz PPDU bandwidth. However, when the 80 MHz PPDU bandwidth is allocated to one STA (that is, when the resource unit constituted by 996 tones is allocated to one STA), 5 DC tones may be positioned in the center frequency area. Further, 12 left guard tones and 11 right guard tones may be positioned at both sides of the 80 MHz PPDU bandwidth, respectively.

According to the resource unit configuration scheme illustrated in FIG. 17(a), one resource unit may be constituted by 26 tones. In this case, 32 left over tones may exist adjacent to the 26-tone resource unit in the 80 MHz PPDU bandwidth as illustrated in FIG. 17(a). Further, according to the resource unit configuration scheme illustrated in FIG. 17(b), one resource unit may be constituted by 52 tones or constituted by 26 tones. In this case, 32 left over tones may exist adjacent to the 26-tone/52-tone resource unit in the 80 MHz PPDU bandwidth as illustrated in FIG. 17(b). Further, according to the resource unit configuration scheme illustrated in FIG. 17(c), one resource unit may be constituted by 106 tones or constituted by 26 tones. In this case, 16 left over tones may exist adjacent to the 26-tone/106-tone resource unit in the 80 MHz PPDU bandwidth as illustrated in FIG. 17(c). Further, according to the resource unit configuration scheme illustrated in FIG. 17(d), one resource unit may be constituted by 242 tones or constituted by 26 tones. Further, according to the resource unit configuration scheme illustrated in FIG. 17(e), one resource unit may be constituted by 484 tones or constituted by 26 tones. According to the resource unit configuration scheme illustrated in FIG. 17(f), one resource unit may be constituted by 996 tones.

When the resource unit is constituted as illustrated in FIG. 17(a), a maximum of 37 STAs may be supported for DL/UL OFDMA transmission in the DL/UL OFDMA transmission in the 80 MHz band. Further, when the resource unit is constituted as illustrated in FIG. 17(b), a maximum of 21 STAs may be supported for the DL/UL OFDMA transmission in the 80 MHz band. In addition, when the resource unit is constituted as illustrated in FIG. 17(c), a maximum of 13 STAs may be supported for the DL/UL OFDMA transmission in the 80 MHz band. Moreover, when the resource unit is constituted as illustrated in FIG. 17(d), a maximum of 5 STAs may be supported for the DL/UL OFDMA transmission in the 80 MHz band. Further, when the resource unit is constituted as illustrated in FIG. 17(e), a maximum of 3 STAs may be supported for the DL/UL OFDMA transmission in the 80 MHz band. In addition, when the resource unit is constituted as illustrated in FIG. 28(f), the corresponding resource unit may be allocated to 1 STA for the DL/UL OFDMA transmission in the 80 MHz band.

Any one resource unit configuration scheme of the resource unit configuration schemes of FIGS. 17(a) to 17(f) or a resource unit configuration scheme in which the resource unit configuration schemes of FIGS. 17(a) to 17(f) are combined with each other may be applied based on the number of STAs which participate in the DL/UL OFDMA transmission and/or the amount of data transmitted or received by the corresponding STA.

Besides, although not illustrated, the resource unit configuration scheme when the PPDU bandwidth is 160 MHz may also be proposed. In this case, the 160 MHz PPDU bandwidth may have a structure in which the 80 MHz PPDU bandwidth described in FIG. 17 is repeated twice.

Only some resource units may be used for the DL/UL OFDMA transmission among all resource units determined according to the resource unit configuration scheme. For example, when the resource unit is configured in 20 MHz as illustrated in 17(a), one resource unit may allocated to each of STAs less than 9 STAs and the residual resource units may not be allocated to any STA.

In the case of the DL OFDMA transmission, the data field of the PPDU is multiplexed and transmitted in a frequency domain per resource allocated to each STA.

On the contrary, in the case of the UL OFDMA transmission, the data field of the PPDU may be configured per resource allocated to each STA and simultaneously, transmitted to the AP. Since the respective STAs simultaneously transmit the PPDU, the AP as the receiver may recognize that the data fields of the PPDUs transmitted from the respective STAs are multiplexed (alternatively, frequency-multiplexed) and transmitted in the frequency domain.

Further, when DL/UL OFDMA transmission and DL/UL MU-MIMO transmission are simultaneously supported, one resource unit may be constituted by a plurality of streams in a spatial domain. In addition, one or more streams as DL/UL spatial resources are allocated to one STA, and as a result, different resource units may be allocated to the plurality of STAs.

For example, in FIG. 17(c), the resource unit constituted by 106 tones is constituted by the plurality of streams to simultaneously support DL/UL OFDMA and DL/UL MU-MIMO.

A scheme in which the AP which operates in the WLAN system transmits data to the plurality of STAs on the same time resource may be referred to as downlink multi-user (DL MU) transmission. On the contrary, a scheme in which the plurality of STAs which operates in the WLAN system transmits the data to the AP in the same time resource may be referred to as uplink multi-user (UL MU) transmission.

The DL MU transmission or UL MU transmission may be multiplexed in the frequency domain or the spatial domain.

When the DL MU transmission or UL MU transmission is multiplexed in the frequency domain, different frequency resources (e.g., subcarriers or tones) may be allocated to the plurality of respective STAs as a downlink or uplink resource based on orthogonal frequency division multiplexing (OFDMA). A transmission scheme through different frequency resources in the same time resource may be referred to as 'DL/UL OFDMA transmission'.

When the DL MU transmission or UL MU transmission is multiplexed in the spatial domain, different spatial streams may be allocated to the plurality of respective STAs as the downlink or uplink resource. A transmission scheme through different spatial streams in the same time resource may be referred to as 'DL/UL MU MIMO' transmission.

Traveling Pilot Designing Method

As described above, in the IEEE 802.11ax WLAN system (HEW), it is anticipated that a larger FFT than the existing WLAN system is applied in a system bandwidth given to improve a throughput of the system or improve robustness to inter-symbol interference in an outdoor environment and further, a discussion about extension of the multi user transmission scheme proposed in the existing 802.11 11ac system to uplink and introduction of the OFDMA transmission scheme is also accompanied.

In such a situation, since it is apparent that the FFT size used in the existing IEEE 802.11 OFDM system (IEEE 802.11a, 802.11n, and 802.11ac) and various FFT sizes which are smaller or larger therethan are used in the 802.11ax, the FFT sizes may be inserted into such a frame structure (e.g., ×4 frame structure) and a pilot design of a scheme suitable for the numerology of the OFDMA is required.

The present invention proposes a pilot designing method suitable for the numerology of the 802.11ax system by supplementing and extending the traveling pilot designing scheme proposed in the existing 802.11ah.

Hereinafter, in describing the position of the pilot tone in the present invention, the position of the pilot tone will be described by assuming that the subcarrier indexes are numbered in an ascending order from a low frequency to a high frequency for easy description. Further, a left direction means a direction in which the subcarrier index decreases and a right direction means a direction in which the subcarrier index increases. Further, the subcarrier positioned at a left side of the DC tone means a subcarrier having a negative subcarrier index and the subcarrier positioned at a right side of the DC tone means a subcarrier having a positive subcarrier index.

1. 20 MHz PPDU (256 FFT)

(1) In the case where the number of time-space streams is 1 (NSTS=1)

A 256 FFT traveling pilot pattern (see Table 10 given above) in the case of NSTS=1 proposed in the 802.11ah system may be reused. In this case, the pilot tone may be mapped to the subcarrier indicated in one pilot pattern index for each one data symbol (and/or the SIG and LTF symbols). The pilot tones are mapped to the subcarriers corresponding to different pattern indexes for each data symbol, and as a result, the pilot tones may be mapped to all data subcarriers at one traveling pilot pattern period.

(2) In the case where the number of time-space streams is 2 (NSTS=2)

The 256 FFT traveling pilot pattern (see Table 10 given above) in the case of NSTS=1 or the 256 FFT traveling pilot pattern (see Table 11 given above) in the case of NSTS=2 proposed in the 802.11ah system may be reused.

When the 256 FFT traveling pilot pattern in the case of NSTS=1 is reused, the pilot tone may be mapped to the subcarrier indicated in one pilot pattern index for each one data symbol (and/or the SIG and LTF symbols). In this case, the pilot tones are mapped to the subcarriers corresponding to different pattern indexes for each data symbol, and as a result, the pilot tones may be mapped to all data subcarriers at one traveling pilot pattern period.

On the contrary, when the 256 FFT traveling pilot pattern in the case of NSTS=2 is reused, the pilot tone may be mapped to the subcarrier indicated in one pilot pattern index for each of two data symbols (and/or the SIG and LTF symbols). In this case, the pilot tones may not be mapped to all data subcarriers at one traveling pilot pattern period and the channel estimation may be performed by interpolating other pilot values in the subcarrier to which the pilot tone is not mapped.

(3) In the case where the number of time-space streams is 3 (NSTS≥3)

The 256 FFT pilot pattern (see Table 10 given above) in the case of NSTS=1 proposed in the 802.11ah system may be reused or only some of the 256 FFT pilot patterns in the case of NSTS=1 may be reused.

As one example of reusing only some of the 256 FFT pilot patterns in the case of NSTS=1, only a pilot pattern which meets mod(pattern index, NSTS)=n may be reused. Herein, n corresponds to a predetermined value among 0, 1, 2, . . . , NSTS-1. Herein, mod indicates a modular operation.

When all or only some of the 256 FFT pilot pattern in the case of NSTS≥3 are reused, the pilot tone may be mapped to the subcarrier indicated in one pilot pattern index for each of NSTS data symbols (and/or the SIG and LTF symbols). In this case, the pilot tones may not be mapped to all data subcarriers at one traveling pilot pattern period and the channel estimation may be performed by interpolating other pilot values in the subcarrier to which the pilot tone is not mapped.

2. 40 MHz PPDU (512 FFT)

A scheme that duplicates the 256 FFT pilot patterns in the 20 MHz PPDU and a new design scheme without using the 256 FFT pilot patterns in the 20 MHz PPDU are proposed as below.

A) Duplication Scheme

A scheme that repeats the 20 MHz 256 FFT pilot pattern twice is proposed.

The number of left guard tones is defined as NLG_40 and the number of right guard tones is defined as NLG_40−1 in 512 FFT of 40 MHz of 802.11ax. In addition, the number of DC tones is defined as NDC_40.

The guard tone may include a tone having the most negative index and a tone having the most positive index and may be constituted by one or more tones. Further, the tone having the most positive index may be referred to as the right guard tone and the tone having the most negative index may be referred to as the left guard tone.

The DC tone may mean a tone positioned at an index of 0 for generating a zero mean signal and may be constituted by one or more tones.

A value of 0 is mapped to the guard tone and the DC tone.

As such, when the numbers of guard tones and DC tones are defined, one pilot pattern (that is, a left pilot pattern based on DC) covers up to −256+NLG_40 to −(NDC_40−1)/2−1 tones and the other pilot pattern (that is, a right pilot pattern based on the DC) covers +(NDC_40−1)/2+1 to +255−(NLG_40−1) tones. The total number of used pilots is 16.

When the total number of used pilots is expressed by an equation, the total number of used pilots is shown in Equation 1 (the left pilot pattern) and Equation 2 (the right pilot pattern).

$idx1=0,1,\ldots,7$ $$P^{40,NSTS}_{idx1,idx2}=P^{20,NSTS}_{idx1,idx2}-128 \quad \text{[Equation 1]}$$

$idx1=8,9,\ldots,15$ $$P^{40,NSTS}_{idx1,idx2}=P^{20,NSTS}_{idx1,idx2}+28 \quad \text{[Equation 2]}$$

In Equations 1 and 2, NSTS means the number of streams and idx1 and idx2 indicate a pilot index and a pilot pattern index, respectively. Further, $P^{20,NSTS}_{idx1,idx2}$ and $P^{40,NSTS}_{idx1,idx2}$ mean the position of the pilot tone in an idx2 pilot pattern of an idx1 pilot in the case of NSTS streams at 20 MHz and 40 MHz, respectively. Expression of the equations may be similarly applied unless the expression of the equations is separately described below in the present specification.

The pilot pattern designed by using the scheme is shown in Table 13.

Table 13 shows the traveling pilot pattern according to the embodiment of the present invention.

TABLE 13

| Pattern idx | Pilot idx | | | | | | | | | |
|---|---|---|---|---|---|---|---|---|---|---|
| | 0 | 1 | 2 | 3 | 4 | 5 | 6 | 7 | 8 | 9 |
| 0 | −250 | −218 | −186 | −154 | −122 | −90 | −58 | −26 | 6 | 38 |
| 1 | −246 | −214 | −182 | −150 | −118 | −86 | −54 | −22 | 10 | 42 |
| 2 | −242 | −210 | −178 | −146 | −114 | −82 | −50 | −18 | 14 | 46 |
| 3 | −238 | −206 | −174 | −142 | −110 | −78 | −46 | −14 | 18 | 50 |
| 4 | −234 | −202 | −170 | −138 | −106 | −74 | −42 | −10 | 22 | 54 |
| 5 | −230 | −198 | −166 | −134 | −102 | −70 | −38 | −6 | 26 | 58 |
| 6 | −226 | −194 | −162 | −130 | −98 | −66 | −34 | −8 | 30 | 62 |
| 7 | −222 | −190 | −158 | −126 | −94 | −62 | −30 | −248 | 34 | 66 |
| 8 | −248 | −216 | −184 | −152 | −120 | −88 | −56 | −24 | 8 | 40 |
| 9 | −244 | −212 | −180 | −148 | −116 | −84 | −52 | −20 | 12 | 44 |
| 10 | −240 | −208 | −176 | −144 | −112 | −80 | −48 | −16 | 16 | 48 |
| 11 | −236 | −204 | −172 | −140 | −108 | −76 | −44 | −12 | 20 | 52 |
| 12 | −232 | −200 | −168 | −136 | −104 | −72 | −40 | −8 | 24 | 56 |
| 13 | −228 | −196 | −164 | −132 | −100 | −68 | −36 | −6 | 28 | 60 |
| 14 | −224 | −192 | −160 | −126 | −96 | −64 | −32 | −130 | 32 | 64 |
| 15 | −220 | −188 | −156 | −124 | −92 | −60 | −28 | −250 | 36 | 68 |
| 16 | −249 | −217 | −185 | −153 | −121 | −89 | −57 | −25 | 7 | 39 |
| 17 | −245 | −213 | −181 | −149 | −117 | −85 | −53 | −21 | 11 | 43 |
| 18 | −241 | −209 | −177 | −145 | −113 | −81 | −49 | −17 | 15 | 47 |
| 19 | −237 | −205 | −173 | −141 | −109 | −77 | −45 | −13 | 19 | 51 |
| 20 | −233 | −201 | −169 | −137 | −105 | −73 | −41 | −9 | 23 | 55 |
| 21 | −229 | −197 | −165 | −133 | −101 | −69 | −37 | −7 | 27 | 59 |
| 22 | −225 | −193 | −161 | −130 | −97 | −65 | −33 | −126 | 31 | 63 |
| 23 | −221 | −189 | −157 | −125 | −93 | −61 | −29 | −249 | 35 | 67 |
| 24 | −247 | −215 | −183 | −151 | −119 | −87 | −55 | −23 | 9 | 41 |
| 25 | −243 | −211 | −179 | −147 | −115 | −83 | −51 | −19 | 13 | 45 |
| 26 | −239 | −207 | −175 | −143 | −111 | −79 | −47 | −15 | 17 | 49 |
| 27 | −235 | −203 | −171 | −139 | −107 | −75 | −43 | −11 | 21 | 53 |
| 28 | −231 | −199 | −167 | −135 | −103 | −71 | −39 | −7 | 25 | 57 |
| 29 | −227 | −195 | −163 | −131 | −99 | −67 | −35 | −7 | 29 | 61 |
| 30 | −223 | −191 | −159 | −126 | −95 | −63 | −31 | −130 | 33 | 65 |
| 31 | −219 | −187 | −155 | −123 | −91 | −59 | −27 | −249 | 37 | 69 |

| Pattern idx | Pilot idx | | | | | |
|---|---|---|---|---|---|---|
| | 10 | 11 | 12 | 13 | 14 | 15 |
| 0 | 70 | 102 | 134 | 166 | 198 | 230 |
| 1 | 74 | 106 | 138 | 170 | 202 | 234 |
| 2 | 78 | 110 | 142 | 174 | 206 | 238 |
| 3 | 82 | 114 | 146 | 178 | 210 | 242 |
| 4 | 86 | 118 | 150 | 182 | 214 | 246 |
| 5 | 90 | 122 | 154 | 186 | 218 | 250 |
| 6 | 94 | 126 | 158 | 190 | 222 | 250 |
| 7 | 98 | 130 | 162 | 194 | 226 | 8 |
| 8 | 72 | 104 | 136 | 168 | 200 | 232 |
| 9 | 76 | 108 | 140 | 172 | 204 | 236 |
| 10 | 80 | 112 | 144 | 176 | 208 | 240 |
| 11 | 84 | 116 | 148 | 180 | 212 | 244 |
| 12 | 88 | 120 | 152 | 184 | 216 | 248 |
| 13 | 92 | 124 | 156 | 188 | 220 | 250 |
| 14 | 96 | 130 | 160 | 192 | 224 | 126 |
| 15 | 100 | 132 | 164 | 196 | 228 | 6 |
| 16 | 71 | 103 | 135 | 167 | 199 | 231 |
| 17 | 75 | 107 | 139 | 171 | 203 | 235 |
| 18 | 79 | 111 | 143 | 175 | 207 | 239 |
| 19 | 83 | 115 | 147 | 179 | 211 | 243 |
| 20 | 87 | 119 | 151 | 183 | 215 | 247 |
| 21 | 91 | 123 | 155 | 187 | 219 | 249 |
| 22 | 95 | 126 | 159 | 191 | 223 | 130 |
| 23 | 99 | 131 | 163 | 195 | 227 | 7 |
| 24 | 73 | 105 | 137 | 169 | 201 | 233 |
| 25 | 77 | 109 | 141 | 173 | 205 | 237 |

TABLE 13-continued

| | | | | | | |
|---|---|---|---|---|---|---|
| 26 | 81 | 113 | 145 | 177 | 209 | 241 |
| 27 | 85 | 117 | 149 | 181 | 213 | 245 |
| 28 | 89 | 121 | 153 | 185 | 217 | 249 |
| 29 | 93 | 125 | 157 | 189 | 221 | 249 |
| 30 | 97 | 130 | 161 | 193 | 225 | 126 |
| 31 | 101 | 133 | 165 | 197 | 229 | 7 |

Referring to Table 13, in the case where NSTS is 1, the position of the traveling pilot determined by Equations 1 and 2 is shown.

B) New Design Scheme 1

When the total number of pilots of 40 MHz of 802.11ax is Ptot_40 (even number), the pilot pattern proposed in the embodiment of the present invention is described below.

(1) NSTS=1

Hereinafter, Equations 3 to 5 show a pilot pattern newly proposed in the present invention in the case of NSTS=1.

In Equations 3 to 5 given below, idx2=0, 1, . . . , ceil(512/Ptot_40)−1. ceil(a) as a ceil operation of 'a' is a minimum integer value which is not smaller than 'a'.

$$idx1 = 0, 1, \ldots, Ptot_{40}/2-2$$

$$P^{40,NSTS}_{idx1,idx2} = -256 + NLG_{40} + idx2 + idx1 * \text{ceil}(512/Ptot_{40})$$ [Equation 3]

Referring to Equation 3, 0, 1, . . . , Ptot_40/2−2 pilots are mapped to the subcarriers at a subcarrier spacing of ceil(512/Ptot_40) from the most negative index except for the left guard tone.

$$idx1 = Ptot_{40}/2-1$$ [Equation 4]

$P^{40,NSTS}_{idx1,idx2} = -256 + NLG_{40} + idx2 + idx1 * \text{ceil}(512/Ptot_{40})$ if $-256 + NLG_{40} + idx2 + idx1 * \text{ceil}(512/Ptot_{40}) \leq -(NDC_{40}-1)/2-1$  $\hat{1}$ $P^{40,NSTS}_{idx1,idx2} = -(NDC_{40}-1)/2-1$ if $-256 + NLG_{40} + idx2 + idx1 * \text{ceil}(512/Ptot_{40}) > -(NDC_{40}-1)/2-1$ & $\text{mod}(-(NDC_{40}-1)/2-1,2) = \text{mod}(-256 + NLG_{40} + idx2 + idx1 * \text{ceil}(512/Ptot_{40}),2)$  $\hat{2}$ $P^{40,NSTS}_{idx1,idx2} = -(NDC_{40}-1)/2-2$ if $-256 + NLG_{40} + idx2 + idx1 * \text{ceil}(512/Ptot_{40}) > -(NDC_{40}-1)/2-1$ & $\text{mod}(-(NDC_{40}-1)/2-2,2) = \text{mod}(-256 + NLG_{40} + idx2 + idx1 * \text{ceil}(512/Ptot_{40}),2)$  $\hat{3}$ Referring to Equation 4, when the pilots are mapped at the subcarrier spacing of ceil(512/Ptot_40) as shown in Equation 3 given above, in the case where the Ptot_40/2−1 pilot is positioned at the left side of the DC tone ($\hat{1}$), the Ptot_40/2−1 pilot is mapped with the subcarrier spacing of ceil(512/Ptot_40) as described in ($\hat{1}$).

On the contrary, when the Ptot_40/2−1 pilot is positioned at the right side of a data subcarrier adjacent to the left side of the DC tone (e.g., when the Ptot_40/2−1 pilot is positioned in the DC tone) ($\hat{2}$) and ($\hat{3}$), the Ptot_40/2−1 pilot moves to the left side to be mapped to the data subcarrier adjacent to the left side of the DC tone. As a result, spacing between the Ptot_40/2−1 pilot and a pilot (that is, Ptot_40/2−2 pilot) having the previous index is smaller than ceil(512/Ptot_40).

In this case, when it is assumed that the Ptot_40/2−1 pilot is mapped with the ceil(512/Ptot_40) subcarrier spacing, in the case where subcarrier indexes to be mapped are odd, the Ptot_40/2−1 pilot is mapped to data subcarrier having odd index, which is adjacent to the left side of the DC tone ($\hat{2}$) and in the case where the subcarrier indexes to be mapped are even, the Ptot_40/2−1 pilot is mapped to data subcarrier having even index, which is adjacent to the left side of the DC tone ($\hat{3}$).

$$idx1 = Ptot_{40}/2, \ldots, Ptot_{40}-1$$

$$P^{40,NSTS}_{idx1,idx2} = -P^{40,NSTS}_{Ptot40-1-idx1,idx2}$$ [Equation 5]

Referring to Equation 5, the position of the pilot mapped to the left data tone matches the right data tone by a mirroring scheme according to Equations 3 and 4 given above.

In Equations 3 to 5 given above, since the total number of pilot patterns idx2 is ceil(512/Ptot_40), the pilot pattern period is ceil(512/Ptot_40).

The pilot pattern designed by using the scheme is shown in Table 14.

Table 14 is a diagram showing the traveling pilot pattern according to the embodiment of the present invention.

TABLE 14

| Pattern idx | Pilot idx | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | −244 | −243 | −242 | −241 | −240 | −239 | −238 | −237 | −236 | −235 | −234 | −233 | −232 | −231 | −230 | −229 |
| 1 | −212 | −211 | −210 | −209 | −208 | −207 | −206 | −205 | −204 | −203 | −202 | −201 | −200 | −199 | −198 | −197 |
| 2 | −180 | −179 | −178 | −177 | −176 | −175 | −174 | −173 | −172 | −171 | −170 | −169 | −168 | −167 | −166 | −165 |
| 3 | −148 | −147 | −146 | −145 | −144 | −143 | −142 | −141 | −140 | −139 | −138 | −137 | −136 | −135 | −134 | −133 |
| 4 | −116 | −115 | −114 | −113 | −112 | −111 | −110 | −109 | −108 | −107 | −106 | −105 | −104 | −103 | −102 | −101 |
| 5 | −84 | −83 | −82 | −81 | −80 | −79 | −78 | −77 | −76 | −75 | −74 | −73 | −72 | −71 | −70 | −69 |
| 6 | −52 | −51 | −50 | −49 | −48 | −47 | −46 | −45 | −44 | −43 | −42 | −41 | −40 | −39 | −38 | −37 |
| 7 | −20 | −19 | −18 | −17 | −16 | −15 | −14 | −13 | −12 | −11 | −10 | −9 | −8 | −7 | −6 | −5 |
| 8 | 20 | 19 | 18 | 17 | 16 | 15 | 14 | 13 | 12 | 11 | 10 | 9 | 8 | 7 | 6 | 5 |
| 9 | 52 | 51 | 50 | 49 | 48 | 47 | 46 | 45 | 44 | 43 | 42 | 41 | 40 | 39 | 38 | 37 |
| 10 | 84 | 83 | 82 | 81 | 80 | 79 | 78 | 77 | 76 | 75 | 74 | 73 | 72 | 71 | 70 | 69 |
| 11 | 116 | 115 | 114 | 113 | 112 | 111 | 110 | 109 | 108 | 107 | 106 | 105 | 104 | 103 | 102 | 101 |
| 12 | 148 | 147 | 146 | 145 | 144 | 143 | 142 | 141 | 140 | 139 | 138 | 137 | 136 | 135 | 134 | 133 |
| 13 | 180 | 179 | 178 | 177 | 176 | 175 | 174 | 173 | 172 | 171 | 170 | 169 | 168 | 167 | 166 | 165 |
| 14 | 212 | 211 | 210 | 209 | 208 | 207 | 206 | 205 | 204 | 203 | 202 | 201 | 200 | 199 | 198 | 197 |
| 15 | 244 | 243 | 242 | 241 | 240 | 239 | 238 | 237 | 236 | 235 | 234 | 233 | 232 | 231 | 230 | 229 |

TABLE 14-continued

| Pattern idx | Pilot idx | | | | | | | | | | | | | | | |
|---|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 | 31 |
| 0 | −228 | −227 | −226 | −225 | −224 | −223 | −222 | −221 | −220 | −219 | −218 | −217 | −216 | −215 | −214 | −213 |
| 1 | −196 | −195 | −194 | −193 | −192 | −191 | −190 | −189 | −188 | −187 | −186 | −185 | −184 | −183 | −182 | −181 |
| 2 | −164 | −163 | −162 | −161 | −160 | −159 | −158 | −157 | −156 | −155 | −154 | −153 | −152 | −151 | −150 | −149 |
| 3 | −132 | −131 | −130 | −129 | −128 | −127 | −126 | −125 | −124 | −123 | −122 | −121 | −120 | −119 | −118 | −117 |
| 4 | −100 | −99 | −98 | −97 | −96 | −95 | −94 | −93 | −92 | −91 | −90 | −89 | −88 | −87 | −86 | −85 |
| 5 | −68 | −67 | −66 | −65 | −64 | −63 | −62 | −61 | −60 | −59 | −58 | −57 | −56 | −55 | −54 | −53 |
| 6 | −36 | −35 | −34 | −33 | −32 | −31 | −30 | −29 | −28 | −27 | −26 | −25 | −24 | −23 | −22 | −21 |
| 7 | −4 | −3 | −4 | −3 | −4 | −3 | −4 | −3 | −4 | −3 | −4 | −3 | −4 | −3 | −4 | −3 |
| 8 | 4 | 3 | 4 | 3 | 4 | 3 | 4 | 3 | 4 | 3 | 4 | 3 | 4 | 3 | 4 | 3 |
| 9 | 36 | 35 | 34 | 33 | 32 | 31 | 30 | 29 | 28 | 27 | 26 | 25 | 24 | 23 | 22 | 21 |
| 10 | 68 | 67 | 66 | 65 | 64 | 63 | 62 | 61 | 60 | 59 | 58 | 57 | 56 | 55 | 54 | 53 |
| 11 | 100 | 99 | 98 | 97 | 96 | 95 | 94 | 93 | 92 | 91 | 90 | 89 | 88 | 87 | 86 | 85 |
| 12 | 132 | 131 | 130 | 129 | 128 | 127 | 126 | 125 | 124 | 123 | 122 | 121 | 120 | 119 | 118 | 117 |
| 13 | 164 | 163 | 162 | 161 | 160 | 159 | 158 | 157 | 156 | 155 | 154 | 153 | 152 | 151 | 150 | 149 |
| 14 | 196 | 195 | 194 | 193 | 192 | 191 | 190 | 189 | 188 | 187 | 186 | 185 | 184 | 183 | 182 | 181 |
| 15 | 228 | 227 | 226 | 225 | 224 | 223 | 222 | 221 | 220 | 219 | 218 | 217 | 216 | 215 | 214 | 213 |

Referring to Table 14, in the case where NSTS is 1, the position of the traveling pilot determined by Equations 3 to 5 given above is shown.

Meanwhile, Equations 6 to 8 given below show a pilot pattern newly proposed in the present invention in the case of NSTS=1.

In Equations 6 to 8 given below, idx2=0,1, . . . , ceil(484/Ptot_40)−1. ceil(a) as the ceil operation of 'a' is the minimum integer value which is not smaller than 'a'.

$$idx1=0,1,\ldots,Ptot_{40}/2-2$$

$$P^{40,NSTS}_{idx1,idx2} = -256+NLG_{40}+idx2+idx1*\text{ceil}(484/Ptot_{40})$$ [Equation 6]

Referring to Equation 6, 0, 1, . . . , Ptot_40/2−2 pilots are mapped to the subcarriers at the subcarrier spacing of ceil(484/Ptot_40) from the most negative index except for the left guard tone.

$$idx1=Ptot_{40}/2-1$$ [Equation 7]

$$P^{40,NSTS}_{idx1,idx2} = -256+NLG_{40}+idx2+idx1*\text{ceil}(484/Ptot_{40}) \text{ if } -256+NLG_{40}+idx2+idx1*\text{ceil}(484/Ptot_{40}) \le -(NDC_{40}-1)/2-1 \quad \hat{1}$$

$$P^{40,NSTS}_{idx1,idx2} = -(NDC_{40}-1)/2-1 \text{ if } -256+NLG_{40}+idx2+idx1*\text{ceil}(484/Ptot_{40}) > -(NDC_{40}-1)/2-1 \text{ \& } \text{mod}(-(NDC_{40}-1)/2-1,2)=\text{mod}(-256+NLG_{40}+idx2+idx1*\text{ceil}(484/Ptot_{40}),2) \quad \hat{2}$$

$$P^{40,NSTS}_{idx1,idx2} = -(NDC_{40}-1)/2-2 \text{ if } -256+NLG_{40}+idx2+idx1*\text{ceil}(484/Ptot_{40}) > -(NDC_{40}-1)/2-1 \text{ \& } \text{mod}(-(NDC_{40}-1)/2-2,2)=\text{mod}(-256+NLG_{40}+idx2+idx1*\text{ceil}(484/Ptot_{40}),2) \quad \hat{3}$$

Referring to Equation 7, when the pilots are mapped at the subcarrier spacing of ceil(484/Ptot_40) as shown in Equation 6 given above, in the case where the Ptot_40/2−1 pilot is positioned at the left side of the DC tone ($\hat{1}$), the Ptot_40/2−1 pilot is mapped with the subcarrier spacing of ceil(484/Ptot_40) as described in ($\hat{1}$).

On the contrary, when the Ptot_40/2−1 pilot is positioned at the right side of a data subcarrier adjacent to the left side of the DC tone (e.g., when the Ptot_40/2−1 pilot is positioned in the DC tone) ($\hat{2}$) and ($\hat{3}$), the Ptot_40/2−1 pilot moves to the left side to be mapped to the data subcarrier adjacent to the left side of the DC tone. As a result, the spacing between the Ptot_40/2−1 pilot and the pilot (that is, Ptot_40/2−2 pilot) having the previous index is smaller than ceil(484/Ptot_40).

In this case, when it is assumed that the Ptot_40/2−1 pilot is mapped with the ceil(512/Ptot_40) subcarrier spacing, in the case where subcarrier indexes to be mapped are odd, the Ptot_40/2−1 pilot is mapped to data subcarrier having odd index, which is adjacent to the left side of the DC tone ($\hat{2}$) and in the case where the subcarrier indexes to be mapped are even, the Ptot_40/2−1 pilot is mapped to data subcarrier having even index, which is adjacent to the left side of the DC tone ($\hat{3}$).

$$idx1=Ptot_{40}/2,\ldots,Ptot_{40}-1$$

$$P^{40,NSTS}_{idx1,idx2} = -P^{40,NSTS}_{Ptot40-1-idx1,idx2}$$ [Equation 8]

Referring to Equation 8, the position of the pilot mapped to the left data tone matches the right data tone by the mirroring scheme according to Equations 6 and 7 given above.

In Equations 6 to 8 given above, since the total number of pilot patterns idx2 is ceil(484/Ptot_40), the pilot pattern period is ceil(484/Ptot_40).

As described above, the pilot pattern period means the period in which the allocation of the pilot pattern is repeated and means the period in which all pattern patterns are allocated once when predetermined pilot patterns are allocated sequentially (alternatively, at a predetermined pattern). That is, the same pilot pattern is not allocated plural times within one pilot pattern period and each pilot pattern is allocated once within one pilot pattern period.

As described above, the pilot tones are mapped to the subcarriers corresponding to different pattern indexes for each data symbol, and as a result, the pilot tones may be mapped to all data subcarriers at one traveling pilot pattern period.

In this case, pilot patterns defined in an order in which the pilot pattern index increases may be allocated to the respective data symbols (and/or the SIG and LTF symbols) in an order in which the symbol index increases.

Alternatively, the pilot patterns may be allocated to the respective data symbols (and/or the SIG and LTF symbols) with a predetermined pattern (alternatively, order) in the order in which the symbol index increases. Herein, the predetermined pattern (alternatively, order) to which the pilot pattern is allocated may be determined in an order in which the pilot pattern index cyclically increases at an interval of integer n until all pilot patterns are allocated within the pilot period. For example, the pattern indexes may be allocated in the order of 0,4,8, . . . , 1,5,9, . . . , 2,6,10, . . . , 3,7,11, . . . according to the order of the data symbol and when all patterns are completely used, the pilot patterns may be allocated by a scheme of 0,4,8, . . . , 1,5,9, . . . , 2,6,10, . . . , 3,7,11, . . . all over again. Further, unlike the above illustration, units including 2, 8, etc. may be used in addition to a unit of 4. Since a channel correlation between subcarriers close to each other in the frequency domain exists, the pilot patterns are allocated in the order in which the pilot pattern index increases at the interval of integer n to enhance the performance of the channel estimation.

Further, various patterns (alternatively, orders) regarding the allocation order of the pilot patterns such as a case where the pilot patterns may be allocated in a predetermined order within one pilot pattern, etc. may be applied.

(2) NSTS≥2

The pilot pattern proposed in (1) NSTS=1 given above may be reused or only some of the pilot patterns proposed in (1) NSTS=1 given above may be reused.

As one example of reusing only some of the pilot patterns proposed in (1) NSTS=1 given above, only the pilot pattern which meets mod(pattern index, NSTS)=n may be reused. Herein, n corresponds to a predetermined value among 0, 1, 2, . . . , NSTS-1. Herein, mod indicates the modular operation.

C) New Design Scheme 2

When the total number of pilots of 40 MHz of 802.11ax is Ptot_40 (even number), the pilot pattern proposed in the embodiment of the present invention is described below.

(1) NSTS=1

Hereinafter, Equations 9 to 11 show the pilot pattern newly proposed in the present invention in the case of NSTS=1.

In Equations 9 to 11 given below, idx2=0,1, . . . , ceil(512/Ptot_40)-1. ceil(a) as the ceil operation of 'a' is the minimum integer value which is not smaller than 'a'.

$idx1=0,1, \ldots ,Ptot_{40}/2-2, Ptot_{40}/2+1, \ldots , Ptot_{40}-2$ $P^{40,NSTS}_{idx1,idx2}=-256+NLG_{40}+idx2+idx1*ceil(512/Ptot_{40})$    [Equation 9]

Referring to Equation 9, 0, 1, Ptot_40/2-2, Ptot_40/2+1, . . . , Ptot_40-2 pilots are mapped to the subcarriers at the subcarrier spacing of ceil(512/Ptot_40) from the most negative index except for the left guard tone.

$idx1=Ptot_{40}/2-1, Ptot_{40}/2$    [Equation 10]

$P^{40,NSTS}_{idx1,idx2}=-256+NLG_{40}+idx_2+idx1*ceil(512/Ptot_{40})$ if $-256+NLG_{40}+idx2+idx1*ceil(512/Ptot_{40})\leq-(NDC_{40}-1)/2-1$ or $-256+NLG_{40}+idx2+idx1*ceil(512/Ptot_{40})\geq+(NDC_{40}-1)/2+1$    $\hat{1}$ $P^{40,NSTS}_{idx1,idx2}=-(NDC_{40}-1)/2-1$ if $-(NDC_{40}-1)/2-1<-256+NLG_{40}+idx2+idx1*ceil(512/Ptot_{40})<0$ & mod$(-(NDC_{40}-1)/2-1,2)=$mod$(-256+NLG_{40}+idx2+idx1*ceil(512/Ptot_{40}),2)$    $\hat{2}$ $P^{40,NSTS}_{idx1,idx2}=-(NDC_{40}-1)/2-2$ if $-(NDC_{40}-1)/2-1<-256+NLG_{40}+idx2+idx1*ceil(512/Ptot_{40})<0$ & mod$(-(NDC_{40}-1)/2-2,2)=$mod$(-256+NLG_{40}+idx2+idx1*ceil(512/Ptot_{40}),2)$    $\hat{3}$ $P^{40,NSTS}_{idx1,idx2}=+(NDC_{40}-1)/2+1$ if $0\leq-256+NLG_{40}+idx2+idx1*ceil(512/Ptot_{40})<+(NDC_{40}-1)/2+1$ & mod$(+(NDC_{40}-1)/2+1,2)=$mod$(-256+NLG_{40}+idx1*ceil(512/Ptot_{40}),2)$    $\hat{4}$ $P^{40,NSTS}_{idx1,idx2}=+(NDC_{40}-1)/2+2$ if $0\leq-256+NLG_{40}+idx2+idx1*ceil(512/Ptot_{40})<+(NDC_{40}-1)/2+1$ & mod$(+(NDC_{40}-1)/2+2,2)=$mod$(P^{40,NSTS}_{0,idx2}+idx1*ceil(512/Ptot_{40}),2)$    $\hat{5}$ Referring to Equation 10, when the pilots are mapped at the subcarrier spacing of ceil(512/Ptot_40) as shown in Equation 9 given above, in the case where the Ptot_40/2-1 pilot and/or the Ptot_40/2 pilot are/is not positioned in the DC tone ($\hat{1}$), the Ptot_40/2-1 pilot and/or the Ptot_40/2 pilot are mapped at the subcarrier spacing of ceil(512/Ptot_40) as described in ($\hat{1}$).

On the contrary, in the case where the Ptot_40/2-1 pilot and/or the Ptot_40/2 pilot are/is positioned in the left DC tone (that is, the DC tone having the negative index) ($\hat{2}$) and ($\hat{3}$), the Ptot_40/2-1 pilot and/or the Ptot_40/2 pilot move to the left side to be mapped to the data subcarriers adjacent to the left side of the DC tone. As a result, the spacing between the Ptot_40/2-1 pilot and/or the Ptot_40/2 pilot and the pilot (that is, Ptot_40/2-2 pilot) adjacent to the left side is smaller than ceil(512/Ptot_40).

In this case, when it is assumed that the Ptot_40/2-1 pilot and/or the Ptot_40/2 pilot are/is mapped with the ceil(512/Ptot_40) subcarrier spacing, in the case where subcarrier indexes to be mapped are odd, the Ptot_40/2-1 pilot and/or the Ptot_40/2 pilot are/is mapped to data subcarriers/subcarrier having odd indexes/index, which are/is adjacent to the left side of the DC tone ($\hat{2}$) and in the case where the subcarrier indexes to be mapped are even, the Ptot_40/2-1 pilot and/or the Ptot_40/2 pilot are/is mapped to data subcarriers/subcarrier having even indexes/index, which are/is adjacent to the left side of the DC tone ($\hat{3}$).

Further, in the case where the Ptot_40/2-1 pilot and/or the Ptot_40/2 pilot are/is positioned in the right DC tone (that is, the DC tone having the positive index) ($\hat{4}$) and ($\hat{5}$), the Ptot_40/2-1 pilot and/or the Ptot_40/2 pilot move to the right side to be mapped to the data subcarriers adjacent to the right side of the DC tone. As a result, the spacing between the Ptot_40/2-1 pilot and/or the Ptot_40/2 pilot and the pilot (that is, Ptot_40/2+1 pilot) adjacent to the right side is smaller than ceil(512/Ptot_40).

In this case, when it is assumed that the Ptot_40/2-1 pilot and/or the Ptot_40/2 pilot are/is mapped with the ceil(512/Ptot_40) subcarrier spacing, in the case where the subcarrier indexes to be mapped are odd, the Ptot_40/2-1 pilot and/or the Ptot_40/2 pilot are/is mapped to data subcarriers/subcarrier having odd indexes/index, which are/is adjacent to the right side of the DC tone ($\hat{4}$) and in the case where the subcarrier indexes to be mapped are even, the Ptot_40/2-1 pilot and/or the Ptot_40/2 pilot are/is mapped to data subcarriers/subcarrier having even indexes/index, which are/is adjacent to the right side of the DC tone ($\hat{5}$).

$idx1=Ptot_{40}-1$    [Equation 11]

$P^{40,NSTS}_{idx1,idx2}=-256+NLG_{40}+idx2+idx1*ceil(512/Ptot_{40})$ if $-256+NLG_{40}+idx2+idx1*ceil(512/Ptot_{40})\leq+255-(NLG_{40}-1)$    $\hat{1}$ $P^{40,NSTS}_{idx1,idx2}=+255-(NLG_{40}-1)$ if $-256+NLG_{40}+idx2+idx1*ceil(512/Ptot_{40})>+255-(NLG_{40}-1)$ & $P^{40,NSTS}_{Ptot40/2-1,idx2}<0$ & mod$(+255-(NLG_{40}-1),2)=$mod$(-256+NLG_{40}+idx2+idx1*ceil(512/Ptot_{40}),2)$    $\hat{2}$ $P^{40,NSTS}_{idx1,idx2}=+255-(NLG_{40}-1)-1$ if $-256+NLG_{40}+idx2+idx1*ceil(512/Ptot_{40})>+255-(NLG_{40}-1)$ & $P^{40,NSTS}_{Ptot40/2-1,idx2}<0$ & mod$(+255-(NLG_{40}-1)-1,2)=$mod$(-256+NLG_{40}+idx2+idx1*ceil(512/Ptot_{40}),2)$    $\hat{3}$ $P^{40,NSTS}_{idx1,idx2}=-256+NLG_{40}$ if $-256+NLG_{40}+idx2+idx1*ceil(512/Ptot_{40})>+255-(NLG_{40}-1)$ & $P^{40,NSTS}_{Ptot40/2-1,idx2}\geq0$ & mod$(-256+NLG_{40},2)=$mod$(-256+NLG_{40}+idx2+idx1*ceil(512/Ptot_{40}),2)$    $\hat{4}$ $P^{40,NSTS}_{idx1,idx2}=-256+NLG_{40}+1$ if $-256+NLG_{40}+idx2+idx1*\text{ceil}(512/Ptot_{40})>+255-(NLG_{40}-1)$ & $P^{40,NSTS}_{Ptot40/2-1,idx2}\geq 0$ & $\text{mod}(-256+NLG_{40}+1,2)=\text{mod}(-256+NLG_{40}+idx2+idx1*\text{ceil}(512/Ptot_{40}),2)$  (5̂)

Referring to Equation 11, when the pilots are mapped at the subcarrier spacing of ceil(512/Ptot_40) as shown in Equation 9 given above, in the case where the Ptot_40-1 pilot is not positioned in the right guard tone (1̂), the Ptot_40-1 pilot is mapped with the subcarrier spacing of ceil(512/Ptot_40) as described in (1̂).

On the contrary, when the Ptot_40-1 pilot is positioned in the right guard tone (2̂), (3̂), and (4̂), the position of the Ptot_40-1 pilot is determined according to the position of the Ptot_40/2-1 determined by Equation 10 given above.

In the case where the Ptot_40/2-1 pilot has the negative index, this case means that a half of all pilots are mapped to the left data subcarriers based on the DC tone. Therefore, the Ptot_40-1 pilot moves to the left side to be mapped to the data subcarrier adjacent to the left side of the right guard tone (2̂) and (3̂). As a result, the spacing between the Ptot_40-1 pilot and the pilot (that is, Ptot_40-2 pilot) having the previous index is smaller than ceil(512/Ptot_40).

In this case, when it is assumed that the Ptot_40-1 pilot is mapped with the ceil(512/Ptot_40) subcarrier spacing, in the case where the subcarrier indexes to be mapped are odd, the Ptot_40-1 pilot is mapped to data subcarrier having the odd index, which is adjacent to the left side of the right guard tone and in the case where the subcarrier indexes to be mapped are even, the Ptot_40-1 pilot is mapped to data subcarrier having the even index, which is adjacent to the left side of the right guard tone.

On the contrary, in the case where the Ptot_40/2-1 pilot has the positive index, this case means that pilots which are smaller than a half of all pilots by one are mapped to the left data subcarriers based on the DC tone. Therefore, the Ptot_40-1 pilot moves to the left side (alternatively, cyclically moves) to be mapped to the data subcarrier adjacent to the right side of the left guard tone (4̂) and (5̂). As a result, when the interval of the pilots is cyclically calculated, the spacing between the Ptot_40-1 pilot and the pilot (that is, Ptot_40-2 pilot) having the previous index is smaller than ceil(512/Ptot_40).

In this case, when it is assumed that the Ptot_40-1 pilot is mapped with the ceil(512/Ptot_40) subcarrier spacing, in the case where the subcarrier indexes to be mapped are odd, the Ptot_40-1 pilot is mapped to data subcarrier having the odd index, which is adjacent to the right side of the left guard tone and in the case where the subcarrier indexes to be mapped are even, the Ptot_40-1 pilot is mapped to data subcarrier having the even index, which is adjacent to the right side of the left guard tone.

In Equations 9 to 11 given above, since the total number of pilot patterns idx2 is ceil(512/Ptot_40), the pilot pattern period is ceil(512/Ptot_40).

The pilot pattern designed by using the scheme is shown in Table 15.

Table 15 is a diagram showing the traveling pilot pattern according to the embodiment of the present invention.

TABLE 15

| Pattern idx | Pilot idx | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | −244 | −243 | −242 | −241 | −240 | −239 | −238 | −237 | −236 | −235 | −234 | −233 | −232 | −231 | −230 | −229 |
| 1 | −212 | −211 | −210 | −209 | −208 | −207 | −206 | −205 | −204 | −203 | −202 | −201 | −200 | −199 | −198 | −197 |
| 2 | −180 | −179 | −178 | −177 | −176 | −175 | −174 | −173 | −172 | −171 | −170 | −169 | −168 | −167 | −166 | −165 |
| 3 | −148 | −147 | −146 | −145 | −144 | −143 | −142 | −141 | −140 | −139 | −138 | −137 | −136 | −135 | −134 | −133 |
| 4 | −116 | −115 | −114 | −113 | −112 | −111 | −110 | −109 | −108 | −107 | −106 | −105 | −104 | −103 | −102 | −101 |
| 5 | −84 | −83 | −82 | −81 | −80 | −79 | −78 | −77 | −76 | −75 | −74 | −73 | −72 | −71 | −70 | −69 |
| 6 | −52 | −51 | −50 | −49 | −48 | −47 | −46 | −45 | −44 | −43 | −42 | −41 | −40 | −39 | −38 | −37 |
| 7 | −20 | −19 | −18 | −17 | −16 | −15 | −14 | −13 | −12 | −11 | −10 | −9 | −8 | −7 | −6 | −5 |
| 8 | 12 | 13 | 14 | 15 | 16 | 17 | 18 | 19 | 20 | 21 | 22 | 23 | 24 | 25 | 26 | 27 |
| 9 | 44 | 45 | 46 | 47 | 48 | 49 | 50 | 51 | 52 | 53 | 54 | 55 | 56 | 57 | 58 | 59 |
| 10 | 76 | 77 | 78 | 79 | 80 | 81 | 82 | 83 | 84 | 85 | 86 | 87 | 88 | 89 | 90 | 91 |
| 11 | 108 | 109 | 110 | 111 | 112 | 113 | 114 | 115 | 116 | 117 | 118 | 119 | 120 | 121 | 122 | 123 |
| 12 | 140 | 141 | 142 | 143 | 144 | 145 | 146 | 147 | 148 | 149 | 150 | 151 | 152 | 153 | 154 | 155 |
| 13 | 172 | 173 | 174 | 175 | 176 | 177 | 178 | 179 | 180 | 181 | 182 | 183 | 184 | 185 | 186 | 187 |
| 14 | 204 | 205 | 206 | 207 | 208 | 209 | 210 | 211 | 212 | 213 | 214 | 215 | 216 | 217 | 218 | 219 |
| 15 | 236 | 237 | 238 | 239 | 240 | 241 | 242 | 243 | 244 | 243 | 244 | 243 | 244 | 243 | 244 | 243 |

| Pattern idx | Pilot idx | | | | | | | | | | | | | | | |
|---|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 | 31 |
| 0 | −228 | −227 | −226 | −225 | −224 | −223 | −222 | −221 | −220 | −219 | −218 | −217 | −216 | −215 | −214 | −213 |
| 1 | −196 | −195 | −194 | −193 | −192 | −191 | −190 | −189 | −188 | −187 | −186 | −185 | −184 | −183 | −182 | −181 |
| 2 | −164 | −163 | −162 | −161 | −160 | −159 | −158 | −157 | −156 | −155 | −154 | −153 | −152 | −151 | −150 | −149 |
| 3 | −132 | −131 | −130 | −129 | −128 | −127 | −126 | −125 | −124 | −123 | −122 | −121 | −120 | −119 | −118 | −117 |
| 4 | −100 | −99 | −98 | −97 | −96 | −95 | −94 | −93 | −92 | −91 | −90 | −89 | −88 | −87 | −86 | −85 |
| 5 | −68 | −67 | −66 | −65 | −64 | −63 | −62 | −61 | −60 | −59 | −58 | −57 | −56 | −55 | −54 | −53 |
| 6 | −36 | −35 | −34 | −33 | −32 | −31 | −30 | −29 | −28 | −27 | −26 | −25 | −24 | −23 | −22 | −21 |
| 7 | −4 | −3 | −4 | −3 | 4 | 3 | 4 | 3 | 4 | 5 | 6 | 7 | 8 | 9 | 10 | 11 |
| 8 | 28 | 29 | 30 | 31 | 32 | 33 | 34 | 35 | 36 | 37 | 38 | 39 | 40 | 41 | 42 | 43 |
| 9 | 60 | 61 | 62 | 63 | 64 | 65 | 66 | 67 | 68 | 69 | 70 | 71 | 72 | 73 | 74 | 75 |
| 10 | 92 | 93 | 94 | 95 | 96 | 97 | 98 | 99 | 100 | 101 | 102 | 103 | 104 | 105 | 106 | 107 |
| 11 | 124 | 125 | 126 | 127 | 128 | 129 | 130 | 131 | 132 | 133 | 134 | 135 | 136 | 137 | 138 | 139 |
| 12 | 156 | 157 | 158 | 159 | 160 | 161 | 162 | 163 | 164 | 165 | 166 | 167 | 168 | 169 | 170 | 171 |
| 13 | 188 | 189 | 190 | 191 | 192 | 193 | 194 | 195 | 196 | 197 | 198 | 199 | 200 | 201 | 202 | 203 |
| 14 | 220 | 221 | 222 | 223 | 224 | 225 | 226 | 227 | 228 | 229 | 230 | 231 | 232 | 233 | 234 | 235 |
| 15 | 244 | 243 | 244 | 243 | −244 | −243 | −244 | −243 | −244 | −243 | −244 | −243 | −244 | −243 | −244 | −243 |

Referring to Table 15, in the case where NSTS is 1, the position of the traveling pilot determined by Equations 9 to 11 given above is shown.

Meanwhile, Equations 12 to 14 given below show a pilot pattern newly proposed in the present invention in the case of NSTS=1.

In Equations 12 to 14 given below, idx2=0,1, . . . , ceil(484/Ptot_40)−1. Herein, 484 may mean all subcarriers (that is, including the DC, a guard subcarrier, etc.) available at 40 MHz. ceil(a) as the ceil operation of 'a' is the minimum integer value which is not smaller than 'a'.

$$idx1=0,1,\ldots,Ptot_{40}/2-2,Ptot_{40}/2+1,\ldots,Ptot_{40}-2$$

$$P^{40,NSTS}_{idx1,idx2}=-256+NLG_{40}+idx2+idx1*\text{ceil}(484/Ptot_{40}) \quad \text{[Equation 12]}$$

Referring to Equation 12, 0, 1, Ptot_40/2−2, Ptot_40/2+1, . . . , Ptot_40−2 pilots are mapped to the subcarriers at the subcarrier spacing of ceil(484/Ptot_40) from the most negative index except for the left guard tone.

$$idx1=Ptot_{40}/2-1,Ptot_{40}/2 \quad \text{[Equation 13]}$$

$P^{40,NSTS}_{idx1,idx2}=-256+NLG_{40}+idx2+idx1*\text{ceil}(484/Ptot_{40})$ if $-256+NLG_{40}+idx2+idx1*\text{ceil}(484/Ptot_{40}) \leq -(NDC_{40}-1)/2-1$ or $-256+NLG_{40}+idx2+idx1*\text{ceil}(484/Ptot_{40}) \geq +(NDC_{40}-1)/2+1$  $\hat{1}$ $P^{40,NSTS}_{idx1,idx2}=-(NDC_{40}-1)/2-1$ if $-(NDC_{40}-1)/2-1 < -256+NLG_{40}+idx2+idx1*\text{ceil}(484/Ptot_{40}) < 0$ & mod$(-(NDC_{40}-1)/2-1,2)=$mod$(-256+NLG_{40}+idx2+idx1*\text{ceil}(484/Ptot_{40}),2)$  $\hat{2}$ $P^{40,NSTS}_{idx1,idx2}=-(NDC_{40}-1)/2-2$ if $-(NDC_{40}-1)/2-1 < -256+NLG_{40}+idx2+idx1*\text{ceil}(484/Ptot_{40}) < 0$ & mod$(-(NDC_{40}-1)/2-2,2)=$mod$(-256+NLG_{40}+idx2+idx1*\text{ceil}(484/Ptot_{40}),2)$  $\hat{3}$ $P^{40,NSTS}_{idx1,idx2}=+(NDC_{40}-1)/2+1$ if $0 \leq -256+NLG_{40}+idx2+idx1*\text{ceil}(484/Ptot_{40}) < +(NDC_{40}-1)/2+1$ & mod$(+(NDC_{40}-1)/2+1,2)=$mod$(-256+NLG_{40}+idx1*\text{ceil}(484/Ptot_{40}),2)$  $\hat{4}$ $P^{40,NSTS}_{idx1,idx2}=+(NDC_{40}-1)/2+2$ if $0 \leq -256+NLG_{40}+idx2+idx1*\text{ceil}(484/Ptot_{40}) < +(NDC_{40}-1)/2+1$ & mod$(+(NDC_{40}-1)/2+2,2)=$mod$(P^{40,NSTS}_{0,idx2}+idx1*\text{ceil}(484/Ptot_{40}),2)$  $\hat{5}$ Referring to Equation 13, when the pilots are mapped at the subcarrier spacing of ceil(484/Ptot_40) as shown in Equation 12 given above, in the case where the Ptot_40/2−1 pilot and/or the Ptot_40/2 pilot are/is not positioned in the DC tone ($\hat{1}$), the Ptot_40/2−1 pilot and/or the Ptot_40/2 pilot are mapped at the subcarrier spacing of ceil(484/Ptot_40) as described in ($\hat{1}$).

On the contrary, in the case where the Ptot_40/2−1 pilot and/or the Ptot_40/2 pilot are/is positioned at the left DC tone (that is, the DC tone having the negative index) ($\hat{2}$) and ($\hat{3}$), the Ptot_40/2−1 pilot and/or the Ptot_40/2 pilot move to the left side to be mapped to the data subcarriers adjacent to the left side of the DC tone. As a result, the spacing between the Ptot_40/2−1 pilot and/or the Ptot_40/2 pilot and the pilot (that is, Ptot_40/2−2 pilot) adjacent to the left side is smaller than ceil(484/Ptot_40).

In this case, when it is assumed that the Ptot_40/2−1 pilot and/or the Ptot_40/2 pilot are/is mapped with the ceil(484/Ptot_40) subcarrier spacing, in the case where subcarrier indexes to be mapped are odd, the Ptot_40/2−1 pilot and/or the Ptot_40/2 pilot are/is mapped to data subcarriers/subcarrier having odd indexes/index, which are/is adjacent to the left side of the DC tone ($\hat{2}$) and in the case where the subcarrier indexes to be mapped are even, the Ptot_40/2−1 pilot and/or the Ptot_40/2 pilot are/is mapped to data subcarriers/subcarrier having even indexes/index, which are/is adjacent to the left side of the DC tone ($\hat{3}$).

Further, in the case where the Ptot_40/2−1 pilot and/or the Ptot_40/2 pilot are/is positioned at the right DC tone (that is, the DC tone having the positive index) ($\hat{4}$) and ($\hat{5}$), the Ptot_40/2−1 pilot and/or the Ptot_40/2 pilot move to the right side to be mapped to the data subcarriers adjacent to the right side of the DC tone. As a result, the spacing between the Ptot_40/2−1 pilot and/or the Ptot_40/2 pilot and the pilot (that is, Ptot_40/2+1 pilot) adjacent to the right side is smaller than ceil(484/Ptot_40).

In this case, when it is assumed that the Ptot_40/2−1 pilot and/or the Ptot_40/2 pilot are/is mapped with the ceil(484/Ptot_40) subcarrier spacing, in the case where the subcarrier indexes to be mapped are odd, the Ptot_40/2−1 pilot and/or the Ptot_40/2 pilot are/is mapped to data subcarriers/subcarrier having the odd indexes/index, which are/is adjacent to the right side of the DC tone ($\hat{4}$) and in the case where the subcarrier indexes to be mapped are even, the Ptot_40/2−1 pilot and/or the Ptot_40/2 pilot are/is mapped to data subcarriers/subcarrier having the even indexes/index, which are/is adjacent to the right side of the DC tone ($\hat{5}$).

$$idx1=Ptot_{40}-1 \quad \text{[Equation 14]}$$

$P^{40,NSTS}_{idx1,idx2}=-256+NLG_{40}+idx2+idx1*\text{ceil}(484/Ptot_{40})$ if $-256+NLG_{40}+idx2+idx1*\text{ceil}(484/Ptot_{40}) \leq +255-(NLG_{40}-1)$  $\hat{1}$ $P^{40,NSTS}_{idx1,idx2}=+255-(NLG_{40}-1)$ if $-256+NLG_{40}+idx2+idx1*\text{ceil}(484/Ptot_{40}) > +255-(NLG_{40}-1)$ & $P^{40,NSTS}_{Ptot40/2-1,idx2} < 0$ & mod$(+255-(NLG_{40}-1),2)=$mod$(-256+NLG_{40}+idx2+idx1*\text{ceil}(484/Ptot_{40}),2)$  $\hat{2}$ $P^{40,NSTS}_{idx1,idx2}=+255-(NLG_{40}-1)-1$ if $-256+NLG_{40}+idx2+idx1*\text{ceil}(484/Ptot_{40}) > +255-(NLG_{40}-1)$ & $P^{40,NSTS}_{Ptot40/2-1,idx2} < 0$ & mod$(+255-(NLG_{40}-1)-1,2)=$mod$(-256+NLG_{40}+idx2+idx1*\text{ceil}(484/Ptot_{40}),2)$  $\hat{3}$ $P^{40,NSTS}_{idx1,idx2}=-256+NLG_{40}$ if $-256+NLG_{40}+idx2+idx1*\text{ceil}(484/Ptot_{40}) > +255-(NLG_{40}-1)$ & $P^{40,NSTS}_{Ptot40/2-1,idx2} \geq 0$ & mod$(-256+NLG_{40},2)=$mod$(-256+NLG_{40}+idx2+idx1*\text{ceil}(484/Ptot_{40}),2)$  $\hat{4}$ $P^{40,NSTS}_{idx1,idx2}=-256+NLG_{40}+1$ if $-256+NLG_{40}+idx2+idx1*\text{ceil}(484/Ptot_{40}) > +255-(NLG_{40}-1)$ & $P^{40,NSTS}_{Ptot40/2-1,idx2} \geq 0$ & mod$(-256+NLG_{40}+1,2)=$mod$(-256+NLG_{40}+idx2+idx1*\text{ceil}(484/Ptot_{40}),2)$  $\hat{5}$ Referring to Equation 14, when the pilots are mapped at the subcarrier spacing of ceil(484/Ptot_40) as shown in Equation 12 given above, in the case where the Ptot_40−1 pilot is not positioned in the right guard tone ($\hat{1}$), the Ptot_40−1 pilots are mapped at the subcarrier spacing of ceil(484/Ptot_40) as described in ($\hat{1}$).

On the contrary, when the Ptot_40−1 pilot is positioned in the right guard tone ($\hat{2}$), ($\hat{3}$), ($\hat{4}$), and ($\hat{5}$), the position of the Ptot_40−1 pilot is determined according to the position of the Ptot_40/2−1 determined by Equation 13 given above.

In the case where the Ptot_40/2−1 pilot has the negative index, this case means that a half of all pilots are mapped to the left data subcarriers based on the DC tone. Therefore, the Ptot_40−1 pilot moves to the left side to be mapped to the data subcarrier adjacent to the left side of the right guard tone ($\hat{2}$) and ($\hat{3}$). As a result, the spacing between the Ptot_40−1 pilot and the pilot (that is, Ptot_40−2 pilot) having the previous index is smaller than ceil(484/Ptot_40).

In this case, when it is assumed that the Ptot_40–1 pilot is mapped with the ceil(484/Ptot_40) subcarrier spacing, in the case where the subcarrier indexes to be mapped are odd, the Ptot_40–1 pilot is mapped to the data subcarrier having the odd index, which is adjacent to the left side of the right guard tone and in the case where the subcarrier indexes to be mapped are even, the Ptot_40–1 pilot is mapped to the data subcarrier having the even index, which is adjacent to the left side of the right guard tone.

On the contrary, in the case where the Ptot_40/2–1 pilot has the positive index, this case means that pilots which are smaller than a half of all pilots by one are mapped to the left data subcarriers based on the DC tone. Therefore, the Ptot_40–1 pilot moves to the left side (alternatively, cyclically moves) to be mapped to the data subcarrier adjacent to the right side of the left guard tone (4) and (5). As a result, when the interval of the pilots is cyclically calculated, the spacing between the Ptot_40–1 pilot and the pilot (that is, Ptot_40–2 pilot) having the previous index is smaller than ceil(484/Ptot_40).

In this case, when it is assumed that the Ptot_40–1 pilot is mapped with the ceil(484/Ptot_40) subcarrier spacing, in the case where the subcarrier indexes to be mapped are odd, the Ptot_40–1 pilot is mapped to the data subcarrier having the odd index, which is adjacent to the right side of the left guard tone and in the case where the subcarrier indexes to be mapped are even, the Ptot_40–1 pilot is mapped to the data subcarrier having the even index, which is adjacent to the right side of the left guard tone.

In Equations 12 to 14 given above, since the total number of pilot patterns idx2 is ceil(484/Ptot_40), the pilot pattern period is ceil(484/Ptot_40).

As described above, the pilot pattern period means the period in which the allocation of the pilot pattern is repeated and means the period in which all pattern patterns are allocated once when predetermined pilot patterns are allocated sequentially (alternatively, at a predetermined pattern). That is, the same pilot pattern is not allocated plural times within one pilot pattern period and each pilot pattern is allocated once within one pilot pattern period.

As described above, the pilot tones are mapped to the subcarriers corresponding to different pattern indexes for each data symbol, and as a result, the pilot tones may be mapped to all data subcarriers at one traveling pilot pattern period.

In this case, the pilot patterns defined in the order in which the pilot pattern index increases may be allocated to the respective data symbols (and/or the SIG and LTF symbols) in the order in which the symbol index increases.

Alternatively, the pilot patterns may be allocated to the respective data symbols (and/or the SIG and LTF symbols) with a predetermined pattern (alternatively, order) in the order in which the symbol index increases. Herein, the predetermined pattern (alternatively, order) to which the pilot pattern is allocated may be determined in an order in which the pilot pattern index cyclically increases at an interval of integer n until all pilot patterns are allocated within the pilot period. For example, the pattern indexes may be allocated in the order of 0,4,8, . . . , 1,5,9, . . . , 2,6,10, . . . , 3,7,11, . . . according to the order of the data symbol and when all patterns are completely used, the pilot patterns may be allocated by a scheme of 0,4,8, . . . , 1,5,9, . . . , 2,6,10, . . . , 3,7,11, . . . all over again. Further, unlike the above illustration, the units including 2, 8, etc. may be used in addition to the unit of 4. Since the channel correlation between subcarriers close to each other in the frequency domain exists, the pilot patterns are allocated in the order in which the pilot pattern index increases at the interval of integer n to enhance the performance of the channel estimation.

Further, various patterns (alternatively, orders) regarding the allocation order of the pilot patterns such as the case where the pilot patterns may be allocated in a predetermined order within one pilot pattern, etc. may be applied.

(2) NSTS≥2

The pilot pattern proposed in (1) NSTS=1 given above may be reused or only some of the pilot patterns proposed in (1) NSTS=1 given above may be reused.

As one example of reusing only some of the pilot patterns proposed in (1) NSTS=1 given above, only the pilot pattern which meets mod(pattern index, NSTS)=n may be reused. Herein, n corresponds to a predetermined value among 0, 1, 2, . . . , NSTS-1. Herein, mod indicates the modular operation.

3. 80 MHz PPDU (1024 FFT)

The scheme that duplicates the 256 FFT pilot patterns in the 40 MHz 512 FFT pilot pattern (alternatively, 20 MHz 256 FFT pilot pattern) described above and a new design scheme without using the 256 FFT pilot pattern in the 20 MHz PPDU are proposed as below.

A) Duplication Scheme

Hereinafter, a scheme in which the 40 MH 512 FFT pilot pattern is repeated twice is primarily described, but a scheme in which the 20 MHz 256 FFT pilot pattern is repeated four times may also be similarly applied.

The number of left guard tones is defined as NLG_80 and the number of right guard tones is defined as NLG_80-1 in 1024 FFT of 80 MHz of 802.11ax. In addition, the number of DC tones is defined as NDC_80.

As such, when the numbers of guard tones and DC tones are defined, one pilot pattern (that is, the left pilot pattern based on the DC) covers up to $-512+NLG\_80$ to $-(NDC\_80-1)/2-1$ tones and the other pilot pattern (that is, the right pilot pattern based on the DC) covers $+(NDC\_80-1)/2+1$ to $+511-(NLG\_80-1)$ tones. The total number of pilots used in this case is referred to as Ptot_80 and is two times larger than the number of 40 MHz pilots.

When the total number of used pilots is expressed by the equation, the total number of used pilots is shown in Equation 15 (the left pilot pattern) and Equation 16 (the right pilot pattern).

$$idx1=0,1, \ldots, Ptot_{80}/2-1$$

$$P^{80,NSTS}_{idx1,idx2}=P^{40,NSTS}_{idx1,idx2}-256 \qquad \text{[Equation 15]}$$

$$idx1=Ptot_{80}/2, Ptot_{80}/2+1, \ldots, Ptot_{80}-1$$

$$P^{80,NSTS}_{idx1,idx2}=P^{40,NSTS}_{idx1,idx2}+256 \qquad \text{[Equation 16]}$$

Herein, $P^{80,NSTS}_{idx1,idx2}$ means the position of the pilot tone in the idx2 pilot pattern of the idx1 pilot in the case of NSTS streams at 80 MHz.

An 0-th pilot pattern in the case of NSTS=1 by using the 40 MHz duplication scheme pilot pattern by applying such an equation is shown in Table 16 given below.

TABLE 16

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| −506 | −474 | −442 | −410 | −378 | −346 | −314 | −282 | −250 | −218 | −186 | −154 | −122 | −90 | −58 | −26 |
| 16 | 17 | 18 | 19 | 20 | 21 | 22 | 23 | 24 | 25 | 26 | 27 | 28 | 29 | 30 | 31 |
| 6 | 38 | 70 | 102 | 134 | 166 | 198 | 230 | 262 | 294 | 326 | 358 | 390 | 422 | 454 | 486 |

B) New Design Scheme 1

When the total number of pilots of 80 MHz of 802.11ax is Ptot_80, the pilot pattern proposed in the embodiment of the present invention is described below.

(1) NSTS=1

Hereinafter, Equations 17 to 19 show the pilot pattern newly proposed in the present invention in the case of NSTS=1.

In Equations 17 to 19 given below, idx2=0,1, . . . , ceil(1024/Ptot_80)−1. ceil(a) as the ceil operation of 'a' is the minimum integer value which is not smaller than 'a'.

$$idx1 = 0, 1, \ldots, Ptot_{80}/2-2$$

$$P^{80,NSTS}_{idx1,idx2} = -512 + NLG_{80} + idx2 + idx1 * \text{ceil}(1024/Ptot_{80}) \quad \text{[Equation 17]}$$

Referring to Equation 17, 0, 1, Ptot_80/2−2 pilots are mapped to the subcarriers at the subcarrier spacing of ceil(1024/Ptot_40) from the most negative index except for the left guard tone.

$$idx1 = Ptot_{80}/2-1$$

$$P^{80,NSTS}_{idx1,idx2} = -512 + NLG_{80} + idx2 + idx1 * \text{ceil}(1024/Ptot_{80}) \text{ if } -512 + NLG_{80} + idx2 + idx1 * \text{ceil}(1024/Ptot_{80}) \leq -(NDC_{80}-1)/2-1 \quad \hat{1}$$

$$P^{80,NSTS}_{idx1,idx2} = -(NDC_{80}-1)/2-1 \text{ if } -512 + NLG_{80} + idx2 + idx1 * \text{ceil}(1024/Ptot_{80}) > -(NDC_{80}-1)/2-1 \text{ \& mod}(-(NDC_{80}-1)/2-1,2) = \text{mod}(-512 + NLG_{80} + idx2 + idx1 * \text{ceil}(1024/Ptot_{80}),2) \quad \hat{2}$$

$$P^{80,NSTS}_{idx1,idx2} = -(NDC_{80}-1)/2-2 \text{ if } -512 + NLG_{80} + idx2 + idx1 * \text{ceil}(1024/Ptot_{80}) > -(NDC_{80}-1)/2-1 \text{ \& mod}(-(NDC_{80}-1)/2-2,2) = \text{mod}(-512 + NLG_{80} + idx2 + idx1 * \text{ceil}(1024/Ptot_{80}),2) \quad \hat{3}$$

Referring to Equation 18, when the pilots are mapped at the subcarrier spacing of ceil(1024/Ptot_80) as shown in Equation 17 given above, in the case where the Ptot_80/2−1 pilot is positioned at the left side of the DC tone ($\hat{1}$), the Ptot_80/2−1 pilots are mapped at the subcarrier spacing of ceil(1024/Ptot_80) as described in ($\hat{1}$).

On the contrary, when the Ptot_80/2−1 pilot is positioned at the right side of the data subcarrier adjacent to the left side of the DC tone (e.g., when the Ptot_80/2−1 pilot is positioned at the DC tone) ($\hat{2}$) and ($\hat{3}$), the Ptot_80/2−1 pilot moves to the left side to be mapped to the data subcarrier adjacent to the left side of the DC tone. As a result, the spacing between the Ptot_80/2−1 pilot and the pilot (that is, Ptot_80/2−2 pilot) having the previous index is smaller than ceil(1024/Ptot_80).

In this case, when it is assumed that the Ptot_80/2−1 pilot is mapped with the ceil(1024/Ptot_80) subcarrier spacing, in the case where the subcarrier indexes to be mapped are odd, the Ptot_80/2−1 pilot is mapped to the data subcarrier having the odd index, which is adjacent to the left side of the DC tone ($\hat{2}$) and in the case where the subcarrier indexes to be mapped are even, the Ptot_80/2−1 pilot is mapped to the data subcarrier having the even index, which is adjacent to the left side of the DC tone ($\hat{3}$).

$$idx1 = Ptot_{80}/2, \ldots, Ptot_{80}-1$$

$$P^{80,NSTS}_{idx1,idx2} = -P^{80,NSTS}_{Ptot80-1-idx1,idx2} \quad \text{[Equation 19]}$$

Referring to Equation 19, the position of the pilot mapped to the left data tone matches the right data tone by the mirroring scheme according to Equations 17 and 18 given above.

In Equations 17 to 19 given above, since the total number of pilot patterns idx2 is ceil(1024/Ptot_80), the pilot pattern period is ceil(1024/Ptot_80).

Meanwhile, Equations 20 to 22 given below show the pilot pattern newly proposed in the present invention in the case of NSTS=1.

In Equations 20 to 22 given below, idx2=0,1, . . . , ceil(996/Ptot_80)−1. Herein, 996 may mean all subcarriers (that is, including the DC, the guard subcarrier, etc.) usable at 80 MHz. ceil(a) as the ceil operation of 'a' is the minimum integer value which is not smaller than 'a'.

$$idx1 = 0, 1, \ldots, Ptot_{80}/2-2$$

$$P^{80,NSTS}_{idx1,idx2} = -512 + NLG_{80} + idx2 + idx1 * \text{ceil}(996/Ptot_{80}) \quad \text{[Equation 20]}$$

Referring to Equation 20, 0, 1, Ptot_80/2−2 pilots are mapped to the subcarriers at the subcarrier spacing of ceil(996/Ptot_80) from the most negative index except for the left guard tone.

$$idx1 = Ptot_{80}/2-1$$

$$P^{80,NSTS}_{idx1,idx2} = -512 + NLG_{80} + idx2 + idx1 * \text{ceil}(996/Ptot_{80}) \text{ if } -512 + NLG_{80} + idx2 + idx1 * \text{ceil}(996/Ptot_{80}) \leq -(NDC_{80}-1)/2-1 \quad \hat{1}$$

$$P^{80,NSTS}_{idx1,idx2} = -(NDC_{80}-1)/2-1 \text{ if } -512 + NLG_{80} + idx2 + idx1 * \text{ceil}(996/Ptot_{80}) > -(NDC_{80}-1)/2-1 \text{ \& mod}(-(NDC_{80}-1)/2-1,2) = \text{mod}(-512 + NLG_{80} + idx2 + idx1 * \text{ceil}(996/Ptot_{80}),2) \quad \hat{2}$$

$$P^{80,NSTS}_{idx1,idx2} = -(NDC_{80}-1)/2-2 \text{ if } -512 + NLG_{80} + idx2 + idx1 * \text{ceil}(996/Ptot_{80}) > -(NDC_{80}-1)/2-1 \text{ \& mod}(-(NDC_{80}-1)/2-2,2) = \text{mod}(-512 + NLG_{80} + idx2 + idx1 * \text{ceil}(996/Ptot_{80}),2) \quad \hat{3}$$

Referring to Equation 21, when the pilots are mapped at the subcarrier spacing of ceil(996/Ptot_80) as shown in Equation 20 given above, in the case where the Ptot_80/2−1 pilot is positioned at the left side of the DC tone ($\hat{1}$), the Ptot_80/2−1 pilots are mapped at the subcarrier spacing of ceil(996/Ptot_80) as described in ($\hat{1}$).

On the contrary, when the Ptot_80/2−1 pilot is positioned at the right side of the data subcarrier adjacent to the left side of the DC tone (e.g., when the Ptot_80/2−1 pilot is positioned at the DC tone) ($\hat{2}$) and ($\hat{3}$), the Ptot_80/2−1 pilot moves to the left side to be mapped to the data subcarrier adjacent to the left side of the DC tone. As a result, the spacing between the Ptot_80/2−1 pilot and the pilot (that is, Ptot_80/2−2 pilot) having the previous index is smaller than ceil(996/Ptot_80).

In this case, when it is assumed that the Ptot_80/2−1 pilot is mapped with the ceil(996/Ptot_80) subcarrier spacing, in the case where the subcarrier indexes to be mapped are odd, the Ptot_80/2−1 pilot is mapped to the data subcarrier having the odd index, which is adjacent to the left side of the DC tone ($\hat{2}$) and in the case where the subcarrier indexes to be mapped are even, the Ptot_80/2−1 pilot is mapped to the data subcarrier having the even index, which is adjacent to the left side of the DC tone ($\hat{3}$).

$$idx1 = Ptot_{80}/2, \ldots, Ptot_{80}-1$$

$$P^{80,NSTS}_{idx1,idx2} = -P^{80,NSTS}_{Ptot80-1-idx1,idx2} \quad \text{[Equation 22]}$$

Referring to Equation 22, the position of the pilot mapped to the left data tone matches the right data tone by the mirroring scheme according to Equations 20 and 21 given above.

In Equations 20 to 22 given above, since the total number of pilot patterns idx2 is ceil(996/Ptot_80), the pilot pattern period is ceil(996/Ptot_80).

As described above, the pilot pattern period means the period in which the allocation of the pilot pattern is repeated and means the period in which all pattern patterns are allocated once when predetermined pilot patterns are allocated sequentially (alternatively, at a predetermined pattern). That is, the same pilot pattern is not allocated plural times within one pilot pattern period and each pilot pattern is allocated once within one pilot pattern period.

As described above, the pilot tones are mapped to the subcarriers corresponding to different pattern indexes for each data symbol, and as a result, the pilot tones may be mapped to all data subcarriers at one traveling pilot pattern period.

In this case, the pilot patterns defined in the order in which the pilot pattern index increases may be allocated to the respective data symbols (and/or the SIG and LTF symbols) in the order in which the symbol index increases.

Alternatively, the pilot patterns may be allocated to the respective data symbols (and/or the SIG and LTF symbols) with a predetermined pattern (alternatively, order) in the order in which the symbol index increases. Herein, the predetermined pattern (alternatively, order) to which the pilot pattern is allocated may be determined in an order in which the pilot pattern index cyclically increases at an interval of integer n until all pilot patterns are allocated within the pilot period. For example, the pattern indexes may be allocated in the order of 0,4,8, . . . , 1,5,9, . . . , 2,6,10, . . . , 3,7,11, . . . according to the order of the data symbol and when all patterns are completely used, the pilot patterns may be allocated by a scheme of 0,4,8, . . . , 1,5,9, . . . , 2,6,10, . . . , 3,7,11, . . . all over again. Further, unlike the above illustration, the units including 2, 8, etc. may be used in addition to the unit of 4. Since the channel correlation between subcarriers close to each other in the frequency domain exists, the pilot patterns are allocated in the order in which the pilot pattern index increases at the interval of integer n to enhance the performance of the channel estimation.

Further, various patterns (alternatively, orders) regarding the allocation order of the pilot patterns such as the case where the pilot patterns may be allocated in a predetermined order within one pilot pattern, etc. may be applied.

(2) NSTS≥2

The pilot pattern proposed in (1) NSTS=1 given above may be reused or only some of the pilot patterns proposed in (1) NSTS=1 given above may be reused.

As one example of reusing only some of the pilot patterns proposed in (1) NSTS=1 given above, only the pilot pattern which meets mod(pattern index, NSTS)=n may be reused. Herein, n corresponds to a predetermined value among 0, 1, 2, . . . , NSTS-1. Herein, mod indicates the modular operation.

C) New Design Scheme 2

When the total number of pilots of 80 MHz of 802.11ax is Ptot_80, the pilot pattern proposed in the embodiment of the present invention is described below.

(1) NSTS=1

Hereinafter, Equations 23 to 25 show the pilot pattern newly proposed in the present invention in the case of NSTS=1.

In Equations 23 to 25 given below, idx2=0,1, . . . , ceil(1024/Ptot_80)−1. ceil(a) as the ceil operation of 'a' is the minimum integer value which is not smaller than 'a'.

$$idx1 = 0,1, \ldots, Ptot_{80}/2-2, Ptot_{80}/2+1, \ldots, Ptot_{80}-2$$

$$P^{80,NSTS}_{idx1,idx2} - 512 + NLG_{80} + idx2 + idx1 * \text{ceil}(1024/Ptot_{80}) \quad \text{[Equation 23]}$$

Referring to Equation 23, 0, 1, Ptot_80/2−2, Ptot_80/2+1, . . . , Ptot_80−2 pilots are mapped to the subcarriers at the subcarrier spacing of ceil(1024/Ptot_80) from the most negative index except for the left guard tone.

$$idx1 = Ptot_{80}/2-1, Ptot_{80}/2 \quad \text{[Equation 24]}$$

$P^{80,NSTS}_{idx1,idx2} + -512 + NLG_{80} + idx2 + idx1 * \text{ceil}(1024/Ptot_{80})$ if $-512 + NLG_{80} + idx2 + idx1 * \text{ceil}(1024/Ptot_{80}) \leq -(NDC_{80}-1)/2-1$ or $P^{80,NsTs}_{0,idx}2 + idx1 * \text{ceil}(1024/Ptot_{80}) \geq +(NDC_{80}-1)/2+1$ $\quad \hat{1}$ $P^{80,NSTS}_{idx1,idx2} = -(NDC_{80}-1)/2-1$ if $-(NDC_{80}-1)/2-1 < -512 + NLG_{80} + idx2 + idx1 * \text{ceil}(1024/Ptot_{80}) < 0$ & mod$(-(NDC_{80}-1)/2-1,2)$=mod$(-512 + NLG_{80} + idx2 + idx1 * \text{ceil}(1024/Ptot_{80}),2)$ $\quad \hat{2}$ $P^{80,NSTS}_{idx1,idx2} = -(NDC_{80}-1)/2-2$ if $-(NDC_{80}-1)/2-1 < -512 + NLG_{80} + idx2 + idx1 * \text{ceil}(1024/Ptot_{80}) < 0$ & mod$(-(NDC_{80}-1)/2-2,2)$=mod$(-512 + NLG_{80} + idx2 + idx1 * \text{ceil}(1024/Ptot_{80}),2)$ $\quad \hat{3}$ $P^{80,NsTs}_{idx1,idx2} + (NDC_{80}-1)/2+1$ if $0 \leq -512 + NLG_{80} + idx2 + idx1 * \text{ceil}(1024/Ptot_{80}) < +(NDC_{80}-1)/2+1$ & mod$(+(NDC_{80}-1)/2+1,2)$=mod$(-512 + NLG_{80} + idx2 + idx1 * \text{ceil}(1024/Ptot_{80}),2)$ $\quad \hat{4}$ $P^{80,NSTS}_{idx1,idx2} = +(NDC_{80}-1)/2+2$ if $0 \leq -512 + NLG_{80} + idx2 + idx1 * \text{ceil}(1024/Ptot_{80}) < +(NDC_{80}-1)/2+1$ & mod$(+(NDC_{80}-1)/2+2,2)$=mod$(-512 + NLG_{80} + idx2 + idx1 * \text{ceil}(1024/Ptot_{80}),2)$ $\quad \hat{5}$ Referring to Equation 24, when the pilots are mapped at the subcarrier spacing of ceil(1024/Ptot_80) as shown in Equation 23 given above, in the case where the Ptot_80/2−1 pilot and/or the Ptot_80/2 pilot are/is not positioned in the DC tone ($\hat{1}$), the Ptot_80/2−1 pilot and/or the Ptot_80/2 pilot are mapped at the subcarrier spacing of ceil(1024/Ptot_80) as described in ($\hat{1}$).

On the contrary, in the case where the Ptot_80/2−1 pilot and/or the Ptot_80/2 pilot are/is positioned at the left DC tone (that is, the DC tone having the negative index) ($\hat{2}$) and ($\hat{3}$), the Ptot_80/2−1 pilot and/or the Ptot_80/2 pilot move to the left side to be mapped to the data subcarriers adjacent to the left side of the DC tone. As a result, the spacing between the Ptot_80/2−1 pilot and/or the Ptot_80/2 pilot and the pilot (that is, Ptot_80/2−2 pilot) adjacent to the left side is smaller than ceil(1024/Ptot_80).

In this case, when it is assumed that the Ptot_80/2−1 pilot and/or the Ptot_80/2 pilot are/is mapped with the ceil(1024/Ptot_80) subcarrier spacing, in the case where subcarrier indexes to be mapped are odd, the Ptot_80/2−1 pilot and/or the Ptot_80/2 pilot are/is mapped to the data subcarriers/subcarrier having the odd indexes/index, which are/is adjacent to the left side of the DC tone ($\hat{2}$) and in the case where the subcarrier indexes to be mapped are even, the Ptot_80/

2-1 pilot and/or the Ptot_80/2 pilot are/is mapped to the data subcarriers/subcarrier having the even indexes/index, which are/is adjacent to the left side of the DC tone (③).

Further, in the case where the Ptot_80/2-1 pilot and/or the Ptot_80/2 pilot are/is positioned at the right DC tone (that is, the DC tone having the positive index) (④) and (⑤), the Ptot_80/2-1 pilot and/or the Ptot_80/2 pilot move to the right side to be mapped to the data subcarriers adjacent to the right side of the DC tone. As a result, the spacing between the Ptot_80/2-1 pilot and/or the Ptot_80/2 pilot and the pilot (that is, Ptot_80/2+1 pilot) adjacent to the right side is smaller than ceil(1024/Ptot_80).

In this case, when it is assumed that the Ptot_80/2-1 pilot and/or the Ptot_80/2 pilot are/is mapped with the ceil(1024/Ptot_80) subcarrier spacing, in the case where the subcarrier indexes to be mapped are odd, the Ptot_80/2-1 pilot and/or the Ptot_80/2 pilot are/is mapped to the data subcarriers/subcarrier having the odd indexes/index, which are/is adjacent to the right side of the DC tone (④) and in the case where the subcarrier indexes to be mapped are even, the Ptot_80/2-1 pilot and/or the Ptot_80/2 pilot are/is mapped to the data subcarriers/subcarrier having the even indexes/index, which are/is adjacent to the right side of the DC tone (⑤)

$$idx1 = Ptot_{80}-1 \quad \text{[Equation 25]}$$

$$P^{80,NSTS}_{idx1,idx2} = -512 + NLG_{80} + idx2 + idx1*\text{ceil}(1024/Ptot_{80}) \text{ if } -512 + NLG_{80} + idx2 + idx1*\text{ceil}(1024/Ptot_{80}) \leq +511 - (NLG_{80}-1) \quad \hat{1}$$

$$P^{80,NSTS}_{idx1,idx2} = -511 - (NLG_{80}-1) \text{ if } -512 + NLG_{80} + idx2 + idx1*\text{ceil}(1024/Ptot_{80}) > +511 - (NLG_{80}-1) \& P^{80,NSTS}_{Ptot80/2-1,idx}2 < 0 \& \text{mod}(+511-(NLG_{80}-1),2) = \text{mod}(-512+NLG_{80}+idx2+idx1*\text{ceil}(1024/Ptot_{80}),2) \quad \hat{2}$$

$$P^{80,NSTS}_{idx1,idx2} = +511 - (NLG_{80}-1) - 1 \text{ if } -512 + NLG_{80} + +idx1*\text{ceil}(1024/Ptot_{80}) > +511 - (NLG_{80}-1) \& P^{80,NSTS}_{Ptot80/2-1,idx}2 < 0 \& \text{mod}(+511-(NLG_{80}-1)-1,2) = \text{mod}(-512+NLG_{80}+idx2+idx1*\text{ceil}(1024/Ptot_{80}),2) \quad \hat{3}$$

$$P^{80,NSTS}_{idx1,idx2} = -512 + NLG_{80} \text{ if } -512 + NLG_{80} + idx2 + idx1*\text{ceil}(1024/Ptot_{80}) > +511 - (NLG_{80}-1) \& P^{80,NSTS}_{Ptot80/2-1,idx}2 \geq 0 \& \text{mod}(-512+NLG_{80},2) = \text{mod}(-512+NLG_{80}+idx2+idx1*\text{ceil}(1024/Ptot_{80}),2) \quad \hat{4}$$

$$P^{80,NSTS}_{idx1,idx2} = -512 + NLG_{80} + 1 \text{ if } -512 + NLG_{80} + idx2 + idx1*\text{ceil}(1024/Ptot_{80}) \geq +511 - (NLG_{80}-1) \& P^{80,NSTS}_{Ptot80/2-1,idx} \geq 0 \& \text{mod}(-512+NLG_{80}+1,2) = \text{mod}(-512+NLG_{80}+idx2+idx1*\text{ceil}(1024/Ptot_{80}),2) \quad \hat{5}$$

Referring to Equation 25, when the pilots are mapped at the subcarrier spacing of ceil(1024/Ptot_80) as shown in Equation 23 given above, in the case where the Ptot_80-1 pilot is not positioned in the right guard tone (①), the Ptot_80-1 pilots are mapped at the subcarrier spacing of ceil(1024/Ptot_80) as described in (①).

On the contrary, when the Ptot_80-1 pilot is positioned in the right guard tone (②), (③), (④), and (⑤), the position of the Ptot_80-1 pilot is determined according to the position of the Ptot_80/2-1 determined by Equation 24 given above.

In the case where the Ptot_80/2-1 pilot has the negative index, this case means that a half of all pilots are mapped to the left data subcarriers based on the DC tone. Therefore, the Ptot_80-1 pilot moves to the left side to be mapped to the data subcarrier adjacent to the left side of the right guard tone (②) and (③). As a result, the spacing between the Ptot_80-1 pilot and the pilot (that is, Ptot_80-2 pilot) having the previous index is smaller than ceil(1024/Ptot_80).

In this case, when it is assumed that the Ptot_80-1 pilot is mapped with the ceil(1024/Ptot_80) subcarrier spacing, in the case where the subcarrier indexes to be mapped are odd, the Ptot_80-1 pilot is mapped to the data subcarrier having the odd index, which is adjacent to the left side of the right guard tone and in the case where the subcarrier indexes to be mapped are even, the Ptot_80-1 pilot is mapped to the data subcarrier having the even index, which is adjacent to the left side of the right guard tone.

On the contrary, in the case where the Ptot_80/2-1 pilot has the positive index, this case means that pilots which are smaller than a half of all pilots by one are mapped to the left data subcarriers based on the DC tone. Therefore, the Ptot_80-1 pilot moves to the left side (alternatively, cyclically moves) to be mapped to the data subcarrier adjacent to the right side of the left guard tone (④) and (⑤). As a result, when the interval of the pilots is cyclically calculated, the spacing between the Ptot_80-1 pilot and the pilot (that is, Ptot_80-2 pilot) having the previous index is smaller than ceil(1024/Ptot_80).

In this case, when it is assumed that the Ptot_80-1 pilot is mapped with the ceil(1024/Ptot_80) subcarrier spacing, in the case where the subcarrier indexes to be mapped are odd, the Ptot_80-1 pilot is mapped to the data subcarrier having the odd index, which is adjacent to the right side of the left guard tone and in the case where the subcarrier indexes to be mapped are even, the Ptot_80-1 pilot is mapped to the data subcarrier having the even index, which is adjacent to the right side of the left guard tone.

In Equations 23 to 25 given above, since the total number of pilot patterns idx2 is ceil(1024/Ptot_80), the pilot pattern period is ceil(1024/Ptot_80).

Meanwhile, Equations 26 to 28 given below show the pilot pattern newly proposed in the present invention in the case of NSTS=1.

In Equations 26 to 28 given below, idx2=0,1, . . . , ceil(996/Ptot_80)-1. ceil(a) as the ceil operation of 'a' is the minimum integer value which is not smaller than 'a'.

$$idx1 = 0,1, \ldots, Ptot_{80}/2-2, Ptot_{80}/2+1, \ldots, Ptot_{80}-2$$

$$P^{80,NSTS}_{idx1,idx2} = -512 + NLG_{80} + idx2 + idx1*\text{ceil}(996/Ptot_{80}) \quad \text{[Equation 26]}$$

Referring to Equation 26, 0, 1, . . . , Ptot80/2-2, Ptot_80/2+1, . . . , Ptot_80-2 pilots are mapped to the subcarriers at the subcarrier spacing of ceil(996/Ptot_80) from the most negative index except for the left guard tone.

$$idx1 = Ptot_{80}/2-1, Ptot_{80}/2 \quad \text{[Equation 27]}$$

$$P^{80,NSTS}_{idx1,idx2} = -512 + NLG_{80} + idx2 + idx1*\text{ceil}(996/Ptot_{80}) \text{ if } -512 + NLG_{80} + idx2 + idx1*\text{ceil}(996/Ptot_{80}) \leq -(NDC_{80}-1)/2-1 \text{ or } P^{80,NSTS}_{0,idx}2 + idx1*\text{ceil}(996/Ptot_{80}) \geq +(NDC_{80}-1)/2+1 \quad \hat{1}$$

$$P^{80,NSTS}_{idx1,idx2} = -(NDC_{80}-1)/2-1 \text{ if } -(NDC_{80}-1)/2-1 < -512 + NLG_{80} + idx2 + idx1*\text{ceil}(996/Ptot_{80}) < 0 \& \text{mod}(-(NDC_{80}-1)/2-1,2) = \text{mod}(-512+NLG_{80}+idx2+idx1*\text{ceil}(996/Ptot_{80}),2) \quad \hat{2}$$

$$P^{80,NSTS}_{idx1,idx2} = -(NDC_{80}-1)/2-2 \text{ if } -(NDC_{80}-1)/2-1 < -512 + NLG_{80} + idx2 + idx1*\text{ceil}(996/Ptot_{80}) < 0 \& \text{mod}(-(NDC_{80}-1)/2-2,2) = \text{mod}(-512+NLG_{80}+idx2+idx1*\text{ceil}(996/Ptot_{80}),2) \quad \hat{3}$$

$$P^{80,NSTS}{}_{idx1,idx2} = +(NDC_{80}-1)/2+1 \text{ if } 0 \leq -512+ \\ NLG_{80}+idx2+idx1*\text{ceil}(996/Ptot_{80}) < +(NDC_{80}- \\ 1)/2+1 \text{ \& mod}(+(NDC_{80}-1)/2+1,2)=\text{mod}(-512+ \\ NLG_{80}+idx2+idx1*\text{ceil}(996/Ptot_{80}),2) \quad \hat{4}$$

$$P^{80,NSTS}{}_{idx1,idx2} = +(NDC_{80}-1)/2+2 \text{ if } 0 \leq -512+ \\ NLG_{80}+idx2+idx1*\text{ceil}(996/Ptot_{80}) < +(NDC_{80}- \\ 1)/2+1 \text{ \& mod}(+(NDC_{80}-1)/2+2,2)=\text{mod}(-512+ \\ NLG_{80}+idx2+idx1*\text{ceil}(996/Ptot_{80}),2) \quad \hat{5}$$

Referring to Equation 27, when the pilots are mapped at the subcarrier spacing of ceil(996/Ptot_80) as shown in Equation 26 given above, in the case where the Ptot_80/2−1 pilot and/or the Ptot_80/2 pilot are/is not positioned in the DC tone ($\hat{1}$), the Ptot_80/2−1 pilot and/or the Ptot_80/2 pilot are mapped at the subcarrier spacing of ceil(996/Ptot_80) as described in ($\hat{1}$).

On the contrary, in the case where the Ptot_80/2−1 pilot and/or the Ptot_80/2 pilot are/is positioned at the left DC tone (that is, the DC tone having the negative index) ($\hat{2}$) and ($\hat{3}$), the Ptot_80/2−1 pilot and/or the Ptot_80/2 pilot move to the left side to be mapped to the data subcarriers adjacent to the left side of the DC tone. As a result, the spacing between the Ptot_80/2−1 pilot and/or the Ptot_80/2 pilot and the pilot (that is, Ptot_80/2−2 pilot) having the previous index is smaller than ceil(996/Ptot_80).

In this case, when it is assumed that the Ptot_80/2−1 pilot and/or the Ptot_80/2 pilot are/is mapped with the ceil(996/Ptot_80) subcarrier spacing, in the case where the subcarrier indexes to be mapped are odd, the Ptot_80/2−1 pilot and/or the Ptot_80/2 pilot are/is mapped to the data subcarriers/subcarrier having the odd indexes/index, which are/is adjacent to the left side of the DC tone ($\hat{2}$) and in the case where the subcarrier indexes to be mapped are even, the Ptot_80/2−1 pilot and/or the Ptot_80/2 pilot are/is mapped to the data subcarriers/subcarrier having the even indexes/index, which are/is adjacent to the left side of the DC tone ($\hat{3}$).

Further, in the case where the Ptot_80/2−1 pilot and/or the Ptot_80/2 pilot are/is positioned at the right DC tone (that is, the DC tone having the positive index) ($\hat{4}$) and ($\hat{5}$), the Ptot_80/2−1 pilot and/or the Ptot_80/2 pilot move to the right side to be mapped to the data subcarriers adjacent to the right side of the DC tone. As a result, the spacing between the Ptot_80/2−1 pilot and/or the Ptot_80/2 pilot and the pilot (that is, Ptot_80/2+1 pilot) adjacent to the right side is smaller than ceil(996/Ptot_80).

In this case, when it is assumed that the Ptot_80/2−1 pilot and/or the Ptot_80/2 pilot are/is mapped with the ceil(996/Ptot_80) subcarrier spacing, in the case where the subcarrier indexes to be mapped are odd, the Ptot_80/2−1 pilot and/or the Ptot_80/2 pilot are/is mapped to the data subcarriers/subcarrier having the odd indexes/index, which are/is adjacent to the right side of the DC tone ($\hat{4}$) and in the case where the subcarrier indexes to be mapped are even, the Ptot_80/2−1 pilot and/or the Ptot_80/2 pilot are/is mapped to the data subcarriers/subcarrier having the even indexes/index, which are/is adjacent to the right side of the DC tone ($\hat{5}$).

$$idx1 = Ptot_{80}-1 \qquad \text{[Equation 28]}$$

$$P^{80,NSTS}{}_{idx1,idx2} = -512+NLG_{80}+idx2+idx1*\text{ceil}(996/ \\ Ptot_{80}) \text{ if } -512+NLG_{80}+idx2+idx1*\text{ceil}(996/ \\ Ptot_{80}) \leq +511-(NLG_{80}-1) \quad \hat{1}$$

$$P^{80,NSTS}{}_{idx1,idx2} = +511-(NLG_{80}-1) \text{ if } -512+NLG_{80}+ \\ idx2+idx1*\text{ceil}(996/Ptot_{80}) > +511-(NLG_{80}-1) \text{ \&} \\ P^{80,NSTS}{}_{Ptot80/2-1,idx2} < 0 \text{ \& mod}(+511-(NLG_{80}- \\ 1),2)=\text{mod}(-512+NLG_{80}+idx2+idx1*\text{ceil}(996/ \\ Ptot_{80}),2) \quad \hat{2}$$

$$P^{80,NSTS}{}_{idx1,idx2} +511-(NLG_{80}-1)-1 \text{ if } -512+NLG_{80}+ \\ idx2+idx1*\text{ceil}(996/Ptot_{80}) > +511-(NLG_{80}-1) \text{ \&} \\ P^{80,NSTS}{}_{Ptot80/2-1,idx2} < 0 \text{ \& mod}(+511-(NLG_{80}- \\ 1)-1,2)=\text{mod}(-512+NLG_{80}+idx2+idx1*\text{ceil}(996/ \\ Ptot_{80}),2) \quad \hat{3}$$

$$P^{80,NSTS}{}_{idx1,idx2} = -512+NLG_{80} \text{ if } -512+NLG_{80}+idx2+ \\ idx1*\text{ceil}(996/Ptot_{80}) > +511-(NLG_{80}-1) \text{ \& } P^{80,} \\ {}^{NSTS}{}_{Ptot80/2-1,idx2} \geq 0 \text{ \& mod}(-512+NLG_{80},2)= \\ \text{mod}(-512+NLG_{80}+idx2+idx1*\text{ceil}(996/Ptot_{80}), \\ 2) \quad \hat{4}$$

$$P^{80,NSTS}{}_{idx1,idx2} -512+NLG_{80}+1 \text{ if } -512+NLG_{80}+ \\ idx2+idx1*\text{ceil}(996/Ptot_{80}) > +511-(NLG_{80}-1) \text{ \&} \\ P^{80,NSTS}{}_{Ptot80/2-1,idx2} \geq 0 \text{ \& mod}(-512+NLG_{80}+1, \\ 2)=\text{mod}(-512+NLG_{80}+idx2+idx1*\text{ceil}(996/ \\ Ptot_{80}),2) \quad \hat{5}$$

Referring to Equation 28, when the pilots are mapped at the subcarrier spacing of ceil(996/Ptot_80) as shown in Equation 26 given above, in the case where the Ptot_80−1 pilot is not positioned in the right guard tone ($\hat{1}$), the Ptot_80−1 pilots are mapped at the subcarrier spacing of ceil(996/Ptot_80) as described in ($\hat{1}$).

On the contrary, when the Ptot_80−1 pilot is positioned in the right guard tone ($\hat{2}$), ($\hat{3}$), ($\hat{4}$), and ($\hat{5}$), the position of the Ptot_80−1 pilot is determined according to the position of the Ptot_80/2−1 determined by Equation 27 given above.

In the case where the Ptot_80/2−1 pilot has the negative index, this case means that a half of all pilots are mapped to the left data subcarriers based on the DC tone. Therefore, the Ptot_80−1 pilot moves to the left side to be mapped to the data subcarrier adjacent to the left side of the right guard tone ($\hat{2}$) and ($\hat{3}$). As a result, the spacing between the Ptot_80−1 pilot and the pilot (that is, Ptot_80−2 pilot) having the previous index is smaller than ceil(996/Ptot_80).

In this case, when it is assumed that the Ptot_80−1 pilot is mapped with the ceil(996/Ptot_80) subcarrier spacing, in the case where the subcarrier indexes to be mapped are odd, the Ptot_80−1 pilot is mapped to the data subcarrier having the odd index, which is adjacent to the left side of the right guard tone and in the case where the subcarrier indexes to be mapped are even, the Ptot_80−1 pilot is mapped to the data subcarrier having the even index, which is adjacent to the left side of the right guard tone.

On the contrary, in the case where the Ptot_80/2−1 pilot has the positive index, this case means that pilots which are smaller than a half of all pilots by one are mapped to the left data subcarriers based on the DC tone. Therefore, the Ptot_80−1 pilot moves to the left side (alternatively, cyclically moves) to be mapped to the data subcarrier adjacent to the right side of the left guard tone ($\hat{4}$) and ($\hat{5}$). As a result, when the interval of the pilots is cyclically calculated, the spacing between the Ptot_80−1 pilot and the pilot (that is, Ptot_80−2 pilot) having the previous index is smaller than ceil(996/Ptot_80).

In this case, when it is assumed that the Ptot_80−1 pilot is mapped with the ceil(996/Ptot_80) subcarrier spacing, in the case where the subcarrier indexes to be mapped are odd, the Ptot_80−1 pilot is mapped to the data subcarrier having the odd index, which is adjacent to the right side of the left guard tone and in the case where the subcarrier indexes to be mapped are even, the Ptot_80−1 pilot is mapped to the data subcarrier having the even index, which is adjacent to the right side of the left guard tone.

In Equations 26 to 28 given above, since the total number of pilot patterns idx2 is ceil(996/Ptot_80), the pilot pattern period is ceil(996/Ptot_80).

As described above, the pilot pattern period means the period in which the allocation of the pilot pattern is repeated and means the period in which all pattern patterns are allocated once when predetermined pilot patterns are allocated sequentially (alternatively, at a predetermined pattern). That is, the same pilot pattern is not allocated plural times within one pilot pattern period and each pilot pattern is allocated once within one pilot pattern period.

As described above, the pilot tones are mapped to the subcarriers corresponding to different pattern indexes for each data symbol, and as a result, the pilot tones may be mapped to all data subcarriers at one traveling pilot pattern period.

In this case, the pilot patterns defined in the order in which the pilot pattern index increases may be allocated to the respective data symbols (and/or the SIG and LTF symbols) in the order in which the symbol index increases.

Alternatively, the pilot patterns may be allocated to the respective data symbols (and/or the SIG and LTF symbols) with a predetermined pattern (alternatively, order) in the order in which the symbol index increases. Herein, the predetermined pattern (alternatively, order) to which the pilot pattern is allocated may be determined in the order in which the pilot pattern index cyclically increases at the interval of integer n until all pilot patterns are allocated within the pilot period. For example, the pattern indexes may be allocated in the order of 0,4,8, . . . , 1,5,9, . . . , 2,6,10, . . . , 3,7,11, . . . according to the order of the data symbol and when all patterns are completely used, the pilot patterns may be allocated by a scheme of 0,4,8, . . . , 1,5,9, . . . , 2,6,10, . . . , 3,7,11, . . . all over again. Further, unlike the above illustration, the units including 2, 8, etc. may be used in addition to the unit of 4. Since the channel correlation between subcarriers close to each other in the frequency domain exists, the pilot patterns are allocated in the order in which the pilot pattern index increases at the interval of integer n to enhance the performance of the channel estimation.

Further, various patterns (alternatively, orders) regarding the allocation order of the pilot patterns such as the case where the pilot patterns may be allocated in a predetermined order within one pilot pattern, etc. may be applied.

(2) NSTS≥2

The pilot pattern proposed in (1) NSTS=1 given above may be reused or only some of the pilot patterns proposed in (1) NSTS=1 given above may be reused.

As one example of reusing only some of the pilot patterns proposed in (1) NSTS=1 given above, only the pilot pattern which meets mod(pattern index, NSTS)=n may be reused. Herein, n corresponds to a predetermined value among 0, 1, 2, . . . , NSTS-1. Herein, mod indicates the modular operation.

4. 160 MHz PPDU (2048 FFT)

A scheme of duplicating the 80 MHz 1024 FFT pilot pattern (alternatively, 20 MHz 256 FFT pilot pattern or 40 MHz 512 FFT pilot patter) described above is proposed.

A) Duplication Scheme

Hereinafter, a scheme in which the 80 MH 1024 FFT pilot pattern is repeated twice is specifically described, but a scheme in which the 40 MHz 512 FFT pilot pattern is repeated four times or a scheme in which the 20 MHz 256 FFT pilot pattern is repeated eight times may also be similarly applied.

The number of left guard tones is defined as NLG_160 and the number of right guard tones is defined as NLG_160-1 in 2048 FFT of 160 MHz of 802.11ax. In addition, the number of DC tones is defined as NDC_160.

As such, when the numbers of guard tones and DC tones are defined, one pilot pattern (that is, the left pilot pattern based on the DC) covers up to $-1024+\text{NLG\_160}$ to $-(\text{NDC\_160}-1)/2-1$ tones and the other pilot pattern (that is, the right pilot pattern based on the DC) covers $+(\text{NDC\_160}-1)/2+1$ to $+1023-(\text{NLG\_160}-1)$ tones. The total number of pilots used in this case is referred to as Ptot_160 and is two times larger than the number of 80 MHz pilots.

When the total number of used pilots is expressed by the equation, the total number of used pilots is shown in Equation 29 (the left pilot pattern) and Equation 30 (the right pilot pattern).

$idx1=0,1,\ldots,Ptot_{160}/2-1$ $$P^{160,NSTS}_{idx1,idx2}=P^{80,NSTS}_{idx1,idx2}-512 \quad \text{[Equation 29]}$$

$idx1=Ptot_{160}/2,Ptot_{160}/2+1,\ldots,Ptot_{160}-1$ $$P^{160,NSTS}_{idx1,idx2}=P^{80,NSTS}_{idx1,idx2}+512 \quad \text{[Equation 30]}$$

Herein, $P^{160,NSTS}_{idx1,idx2}$ means the position of the pilot tone in the idx2 pilot pattern of the idx1 pilot in the case of NSTS streams at 160 MHz.

The 0-th pilot pattern in the case of NSTS=1 by using the 80 MHz duplication scheme pilot pattern by applying such an equation is shown in Table 17 given below.

TABLE 17

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| -1018 | -986 | -954 | -922 | -890 | -858 | -826 | -794 | -762 | -730 | -698 | -666 | -634 | -602 | -570 | -538 |
| 16 | 17 | 18 | 19 | 20 | 21 | 22 | 23 | 24 | 25 | 26 | 27 | 28 | 29 | 30 | 31 |
| -506 | -474 | -442 | -410 | -378 | -346 | -314 | -282 | -250 | -218 | -186 | -154 | -122 | -90 | -58 | -26 |
| 32 | 33 | 34 | 35 | 36 | 37 | 38 | 39 | 40 | 41 | 42 | 43 | 44 | 45 | 46 | 47 |
| 6 | 38 | 70 | 102 | 134 | 166 | 198 | 230 | 262 | 294 | 326 | 358 | 390 | 422 | 454 | 486 |
| 48 | 49 | 50 | 51 | 52 | 53 | 54 | 55 | 56 | 57 | 58 | 59 | 60 | 61 | 62 | 63 |
| 518 | 550 | 582 | 614 | 646 | 678 | 710 | 742 | 774 | 806 | 838 | 870 | 902 | 934 | 966 | 998 |

5. OFDMA 26 Tones

The OFDMA transmission scheme is newly proposed in 11ax and the traveling pilot scheme for the new OFDMA transmission scheme should also be considered.

Hereinafter, in an OFDMA scheme using the 26 tone resource unit, a total of 2 pilots are used and the tone indexes of the 26 tone resource unit are defined as 0, 1, . . . , 25. Further, $P^{O(26),NSTS}_{idx1,idx2}$ means the position of the pilot tone in the idx2 pilot pattern of the idx1 pilot in the case of NSTS streams in the OFDMA 26 tone resource unit. In this case, the traveling pilot scheme is proposed as below.

A) Reuse Scheme

A 32 FFT traveling pilot pattern in the case of NSTS=1 proposed in the 802.11ah system may be reused. However, the position of the pilot tone is corrected as below.

13 is added to -13, -12, . . . , -1 which are the positions of the pilot tones of the 802.11ah system to correct the positions of the pilot tones. In this case, the corrected position of the pilot tones are 0, 1, . . . , 12.

12 is added to 1, 2, . . . , 13 which are the positions of the pilot tones of the 802.11ah system to correct the positions of the pilot tones. In this case, the corrected positions of the pilot tones are 13, 14, . . . , 25.

B) New Design Scheme 1

(1) NSTS=1

Equation 31 given below shows the pilot pattern newly proposed in the present invention in the 26 tone resource unit in the case of NSTS=1.

$$P^{O(26),NSTS}{}_{idx1,idx2}=idx2+13*idx1 \text{ for } idx1=0,1, idx2=0,1,\ldots,12 \quad [\text{Equation 31}]$$

In Equation 31, since the total number of pilot patterns idx2 is 13, the pilot pattern period is 13. Further, the interval between the pilots is 13 tones. The interval may be the same as a minimum integer value which is not smaller than a value acquired by dividing the total subcarrier number (=26) by the total number (=2).

Table 18 shows a pilot position determined by Equation 31.

TABLE 18

| Pilot | Pattern Index | | | | | | | | | | | | |
|---|---|---|---|---|---|---|---|---|---|---|---|---|---|
| Index | 0 | 1 | 2 | 3 | 4 | 5 | 6 | 7 | 8 | 9 | 10 | 11 | 12 |
| 0 | 0 | 1 | 2 | 3 | 4 | 5 | 6 | 7 | 8 | 9 | 10 | 11 | 12 |
| 1 | 13 | 14 | 15 | 16 | 17 | 18 | 19 | 20 | 21 | 22 | 23 | 24 | 25 |

As described above, the pilot pattern period means the period in which the allocation of the pilot pattern is repeated and means the period in which all pattern patterns are allocated once when predetermined pilot patterns are allocated sequentially (alternatively, at a predetermined pattern). That is, the same pilot pattern is not allocated plural times within one pilot pattern period and each pilot pattern is allocated once within one pilot pattern period.

As described above, the pilot tones are mapped to the subcarriers corresponding to different pattern indexes for each data symbol, and as a result, the pilot tones may be mapped to all data subcarriers at one traveling pilot pattern period.

In this case, the pilot patterns defined in the order in which the pilot pattern index increases may be allocated to the respective data symbols (and/or the SIG and LTF symbols) in the order in which the symbol index increases.

Alternatively, the pilot patterns may be allocated to the respective data symbols (and/or the SIG and LTF symbols) with a predetermined pattern (alternatively, order) in the order in which the symbol index increases.

Herein, the predetermined pattern (alternatively, order) to which the pilot pattern is allocated may be determined in the order in which the pilot pattern index cyclically increases at the interval of integer n until all pilot patterns are allocated within the pilot period. For example, the pattern indexes may be allocated in the order of 0,4,8, . . . , 1,5,9, . . . , 2,6,10, . . . , 3,7,11, . . . according to the order of the data symbol and when all patterns are completely used, the pilot patterns may be allocated by a scheme of 0,4,8, . . . , 1,5,9, . . . , 2,6,10, . . . , 3,7,11, . . . all over again. Further, unlike the above illustration, the units including 2, 8, etc. may be used in addition to the unit of 4. Since the channel correlation between subcarriers close to each other in the frequency domain exists, the pilot patterns are allocated in the order in which the pilot pattern index increases at the interval of integer n to enhance the performance of the channel estimation.

Further, various patterns (alternatively, orders) regarding the allocation order of the pilot patterns such as the case where the pilot patterns may be allocated in a predetermined order within one pilot pattern, etc. may be applied.

(2) NSTS≥2

The pilot pattern proposed in (1) NSTS=1 given above may be reused or only some of the pilot patterns proposed in (1) NSTS=1 given above may be reused.

As one example of reusing only some of the pilot patterns proposed in (1) NSTS=1 given above, only the pilot pattern which meets mod(pattern index, NSTS)=n may be reused. Herein, n corresponds to a predetermined value among 0, 1, 2, . . . , NSTS-1. Herein, mod indicates the modular operation.

6. OFDMA 52 Tones

Hereinafter, in an OFDMA scheme using the 52 tone resource unit, a total of 4 pilots are used and the tone indexes of the 52 tone resource unit are defined as 0, 1, . . . , 51. Further, $P^{O(52),NSTS}{}_{idx1,idx2}$ means the position of the pilot tone in the idx2 pilot pattern of the idx1 pilot in the case of NSTS streams in the OFDMA 52 tone resource unit. In this case, the traveling pilot scheme is proposed as below.

A) New Design Scheme 1

Equation 32 given below shows the pilot pattern newly proposed in the present invention in the 52 tone resource unit in the case of NSTS=1.

$$P^{O(52),NSTS}{}_{idx1,idx2}=\text{mod}(idx2+idx1*13,52) \text{ for } idx1=0,1,\ldots,3, idx2=0,1,\ldots,12 \quad [\text{Equation 32}]$$

In Equation 32, since the total number of pilot patterns idx2 is 13, the pilot pattern period is 13. Further, the interval between the pilots is 13 tones. The interval may be the same as a minimum integer value which is not smaller than the value acquired by dividing the total subcarrier number (=52) by the total number (=4).

Table 19 shows the pilot position determined by Equation 32.

TABLE 19

| Pilot | Pattern Index | | | | | | | | | | | | |
|---|---|---|---|---|---|---|---|---|---|---|---|---|---|
| Index | 0 | 1 | 2 | 3 | 4 | 5 | 6 | 7 | 8 | 9 | 10 | 11 | 12 |
| 0 | 0 | 1 | 2 | 3 | 4 | 5 | 6 | 7 | 8 | 9 | 10 | 11 | 12 |
| 1 | 13 | 14 | 15 | 16 | 17 | 18 | 19 | 20 | 21 | 22 | 23 | 24 | 25 |
| 2 | 26 | 27 | 28 | 29 | 30 | 31 | 32 | 33 | 34 | 35 | 36 | 37 | 38 |
| 3 | 39 | 40 | 41 | 42 | 43 | 44 | 45 | 46 | 47 | 48 | 49 | 50 | 51 |

As described above, the pilot pattern period means the period in which the allocation of the pilot pattern is repeated and means the period in which all pattern patterns are allocated once when predetermined pilot patterns are allocated sequentially (alternatively, at a predetermined pattern). That is, the same pilot pattern is not allocated plural times within one pilot pattern period and each pilot pattern is allocated once within one pilot pattern period.

As described above, the pilot tones are mapped to the subcarriers corresponding to different pattern indexes for each data symbol, and as a result, the pilot tones may be mapped to all data subcarriers at one traveling pilot pattern period.

In this case, the pilot patterns defined in the order in which the pilot pattern index increases may be allocated to the respective data symbols (and/or the SIG and LTF symbols) in the order in which the symbol index increases.

Alternatively, the pilot patterns may be allocated to the respective data symbols (and/or the SIG and LTF symbols)

with a predetermined pattern (alternatively, order) in the order in which the symbol index increases.

Herein, the predetermined pattern (alternatively, order) to which the pilot pattern is allocated may be determined in the order in which the pilot pattern index cyclically increases at the interval of integer n until all pilot patterns are allocated within the pilot period. For example, the pattern indexes may be allocated in the order of 0,4,8, . . . , 1,5,9, . . . , 2,6,10, . . . , 3,7,11, . . . according to the order of the data symbol and when all patterns are completely used, the pilot patterns may be allocated by a scheme of 0,4,8, . . . , 1,5,9, . . . , 2,6,10, . . . , 3,7,11, . . . all over again. Further, unlike the above illustration, the units including 2, 8, etc. may be used in addition to the unit of 4. Since the channel correlation between subcarriers close to each other in the frequency domain exists, the pilot patterns are allocated in the order in which the pilot pattern index increases at the interval of integer n to enhance the performance of the channel estimation.

Further, various patterns (alternatively, orders) regarding the allocation order of the pilot patterns such as the case where the pilot patterns may be allocated in a predetermined order within one pilot pattern, etc. may be applied.

(2) NSTS≥2

The pilot pattern proposed in (1) NSTS=1 given above may be reused or only some of the pilot patterns proposed in (1) NSTS=1 given above may be reused.

As one example of reusing only some of the pilot patterns proposed in (1) NSTS=1 given above, only the pilot pattern which meets mod(pattern index, NSTS)=n may be reused. Herein, n corresponds to a predetermined value among 0, 1, 2, . . . , NSTS-1. Herein, mod indicates the modular operation.

7. OFDMA 106 Tones

Hereinafter, in an OFDMA scheme using the 106 tone resource unit, a total of 4 pilots are used and the tone indexes of the 106 tone resource unit are defined as 0, 1, . . . , 105. Further, $P^{O(106),NSTS}_{idx1,idx2}$ means the position of the pilot tone in the idx2 pilot pattern of the idx1 pilot in the case of NSTS streams in the OFDMA 106 tone resource unit. In this case, the traveling pilot scheme is proposed as below.

A) New Design Scheme 1

Equation 33 given below shows the pilot pattern newly proposed in the present invention in the 106 tone resource unit in the case of NSTS=1.

$$P^{O(106),NSTS}_{idx1,idx2} = \mod(idx2+idx1*27,106) \text{ for } idx1=0,1,\ldots,3, idx2=0,1,\ldots,26 \quad \text{[Equation 33]}$$

In Equation 33, since the total number of pilot patterns idx2 is 27, the pilot pattern period is 27. Further, the interval between the pilots is 27 tones. The interval may be the same as the minimum integer value which is not smaller than the value acquired by dividing the total subcarrier number (=106) by the total number (=4).

Table 20 shows the pilot position determined by Equation 33.

TABLE 20

| pattern idx | pilot idx | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | 0 | 1 | 2 | 3 | 4 | 5 | 6 | 7 | 8 | 9 | 10 | 11 | 12 | 13 |
| 1 | 27 | 28 | 29 | 30 | 31 | 32 | 33 | 34 | 35 | 36 | 37 | 38 | 39 | 40 |
| 2 | 54 | 55 | 56 | 57 | 58 | 59 | 60 | 61 | 62 | 63 | 64 | 65 | 66 | 67 |
| 3 | 81 | 82 | 83 | 84 | 85 | 86 | 87 | 88 | 89 | 90 | 91 | 92 | 93 | 94 |

| pattern idx | pilot idx | | | | | | | | | | | | |
|---|---|---|---|---|---|---|---|---|---|---|---|---|---|
| | 14 | 15 | 16 | 17 | 18 | 19 | 20 | 21 | 22 | 23 | 24 | 25 | 26 |
| 0 | 14 | 15 | 16 | 17 | 18 | 19 | 20 | 21 | 22 | 23 | 24 | 25 | 26 |
| 1 | 41 | 42 | 43 | 44 | 45 | 46 | 47 | 48 | 49 | 50 | 51 | 52 | 53 |
| 2 | 68 | 69 | 70 | 71 | 72 | 73 | 74 | 75 | 76 | 77 | 78 | 79 | 80 |
| 3 | 95 | 96 | 97 | 98 | 99 | 100 | 101 | 102 | 103 | 104 | 105 | 0 | 1 |

As described above, the pilot pattern period means the period in which the allocation of the pilot pattern is repeated and means the period in which all pattern patterns are allocated once when predetermined pilot patterns are allocated sequentially (alternatively, at a predetermined pattern). That is, the same pilot pattern is not allocated plural times within one pilot pattern period and each pilot pattern is allocated once within one pilot pattern period.

As described above, the pilot tones are mapped to the subcarriers corresponding to different pattern indexes for each data symbol, and as a result, the pilot tones may be mapped to all data subcarriers at one traveling pilot pattern period.

In this case, the pilot patterns defined in the order in which the pilot pattern index increases may be allocated to the respective data symbols (and/or the SIG and LTF symbols) in the order in which the symbol index increases.

Alternatively, the pilot patterns may be allocated to the respective data symbols (and/or the SIG and LTF symbols) with a predetermined pattern (alternatively, order) in the order in which the symbol index increases.

Herein, the predetermined pattern (alternatively, order) to which the pilot pattern is allocated may be determined in the order in which the pilot pattern index cyclically increases at the interval of integer n until all pilot patterns are allocated within the pilot period. For example, the pattern indexes may be allocated in the order of 0,4,8, . . . , 1,5,9, . . . , 2,6,10, . . . , 3,7,11, . . . according to the order of the data symbol and when all patterns are completely used, the pilot patterns may be allocated by a scheme of 0,4,8, . . . , 1,5,9, . . . , 2,6,10, . . . , 3,7,11, . . . all over again. Further, unlike the above illustration, the units including 2, 8, etc. may be used in addition to the unit of 4. Since the channel correlation between subcarriers close to each other in the frequency domain exists, the pilot patterns are allocated in the order in which the pilot pattern index increases at the interval of integer n to enhance the performance of the channel estimation.

Further, various patterns (alternatively, orders) regarding the allocation order of the pilot patterns such as the case where the pilot patterns may be allocated in a predetermined order within one pilot pattern, etc. may be applied.

(2) NSTS≥2

The pilot pattern proposed in (1) NSTS=1 given above may be reused or only some of the pilot patterns proposed in (1) NSTS=1 given above may be reused.

As one example of reusing only some of the pilot patterns proposed in (1) NSTS=1 given above, only the pilot pattern which meets mod(pattern index, NSTS)=n may be reused. Herein, n corresponds to a predetermined value among 0, 1, 2, . . . , NSTS-1. Herein, mod indicates the modular operation.

8. OFDMA 242 Tones

Hereinafter, in an OFDMA scheme using the 242 tone resource unit, a total of 8 pilots are used and the tone indexes of the 242 tone resource unit are defined as 0, 1, . . . , 241. Further, $P^{O(242),NSTS}_{idx1,idx2}$ means the position of the pilot tone in the idx2 pilot pattern of the idx1 pilot in the case of NSTS streams in the OFDMA 242 tone resource unit. In this case, the traveling pilot scheme is proposed as below.

A) Reuse Scheme

The 256 FFT traveling pilot pattern in the case of NSTS=1 proposed in the 802.11ah system may be reused. However, the position of the pilot tone is corrected as below.

122 is added to -122, -121, . . . , -2 which are the positions of the pilot tones of the 802.11ah system to correct the positions of the pilot tones. In this case, the corrected position of the pilot tones are 0, 1, . . . , 120.

119 is added to 2, 3, . . . , 122 which are the positions of the pilot tones of the 802.11ah system to correct the positions of the pilot tones. In this case, the corrected positions of the pilot tones are 121, 122, . . . , 241.

B) New Design Scheme 1

(1) NSTS=1

Equation 34 given below shows the pilot pattern newly proposed in the present invention in the 242 tone resource unit in the case of NSTS=1.

$$P^{O(242),NSTS}_{idx1,idx2}=\mod(idx2+idx1*31,242) \text{ for } idx1=0,1,\ldots,7, idx2=0,1,\ldots,30 \quad \text{[Equation 34]}$$

In Equation 34, since the total number of pilot patterns idx2 is 31, the pilot pattern period is 31. Further, the interval between the pilots is 31 tones. The interval may be the same as the minimum integer value which is not smaller than the value acquired by dividing the total subcarrier number (=242) by the total number (=8).

Table 21 shows the pilot position determined by Equation 34.

TABLE 21

| Pattern idx | Pilot idx | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 2 | 3 | 4 | 5 | 6 | 7 | 8 | 9 | 10 | 11 | 12 | 13 | 14 | 15 |
| 1 | 31 | 32 | 33 | 34 | 35 | 36 | 37 | 38 | 39 | 40 | 41 | 42 | 43 | 44 | 45 | 46 |
| 2 | 62 | 63 | 64 | 65 | 66 | 67 | 68 | 69 | 70 | 71 | 72 | 73 | 74 | 75 | 76 | 77 |
| 3 | 93 | 94 | 95 | 96 | 97 | 98 | 99 | 100 | 101 | 102 | 103 | 104 | 105 | 106 | 107 | 108 |
| 4 | 124 | 125 | 126 | 127 | 128 | 129 | 130 | 131 | 132 | 133 | 134 | 135 | 136 | 137 | 138 | 139 |
| 5 | 155 | 156 | 157 | 158 | 159 | 160 | 161 | 162 | 163 | 164 | 165 | 166 | 167 | 168 | 169 | 170 |
| 6 | 186 | 187 | 188 | 189 | 190 | 191 | 192 | 193 | 194 | 195 | 196 | 197 | 198 | 199 | 200 | 201 |
| 7 | 217 | 218 | 219 | 220 | 221 | 222 | 223 | 224 | 225 | 226 | 227 | 228 | 229 | 230 | 231 | 232 |

| Pattern idx | Pilot idx | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| 0 | 16 | 17 | 18 | 19 | 20 | 21 | 22 | 23 | 24 | 25 | 26 | 27 | 28 | 29 | 30 |
| 1 | 47 | 48 | 49 | 50 | 51 | 52 | 53 | 54 | 55 | 56 | 57 | 58 | 59 | 60 | 61 |
| 2 | 78 | 79 | 80 | 81 | 82 | 83 | 84 | 85 | 86 | 87 | 88 | 89 | 90 | 91 | 92 |
| 3 | 109 | 110 | 111 | 112 | 113 | 114 | 115 | 116 | 117 | 118 | 119 | 120 | 121 | 122 | 123 |
| 4 | 140 | 141 | 142 | 143 | 144 | 145 | 146 | 147 | 148 | 149 | 150 | 151 | 152 | 153 | 154 |
| 5 | 171 | 172 | 173 | 174 | 175 | 176 | 177 | 178 | 179 | 180 | 181 | 182 | 183 | 184 | 185 |
| 6 | 202 | 203 | 204 | 205 | 206 | 207 | 208 | 209 | 210 | 211 | 212 | 213 | 214 | 215 | 216 |
| 7 | 233 | 234 | 235 | 236 | 237 | 238 | 239 | 240 | 241 | 0 | 1 | 2 | 3 | 4 | 5 |

As described above, the pilot pattern period means the period in which the allocation of the pilot pattern is repeated and means the period in which all pattern patterns are allocated once when predetermined pilot patterns are allocated sequentially (alternatively, at a predetermined pattern). That is, the same pilot pattern is not allocated plural times within one pilot pattern period and each pilot pattern is allocated once within one pilot pattern period.

As described above, the pilot tones are mapped to the subcarriers corresponding to different pattern indexes for each data symbol, and as a result, the pilot tones may be mapped to all data subcarriers at one traveling pilot pattern period.

In this case, the pilot patterns defined in the order in which the pilot pattern index increases may be allocated to the respective data symbols (and/or the SIG and LTF symbols) in the order in which the symbol index increases.

Alternatively, the pilot patterns may be allocated to the respective data symbols (and/or the SIG and LTF symbols) with a predetermined pattern (alternatively, order) in the order in which the symbol index increases.

Herein, the predetermined pattern (alternatively, order) to which the pilot pattern is allocated may be determined in the order in which the pilot pattern index cyclically increases at the interval of integer n until all pilot patterns are allocated within the pilot period. For example, the pattern indexes may be allocated in the order of 0,4,8, . . . , 1,5,9, . . . , 2,6,10, . . . , 3,7,11, . . . according to the order of the data symbol and when all patterns are completely used, the pilot patterns may be allocated by a scheme of 0,4,8, . . . , 1,5,9, . . . , 2,6,10, . . . , 3,7,11, . . . all over again. Further, unlike the above illustration, the units including 2, 8, etc. may be used in addition to the unit of 4. Since the channel correlation between subcarriers close to each other in the frequency domain exists, the pilot patterns are allocated in the order in which the pilot pattern index increases at the interval of integer n to enhance the performance of the channel estimation.

Further, various patterns (alternatively, orders) regarding the allocation order of the pilot patterns such as the case where the pilot patterns may be allocated in a predetermined order within one pilot pattern, etc. may be applied.

(2) NSTS≥2

The pilot pattern proposed in (1) NSTS=1 given above may be reused or only some of the pilot patterns proposed in (1) NSTS=1 given above may be reused.

As one example of reusing only some of the pilot patterns proposed in (1) NSTS=1 given above, only the pilot pattern which meets mod(pattern index, NSTS)=n may be reused. Herein, n corresponds to a predetermined value among 0, 1, 2, . . . , NSTS−1. Herein, mod indicates the modular operation.

Meanwhile, as illustrated in FIG. 5 given above, since the 20 MHz PPDU may be constituted by a single 242 tone resource unit, the traveling pilot pattern described in the 20 MHz PPDU may be similarly used for transmission of the 242 tone resource unit.

9. OFDMA 484 Tones

Hereinafter, in an OFDMA scheme using the 484 tone resource unit, a total of 16 pilots are used and the tone indexes of the 484 tone resource unit are defined as 0, 1, . . . , 483. Further, $P^{O(484),NSTS}_{idx1,idx2}$ means the position of the pilot tone in the idx2 pilot pattern of the idx1 pilot in the case of NSTS streams in the OFDMA 484 tone resource unit. In this case, the traveling pilot scheme is proposed as below.

A) New Design Scheme 1

Equation 35 given below shows the pilot pattern newly proposed in the present invention in the 484 tone resource unit in the case of NSTS=1.

$$P^{O(484),NSTS}_{idx1,idx2} = \mathrm{mod}(idx2 + idx1*31, 484) \text{ for } idx1=0,1,\ldots,15, idx2=0,1,\ldots,30 \quad \text{[Equation 35]}$$

In Equation 35, since the total number of pilot patterns idx2 is 31, the pilot pattern period is 31. Further, the interval between the pilots is 31 tones. The interval may be the same as the minimum integer value which is not smaller than the value acquired by dividing the total subcarrier number (=484) by the total number (=16).

Table 22 shows the pilot position determined by Equation 35.

TABLE 22

| Pattern idx | Pilot idx | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 2 | 3 | 4 | 5 | 6 | 7 | 8 | 9 | 10 | 11 | 12 | 13 | 14 | 15 |
| 1 | 31 | 32 | 33 | 34 | 35 | 36 | 37 | 38 | 39 | 40 | 41 | 42 | 43 | 44 | 45 | 46 |
| 2 | 62 | 63 | 64 | 65 | 66 | 67 | 68 | 69 | 70 | 71 | 72 | 73 | 74 | 75 | 76 | 77 |
| 3 | 93 | 94 | 95 | 96 | 97 | 98 | 99 | 100 | 101 | 102 | 103 | 104 | 105 | 106 | 107 | 108 |
| 4 | 124 | 125 | 126 | 127 | 128 | 129 | 130 | 131 | 132 | 133 | 134 | 135 | 136 | 137 | 138 | 139 |
| 5 | 155 | 156 | 157 | 158 | 159 | 160 | 161 | 162 | 163 | 164 | 165 | 166 | 167 | 168 | 169 | 170 |
| 6 | 186 | 187 | 188 | 189 | 190 | 191 | 192 | 193 | 194 | 195 | 196 | 197 | 198 | 199 | 200 | 201 |
| 7 | 217 | 218 | 219 | 220 | 221 | 222 | 223 | 224 | 225 | 226 | 227 | 228 | 229 | 230 | 231 | 232 |
| 8 | 248 | 249 | 250 | 251 | 252 | 253 | 254 | 255 | 256 | 257 | 258 | 259 | 260 | 261 | 262 | 263 |
| 9 | 279 | 280 | 281 | 282 | 283 | 284 | 285 | 286 | 287 | 288 | 289 | 290 | 291 | 292 | 293 | 294 |
| 10 | 310 | 311 | 312 | 313 | 314 | 315 | 316 | 317 | 318 | 319 | 320 | 321 | 322 | 323 | 324 | 325 |
| 11 | 341 | 342 | 343 | 344 | 345 | 346 | 347 | 348 | 349 | 350 | 351 | 352 | 353 | 354 | 355 | 356 |
| 12 | 372 | 373 | 374 | 375 | 376 | 377 | 378 | 379 | 380 | 381 | 382 | 383 | 384 | 385 | 386 | 387 |
| 13 | 403 | 404 | 405 | 406 | 407 | 408 | 409 | 410 | 411 | 412 | 413 | 414 | 415 | 416 | 417 | 418 |
| 14 | 434 | 435 | 436 | 437 | 438 | 439 | 440 | 441 | 442 | 443 | 444 | 445 | 446 | 447 | 448 | 449 |
| 15 | 465 | 466 | 467 | 468 | 469 | 470 | 471 | 472 | 473 | 474 | 475 | 476 | 477 | 478 | 479 | 480 |

| Pattern idx | Pilot idx | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| 0 | 16 | 17 | 18 | 19 | 20 | 21 | 22 | 23 | 24 | 25 | 26 | 27 | 28 | 29 | 30 |
| 1 | 47 | 48 | 49 | 50 | 51 | 52 | 53 | 54 | 55 | 56 | 57 | 58 | 59 | 60 | 61 |
| 2 | 78 | 79 | 80 | 81 | 82 | 83 | 84 | 85 | 86 | 87 | 88 | 89 | 90 | 91 | 92 |
| 3 | 109 | 110 | 111 | 112 | 113 | 114 | 115 | 116 | 117 | 118 | 119 | 120 | 121 | 122 | 123 |
| 4 | 140 | 141 | 142 | 143 | 144 | 145 | 146 | 147 | 148 | 149 | 150 | 151 | 152 | 153 | 154 |
| 5 | 171 | 172 | 173 | 174 | 175 | 176 | 177 | 178 | 179 | 180 | 181 | 182 | 183 | 184 | 185 |
| 6 | 202 | 203 | 204 | 205 | 206 | 207 | 208 | 209 | 210 | 211 | 212 | 213 | 214 | 215 | 216 |
| 7 | 233 | 234 | 235 | 236 | 237 | 238 | 239 | 240 | 241 | 242 | 243 | 244 | 245 | 246 | 247 |
| 8 | 264 | 265 | 266 | 267 | 268 | 269 | 270 | 271 | 272 | 273 | 274 | 275 | 276 | 277 | 278 |
| 9 | 295 | 296 | 297 | 298 | 299 | 300 | 301 | 302 | 303 | 304 | 305 | 306 | 307 | 308 | 309 |
| 10 | 326 | 327 | 328 | 329 | 330 | 331 | 332 | 333 | 334 | 335 | 336 | 337 | 338 | 339 | 340 |
| 11 | 357 | 358 | 359 | 360 | 361 | 362 | 363 | 364 | 365 | 366 | 367 | 368 | 369 | 370 | 371 |
| 12 | 388 | 389 | 390 | 391 | 392 | 393 | 394 | 395 | 396 | 397 | 398 | 399 | 400 | 401 | 402 |
| 13 | 419 | 420 | 421 | 422 | 423 | 424 | 425 | 426 | 427 | 428 | 429 | 430 | 431 | 432 | 433 |
| 14 | 450 | 451 | 452 | 453 | 454 | 455 | 456 | 457 | 458 | 459 | 460 | 461 | 462 | 463 | 464 |
| 15 | 481 | 482 | 483 | 0 | 1 | 2 | 3 | 4 | 5 | 6 | 7 | 8 | 9 | 10 | 11 |

As described above, the pilot pattern period means the period in which the allocation of the pilot pattern is repeated and means the period in which all pattern patterns are allocated once when predetermined pilot patterns are allocated sequentially (alternatively, at a predetermined pattern). That is, the same pilot pattern is not allocated plural times within one pilot pattern period and each pilot pattern is allocated once within one pilot pattern period.

As described above, the pilot tones are mapped to the subcarriers corresponding to different pattern indexes for each data symbol, and as a result, the pilot tones may be mapped to all data subcarriers at one traveling pilot pattern period.

In this case, the pilot patterns defined in the order in which the pilot pattern index increases may be allocated to the respective data symbols (and/or the SIG and LTF symbols) in the order in which the symbol index increases.

Alternatively, the pilot patterns may be allocated to the respective data symbols (and/or the SIG and LTF symbols) with a predetermined pattern (alternatively, order) in the order in which the symbol index increases.

Herein, the predetermined pattern (alternatively, order) to which the pilot pattern is allocated may be determined in the order in which the pilot pattern index cyclically increases at the interval of integer n until all pilot patterns are allocated within the pilot period. For example, the pattern indexes may be allocated in the order of 0,4,8, . . . , 1,5,9, . . . , 2,6,10, . . . , 3,7,11, . . . according to the order of the data symbol and when all patterns are completely used, the pilot patterns may be allocated by a scheme of 0,4,8, . . . , 1,5,9, . . . , 2,6,10, . . . , 3,7,11, . . . all over again. Further, unlike the above illustration, the units including 2, 8, etc. may be used in addition to the unit of 4. Since the channel correlation between subcarriers close to each other in the frequency domain exists, the pilot patterns are allocated in the order in which the pilot pattern index increases at the interval of integer n to enhance the performance of the channel estimation.

Further, various patterns (alternatively, orders) regarding the allocation order of the pilot patterns such as the case where the pilot patterns may be allocated in a predetermined order within one pilot pattern, etc. may be applied.

(2) NSTS≥2

The pilot pattern proposed in (1) NSTS=1 given above may be reused or only some of the pilot patterns proposed in (1) NSTS=1 given above may be reused.

As one example of reusing only some of the pilot patterns proposed in (1) NSTS=1 given above, only the pilot pattern which meets mod(pattern index, NSTS)=n may be reused. Herein, n corresponds to a predetermined value among 0, 1, 2, . . . , NSTS-1. Herein, mod indicates the modular operation.

Meanwhile, as illustrated in FIG. 16 given above, since the 40 MHz PPDU may be constituted by the single 484 tone resource unit, the traveling pilot pattern described in the 40 MHz PPDU may be similarly used for transmission of the 484 tone resource unit.

10. OFDMA 996 Tones

Hereinafter, in an OFDMA scheme using the 996 tone resource unit, a total of 16 pilots are used and the tone indexes of the 996 tone resource unit are defined as 0, 1, . . . , 995. Further, $P^{O(996),NSTS}_{idx1,idx2}$ means the position of the pilot tone in the idx2 pilot pattern of the idx1 pilot in the case of NSTS streams in the OFDMA 996 tone resource unit. In this case, the traveling pilot scheme is proposed as below.

A) New Design Scheme 1

Equation 36 given below shows the pilot pattern newly proposed in the present invention in the 996 tone resource unit in the case of NSTS=1.

$$P^{O(996),NsTS}_{idx1,idx2} = \mod(idx2+idx1*63,996) \text{ for } idx1=0,1,\ldots,15, idx2=0,1,\ldots,62 \quad \text{[Equation 36]}$$

In Equation 36, since the total number of pilot patterns idx2 is 63, the pilot pattern period is 63. Further, the interval between the pilots is 63 tones. The interval may be the same as the minimum integer value which is not smaller than the value acquired by dividing the total subcarrier number (=996) by the total number (=16).

As described above, the pilot pattern period means the period in which the allocation of the pilot pattern is repeated and means the period in which all pattern patterns are allocated once when predetermined pilot patterns are allocated sequentially (alternatively, at a predetermined pattern). That is, the same pilot pattern is not allocated plural times within one pilot pattern period and each pilot pattern is allocated once within one pilot pattern period.

As described above, the pilot tones are mapped to the subcarriers corresponding to different pattern indexes for each data symbol, and as a result, the pilot tones may be mapped to all data subcarriers at one traveling pilot pattern period.

In this case, the pilot patterns defined in the order in which the pilot pattern index increases may be allocated to the respective data symbols (and/or the SIG and LTF symbols) in the order in which the symbol index increases.

Alternatively, the pilot patterns may be allocated to the respective data symbols (and/or the SIG and LTF symbols) with a predetermined pattern (alternatively, order) in the order in which the symbol index increases.

Herein, the predetermined pattern (alternatively, order) to which the pilot pattern is allocated may be determined in the order in which the pilot pattern index cyclically increases at the interval of integer n until all pilot patterns are allocated within the pilot period. For example, the pattern indexes may be allocated in the order of 0,4,8, . . . , 1,5,9, . . . , 2,6,10, . . . , 3,7,11, . . . according to the order of the data symbol and when all patterns are completely used, the pilot patterns may be allocated by a scheme of 0,4,8, . . . , 1,5,9, . . . , 2,6,10, . . . , 3,7,11, . . . all over again. Further, unlike the above illustration, the units including 2, 8, etc. may be used in addition to the unit of 4. Since the channel correlation between subcarriers close to each other in the frequency domain exists, the pilot patterns are allocated in the order in which the pilot pattern index increases at the interval of integer n to enhance the performance of the channel estimation.

Further, various patterns (alternatively, orders) regarding the allocation order of the pilot patterns such as the case where the pilot patterns may be allocated in a predetermined order within one pilot pattern, etc. may be applied.

(2) NSTS≥2

The pilot pattern proposed in (1) NSTS=1 given above may be reused or only some of the pilot patterns proposed in (1) NSTS=1 given above may be reused.

As one example of reusing only some of the pilot patterns proposed in (1) NSTS=1 given above, only the pilot pattern which meets mod(pattern index, NSTS)=n may be reused. Herein, n corresponds to a predetermined value among 0, 1, 2, . . . , NSTS-1. Herein, mod indicates the modular operation.

Meanwhile, as illustrated in FIG. 17 given above, since the 80 MHz PPDU may be constituted by the single 996 tone resource unit, the traveling pilot pattern described in the 80 MHz PPDU may be similarly used for transmission of the 996 tone resource unit.

FIG. 18 is a diagram illustrating a method for transmitting and receiving a PPDU according to an embodiment of the present invention.

Referring to FIG. 18, a wireless communication apparatus (STA or AP) generates a PPDU (S1801).

Herein, a pilot is inserted into a predetermined subcarrier for each of symbols a data field, an HE-LTF, and/or an HE-SIG (e.g., HE-SIG A and/or HE-SIG B) included in the PPDU, in particular, a traveling pilot is used according to the present invention.

A minimum integer number of pilots patterns may be defined, which is not smaller than a value acquired by dividing the total number (including, e.g., DC subcarriers, guard subcarriers, and left-over subcarriers) of subcarriers of the data field, the HE-LTF, and/or the HE-SIG (e.g., HE-SIG A and/or HE-SIG B) or an FFT size value used for generating the PPDU by the total number of pilots.

In addition, since the traveling pilot is used, a predetermined pilot pattern among a plurality of predetermined pilot patterns may be allocated for each symbol of the HE-LTF and/or HE-SIG (e.g., HE-SIG A and/or HE-SIG B). As described above, the pilot patterns may be allocated in an order in which an index of the pilot pattern increases or the pilot patterns may be allocated in a predetermined order, for each symbol of the data field in an order in which the symbol index of the data field increases.

In addition, the subcarrier index to which the pilot is mapped may be determined by the pilot pattern. Herein, the pilot may be mapped to the data subcarriers other than a direct current (DC) subcarrier and a guard subcarrier among all subcarriers constituting the data field.

In more detail, the pilot may be mapped with the same subcarrier spacing between adjacent pilots except for a pilot which is closest to the direct current (DC) subcarrier among all pilots. In this case, the subcarrier spacing may be the minimum integer value which is not smaller than the value acquired by dividing the total number of subcarriers constituting the data field or the Fast Fourier Transform (FFT) size value used for generating the PPDU by the total number of pilots. Further, the position of the pilot mapped to the left side of the direct current (DC) subcarrier and the position of the pilot mapped to the right side of the DC subcarrier may be mirrored.

In addition, the pilot may be mapped with the same subcarrier spacing between adjacent pilots except for a pilot which is furthest from the direct current (DC) subcarrier among all pilots. In this case, the subcarrier spacing may be the minimum integer value which is not smaller than the value acquired by dividing the total number of subcarriers constituting the data field or the Fast Fourier Transform (FFT) size value used for generating the PPDU by the total number of pilots. Further, a pilot having the largest pilot index in the pilot pattern may be mapped to the left side or the right side of the DC subcarrier according to a comparison result of the number of pilots mapped to the left side of the DC subcarrier and the number of pilots mapped to the right side of the DC subcarrier.

Since a more detailed description of a method for inserting the pilot is the same as the description in sections 1 to 10, the method for inserting the pilot will not be described below. That is, when the PPDU is transmitted throughout all channels (e.g., 20 MHz, 40 MHz, 80 MHz, and 160 MHz) (that is, when the PPDU transmission bandwidths are 20 MHz, 40 MHz, 80 MHz, and 160 MHz), methods 1 to 4 described above may be used. On the contrary, in the case of an OFDMA PPDU transmitted in an OFDMA scheme by using a predetermined resource unit, methods 5 to 10 described above may be used.

In addition, the wireless communication apparatus (STA or AP) transmits the generated PPDU (S1802).

In this case, the wireless communication apparatus may transmit the PPDU through all channel bandwidths (e.g., 20 MHz, 40 MHz, 80 MHz, and 160 MHz) or transmit the PPDU through the predetermined resource unit by the OFDMA scheme.

Further, the wireless communication apparatus may transmit the PPDU through a single stream or a plurality of streams.

General Apparatus to which the Present Invention May be Applied

FIG. 19 is a block diagram exemplifying a wireless apparatus according to an embodiment of the present invention.

Referring to FIG. 19, an apparatus 1910 according to the present invention may include a processor 1911, a memory 1912, and a radio frequency (RF) unit 1913. The apparatus 1910 may be an AP or a non-AP STA for implementing the embodiments of the present invention.

The RF unit 1913 is connected to the processor 1911 to transmit and/or receive a wireless signal. For example, the RF unit 1913 may implement the physical layer according to the IEEE 802.11 system.

The processor 1911 is connected to the RF unit 1913 to implement the physical layer and/or MAC layer according to the IEEE 802.11 system. The processor 1911 may be configured to perform the operations according to the various embodiments of the present invention according to FIGS. 1 to 18 above. In addition, a module that implements the operations of the AP and/or the STA according to the various embodiments of the present invention according to FIGS. 1 to 18 above may be stored in the memory 1912 and executed by the processor 1911.

The memory 1912 is connected to the processor 1911 and stores various pieces of information for driving the processor 1911. The memory 1912 may be included in the processor 1911, or installed exterior to the processor 1811 and connected to the processor 1911 with a known means.

Further, the apparatus 1910 may have a single antenna or multiple antennas.

Such a detailed configuration of the apparatus 1910 may be implemented such that the features described in various embodiments of the present invention described above are independently applied or two or more embodiments are simultaneously applied.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The method for transmitting and receiving a PPDU in a wireless communication system of the present invention is mainly described with examples that applied to the IEEE 802.11 system, but may be applied to other wireless communication system in addition to the IEEE 802.11 system.

What is claimed is:

1. A method for transmitting a physical protocol data unit (PPDU) by a wireless communication apparatus in a wireless communication system, the method comprising:
   generating the PPDU including a legacy preamble, a High Efficiency (HE) preamble, and a data field; and
   transmitting the generated PPDU,
   wherein pilot patterns are defined, of which a integer number which is not smaller than a value acquired by dividing a total number of subcarriers constituting the data field by a total number of pilots,
   wherein a predetermined pilot pattern among the pilot patterns is allocated for each symbol of the data field,
   wherein an index of a subcarrier to which a pilot is mapped is determined by the pilot pattern,
   wherein the data field is mapped to 26 subcarriers, 52 subcarriers or 106 subcarriers in a frequency domain and the PPDU is transmitted by an orthogonal frequency division multiple access (OFDMA) scheme,
   wherein when the data field is mapped to 26 subcarriers or 52 subcarriers, an interval between the pilots is 13 subcarriers, and
   wherein when the data field is mapped to 106 subcarriers, an interval between the pilots is 27 subcarriers.

2. The method of claim 1, wherein the pilot is mapped with same subcarrier spacing between adjacent pilots except for a pilot which is closet to a direct current (DC) subcarrier among all pilots.

3. The method of claim 2, wherein the subcarrier spacing is a integer value which is not smaller than the value acquired by dividing the total number of subcarriers constituting the data field by the total number of pilots.

4. The method of claim 1, wherein the position of the pilot mapped to a left side of the direct current (DC) subcarrier and the position of the pilot mapped to a right side of the DC subcarrier are mirrored.

5. The method of claim 1, wherein the pilot is mapped with same subcarrier spacing between adjacent pilots except for a pilot which is furthest from to the direct current (DC) subcarrier among all pilots.

6. The method of claim 5, wherein the subcarrier spacing is the integer value which is not smaller than the value acquired by dividing the total number of subcarriers constituting the data field by the total number of pilots.

7. The method of claim 1, wherein a pilot having the largest pilot index in the pilot pattern is mapped to the left side or the right side of the DC subcarrier according to a comparison result of the number of pilots mapped to the left side of the DC subcarrier and the number of pilots mapped to the right side of the DC subcarrier.

8. The method of claim 1, wherein pilot pattern are allocated in an order in which an index of the pilot pattern increases or allocated in a predetermined order, for each symbol of the data field in an order in which the symbol index of the data field increases.

9. The method of claim 1, wherein when the PPDU is transmitted through a plurality of streams, the pilot patterns defined with respect to a single stream are identically used or only some of the pilot patterns are used.

10. The method of claim 1, wherein when the PPDU bandwidth is 40 MHz, the pilot patterns defined with respect to 20 MHz are duplicated per 20 MHz,
   when the PPDU bandwidth is 80 MHz, the pilot patterns defined with respect to 40 MHz are duplicated per 40 MHz, and
   when the PPDU bandwidth is 160 MHz, the pilot patterns defined with respect to 80 MHz are duplicated per 80 MHz.

11. The method of claim 1, wherein the pilot is mapped to data subcarriers other than the direct current (DC) subcarrier and a guard subcarrier among all subcarriers constituting the data field.

12. An apparatus for transmitting a physical protocol data unit (PPDU) in a wireless communication system, the apparatus comprising:
   a radio frequency (RF) unit for transmitting and receiving a radio signal; and
   a processor controlling the RF unit,
   wherein the processor is configured to generate the PPDU including a legacy preamble, a High Efficiency (HE) preamble, and a data field, and
   transmit the generated PPDU,
   wherein pilot patterns are defined, of which a integer number which is not smaller than a value acquired by dividing a total number of subcarriers constituting the data field by a total number of pilots,
   wherein a predetermined pilot pattern among the pilot patterns is allocated for each symbol of the data field,
   wherein an index of a subcarrier to which a pilot is mapped is determined by the pilot pattern,
   wherein the data field is mapped to 26 subcarriers, 52 subcarriers or 106 subcarriers in a frequency domain and the PPDU is transmitted by an orthogonal frequency division multiple access (OFDMA) scheme,
   wherein when the data field is mapped to 26 subcarriers or 52 subcarriers, an interval between the pilots is 13 subcarriers, and
   wherein when the data field is mapped to 106 subcarriers, an interval between the pilots is 27 subcarriers.

* * * * *